United States Patent [19]
Bodo et al.

[11] Patent Number: 5,680,587
[45] Date of Patent: Oct. 21, 1997

[54] ENHANCED-PERFORMANCE FLOPPY DISKETTE SUBSYSTEM

[75] Inventors: Martin J. Bodo, Mountain View; Robert A. Rosenbloom, Brookdale, both of Calif.

[73] Assignee: Computer Performance Inc., Sunnyvale, Calif.

[21] Appl. No.: 432,239

[22] Filed: May 1, 1995

[51] Int. Cl.$^6$ .................................................. G06F 13/12
[52] U.S. Cl. ............................................................ 395/500
[58] Field of Search ............................................... 395/500

[56] References Cited

U.S. PATENT DOCUMENTS

| | | | |
|---|---|---|---|
| 4,295,205 | 10/1981 | Kunstadt | 395/410 |
| 4,792,896 | 12/1988 | Maclean et al. | 395/500 |
| 4,984,103 | 1/1991 | Nigam | 360/74.1 |
| 5,003,412 | 3/1991 | Bizjak et al. | 360/77.01 |
| 5,014,237 | 5/1991 | Masters et al. | 395/500 |
| 5,150,465 | 9/1992 | Bush et al. | 395/834 |
| 5,317,713 | 5/1994 | Glassburn | 395/440 |
| 5,434,722 | 7/1995 | Bizjak et al. | 360/69 |
| 5,535,072 | 7/1996 | Witt et al. | 360/99.06 |
| 5,535,371 | 7/1996 | Stewart et al. | 395/500 |

OTHER PUBLICATIONS

Data Sheets from National Semiconductor for the PC8477B (Super FDC™) Advanced Floppy Disk Controller, Aug. 1993.

Macintosh Plus Users Manual, Apple Computer, Inc. Copyright 1986.
Brochure for Trace Series 8000ST Floppy Diskete Duplication System, Copyright 1994.
Trace Topics, vol. VI, No. 2, Fall 1994.

*Primary Examiner*—Kevin J. Teska
*Assistant Examiner*—Nicole L. Dehlitsch-Moats
*Attorney, Agent, or Firm*—Donald E. Scheiber

[57] ABSTRACT

An enhanced-performance floppy diskette subsystem, which operates many times faster than a conventional floppy diskette subsystem, includes both an enhanced-performance floppy diskette drive and floppy diskette drive controller. The diskette drive rotates a floppy diskette two or more times faster than that of a conventional floppy diskette drive, and includes two separate and independent read/write ("R/W") channels. To provide enhanced-performance, the floppy diskette drive controller includes a DRAM cache that maintains an image of the data recorded on a floppy diskette present in the floppy diskette drive. Two separate and independent floppy disk drive controller channels respectively interface between the cache memory and the R/W channels included in the enhanced-performance floppy diskette drive. Operating in this way, both heads of the enhanced-performance floppy diskette drive concurrently record data from the cache onto a floppy diskette, or reproduce data from a floppy diskette for storage into the cache. To a computer program executed by a host microprocessor, the enhanced-performance floppy diskette mimics the operation of a conventional floppy diskette subsystem.

41 Claims, 4 Drawing Sheets

ENHANCED-PERFORMANCE FLOPPY DISKETTE SUBSYSTEM

BACKGROUND OF THE INVENTION

1. Field of the Invention

The present invention relates generally to the technical field of digital computer magnetic recording subsystems and, more particularly, to floppy diskette recording subsystems.

2. Description of the Prior Art

Floppy diskette subsystems included in digital computer systems store and retrieve digital data that is recorded along tracks formed on both side surfaces of a thin, circularly-shaped, double-sided floppy diskette. Presently, floppy diskette subsystems adapted for use in IBM® Personal Computers ("PC") and IBM PC clone digital computers are backward compatible with floppy diskette subsystems included in the original IBM PC model XT and model AT digital computers of the early 1980's. A combination of considerations arising from the desire to maintain backward compatibility between present floppy diskette subsystems and floppy diskette subsystems used in personal computers of ten (10) years ago has contrived to inhibit improving the performance of floppy diskette subsystems.

Referring to FIG. 1, a floppy diskette subsystem, referred to by the general reference character 10, includes a floppy diskette controller 12, which may be a card that plugs into a socket 14 of a mother board bus 16 included in an IBM PC XT or AT or IBM PC clone computer. Digital logic circuits included in the floppy diskette controller 12 provide an interface for exchanging digital command, status, and data signals between the floppy diskette controller 12 and the mother board bus 16. The digital logic circuits in the floppy diskette controller 12 also provide an interface for exchanging digital command, status, control and data signals via a ribbon cable 18 with a floppy diskette drive 22 included in a computer. Accordingly, the digital logic circuits of the floppy diskette controller 12 constitute a floppy diskette controller channel 24 for exchanging digital data between a floppy diskette drive 22 and the mother board bus 16. Presently, integrated circuits ("ICs") are commercially available which provide in a single IC package all the digital logic circuits required for interfacing a floppy diskette drive 22 to the mother board bus 16 included in an IBM PC XT or AT, or IBM PC clone computer.

All floppy diskette drives 22 regardless of type include several basic common components. Every floppy diskette drive 22 includes a mechanical spindle 32 that receives and secures a thin, annularly-shaped floppy diskette 34, shown in phantom in FIG. 1. The floppy diskette 34 when secured in the floppy diskette drive 22 is rotatable about an axis 36 disposed normal to the floppy diskette 34. Every floppy diskette drive 22 also includes a spindle motor 38 which in present floppy diskette drives 22 rotates the floppy diskette 34 at nominal rotation velocity of 300 revolutions per minute ("RPM") for either 5¼-inch or 3½-inch diameter floppy diskettes. The 300 RPM rotation speed of a 3½-inch HD floppy diskette drive 22 causes it to record and reproduce digital data at a fixed, 500 kilohertz ("KHz") bit rate. The 500 KHz data rate of a 3½-inch HD floppy diskette drive 22 is the highest data rate at which IBM PC XT and AT, and IBM PC clone digital computers record and reproduce digital data using a conventional floppy diskette drive 22 regardless of whether the floppy diskette drive 22 employs a 5¼-inch or a 3½-inch floppy diskette 34. Moreover, present floppy diskette drive 22 must be rotating at full speed before recording or reproducing digital data.

A floppy diskette drive 22 also includes two read/write heads 42, one head for each surface 44 of a floppy diskette 34. Each read/write head 42 is used both for recording and for reproducing digital data on its respective surface 44 of the floppy diskette 34. Both heads 42 are mechanically secured to a head positioning assembly 46 which moves each read/write head 42 laterally across a surface 44 of a floppy diskette 34 in a direction that is normal to the axis 36 about which the floppy diskette 34 rotates. Electrical pulses applied to a stepper motor, not illustrated separately in FIG. 1, energize movement of the head positioning assembly 46. Such movement of the read/write heads 42 across the surfaces 44 of a floppy diskette 34 provides no feedback regarding the position of the read/write heads 42 in relation to tracks of data recorded on the floppy diskette 34. Consequently, after energizing the stepper motor to move the read/write heads 42 across the surfaces 44, present floppy diskette subsystems 10 insure that the read/write heads 42 are properly positioned in relationship to the tracks on the floppy diskette 34 by merely waiting for a sufficiently long interval of time before recording or reproducing data.

The floppy diskette drive 22 also includes a read/write channel 52 that exchanges data and control signals via the ribbon cable 18 with the floppy diskette controller channel 24. A head switch 54, also included in the floppy diskette drive 22, selectively couples the read/write channel 52 either to one or the other of the read/write heads 42 depending upon which surface of the floppy diskette 34 is presently being used for recording or reproducing digital data. Thus in recording digital data on or in reproducing digital data from the floppy diskette 34, without moving the read/write heads 42 the floppy diskette subsystem 10 first records or reproduces digital data on one surface 44 of the floppy diskette 34, and then on the other surface 44 of the floppy diskette 34. Only after digital data has been recorded or reproduced along a track on both surfaces 44 of the floppy diskette 34 does the floppy diskette controller channel 24 included in the floppy diskette controller 12 cause the head positioning assembly 46 to step the read/write heads 42 to an adjacent track to continue recording or reproducing digital data. Similar to the floppy diskette controller channel 24, presently ICs are commercially available which provide in a single IC package all the electronic circuits required for the read/write channel 52.

The IBM PC XT and AT digital computers did not insulate a computer program which reads and writes data on a floppy diskette 34 from the operating characteristics of the floppy diskette drive 22. Thus, even today there exist computer programs that were written years ago to operate properly with the operating characteristics of the then existing floppy diskette subsystems 10, that are still essential for some personal computer uses. Over the years, such computer programs have not been re-written to make them independent of the performance characteristics of the floppy diskette subsystem 10. Consequently, such computer programs could not execute properly using a floppy diskette subsystem 10 designed in the conventional way if it provided performance which differs markedly from that of the original IBM PC XT and AT computers.

In addition to the conventional floppy diskette subsystem 10 depicted in FIG. 1, special purpose, higher performance floppy disk subsystems have been developed which are particularly adapted for use in computer software publishing for only recording digital data repetitively onto a sequence of floppy diskettes. FIG. 2 illustrates such a floppy disk writer subsystem 60. Those elements of the floppy disk writer subsystem 60 depicted in FIG. 2 that are common to the floppy diskette subsystem 10 depicted in FIG. 1 carry the same reference numeral distinguished by a prime ("'") designation. To increase the clarity of FIG. 2, the head positioning assembly 46 has been omitted from the floppy diskette drive 22' illustrated in FIG. 2 although the floppy diskette drive 22' does, in fact, include a head positioning assembly.

The floppy diskette controller 12' included in the floppy disk writer subsystem 60 depicted in FIG. 2 differs from the floppy diskette controller 12 included in the floppy diskette subsystem 10 depicted in FIG. 1 by including two (2) separate and independent floppy diskette controller channels 24a' and 24b'. Each of the floppy diskette controller channels 24a' and 24b' of the floppy diskette controller 12' are respectively coupled, via the ribbon cable 18', to one of a pair of separate and independent read/write channels 52a' or 52b' included in the floppy diskette drive 22'. Rather than being coupled to the read/write heads 42' via a head switch 54, the read/write channels 52a' and 52b' included in the floppy diskette drive 22' are respectively coupled directly to one of the read/write heads 42'. Coupled in this way, the combined floppy diskette controller channels 24a' and 24b', read/write channels 52a' and 52b', and the read/write heads 42', operating in conjunction with a special computer program for writing the floppy diskette 34', concurrently write both surfaces 44' of a floppy diskette 34 rather than alternating back and forth between the surfaces 44 as does the floppy diskette subsystem 10 depicted in FIG. 1.

While the floppy disk writer subsystem 60 offers higher performance in recording and reproducing digital data, the floppy disk writer subsystem 60 is a special purpose unit which is incompatible with the industry standard personal computer architecture. Consequently, only computer programs that repetitively record the same digital data over and over onto a sequence of floppy diskettes have been specifically written for use with the floppy disk writer subsystem 60. That is, conventional computer programs, such as spread sheet or word processing computer programs, cannot record data directly onto or reproduce data directly from a floppy diskette present in a floppy disk writer subsystem 60.

SUMMARY OF THE INVENTION

An object of the present invention is to provide an enhanced-performance floppy diskette subsystem.

Another object of the present invention is to provide an enhanced-performance floppy diskette subsystem which is functionally equivalent to a conventional floppy diskette subsystem.

Another object of the present invention is to provide an enhanced-performance floppy diskette subsystem which is compatible with computer programs written for execution on a personal computer which conforms to the industry standard personal computer architecture.

Another object of the present invention is to provide a floppy diskette subsystem which, without host processor intervention, pre-fetches and caches digital data reproduced from a floppy diskette in anticipation of a request from a computer program to access such data.

Another object of the present invention is to provide a floppy diskette subsystem which is capable of reproducing or recording digital data while the floppy diskette accelerates up to its nominal operating speed.

Another object of the present invention is to provide a floppy diskette subsystem which records or reproduces digital data while rotating a floppy diskette at a rate which is faster than that of a conventional floppy diskette subsystem.

Another object of the present invention is to provide a floppy diskette subsystem which records or reproduces digital data while rotating a floppy diskette at a rate which is faster than that of a conventional floppy diskette subsystem while providing an acceptable error rate.

Another object of the present invention is to provide a floppy diskette subsystem which commences reproducing or recording data immediately after sensing that a floppy diskette drive's read/write heads are positioned properly in relationship to a track recorded on a floppy diskette.

Another object of the present invention is to provide a floppy diskette subsystem which, without host processor intervention, caches digital data prior to recording that data on a floppy diskette.

Another object of the present invention is to provide an enhanced-performance floppy diskette subsystem which prevents ejecting a floppy diskette until all data cached in the floppy diskette subsystem has been recorded on the floppy diskette.

Yet another object of the present invention is to provide an enhanced-performance floppy diskette subsystem which detects floppy diskette access by a computer program which requires conventional floppy diskette subsystem performance, and which for compatibility with such a computer program reduces the apparent performance of the floppy diskette subsystem to that of a conventional floppy diskette subsystem.

Briefly, an enhanced-performance floppy diskette subsystem in accordance with the present invention includes both an enhanced-performance floppy diskette drive and an enhanced-performance floppy diskette drive controller. The diskette drive motor of the enhanced-performance floppy diskette drive rotates a floppy diskette secured therein at a nominal rotation velocity which is significantly faster than that of a conventional floppy diskette drive. The enhanced-performance floppy diskette drive also includes two separate and independent read/write ("R/W") channels which are respectively electronically coupled to each of the floppy diskette drive's two (2) read/write heads.

The enhanced-performance floppy diskette drive controller exchanges digital command, status, and data signals with a bus of the host computer system via floppy diskette drive controller register emulation logic. The floppy diskette drive controller register emulation logic receives and transmits digital command, status, and data signals which cause the floppy diskette subsystem to provide responses identical to those of a conventional floppy diskette subsystem. The enhanced-performance floppy diskette drive controller also includes a cache memory, which is coupled to the floppy diskette drive controller emulation logic, and which both exchanges digital data with the floppy diskette drive controller emulation logic, and stores exchanged digital data. A microcontroller, included in the enhanced-performance floppy diskette drive controller, is coupled both to the floppy diskette drive controller emulation logic and to the cache memory. The microcontroller exchanges digital data between the floppy diskette drive controller emulation logic and the cache memory so the floppy diskette drive controller emulation logic mimics operation of a conventional floppy diskette drive. The floppy diskette drive controller also exchanges digital command, status, control, and data signals with a head positioning assembly included in the enhanced-performance floppy diskette drive and with the diskette drive motor. Two separate and independent floppy disk drive controller channels, included in the enhanced-performance floppy diskette drive controller, respectively interface between the cache memory and one of the R/W channels included in the enhanced-performance floppy diskette drive. Each floppy disk drive controller channel exchanges digital data with the cache memory while concurrently exchanging digital command, status, control, and data signals with the particular R/W channel of the floppy diskette drive that is coupled to the floppy disk drive controller channel. Operating in this way, both heads of the enhanced-performance floppy diskette drive concurrently record data onto, or reproduce data from a floppy diskette.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENTS

Figure 3:
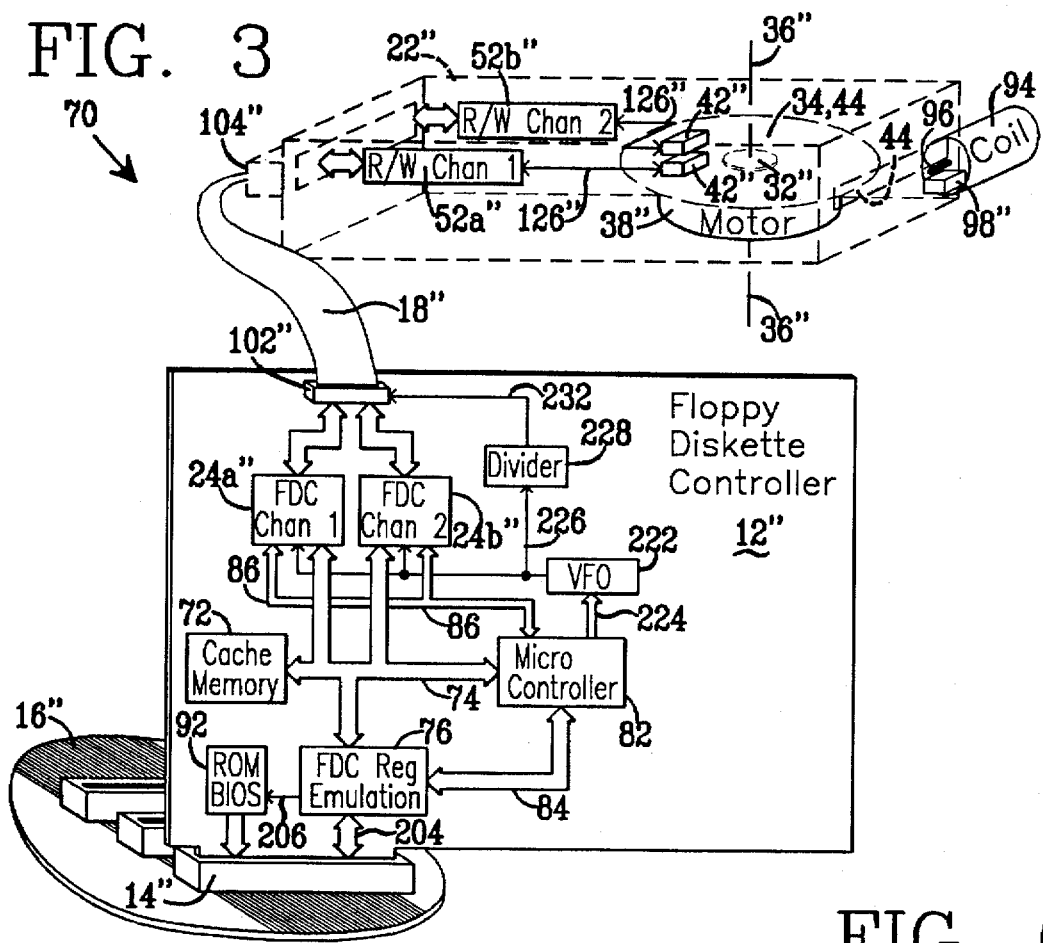
FIG. 3 is a functional-type block diagram depicting an enhanced-performance floppy diskette drive subsystem in accordance with the present invention illustrating both an enhanced-performance floppy diskette drive controller and an enhanced-performance floppy diskette drive including the drive's read/write channel.

Referring now to FIG. 3, depicted there is a functional-type block diagram of an enhanced-performance floppy diskette drive subsystem in accordance with the present invention referred to by the general reference character 70.

Figure 1:
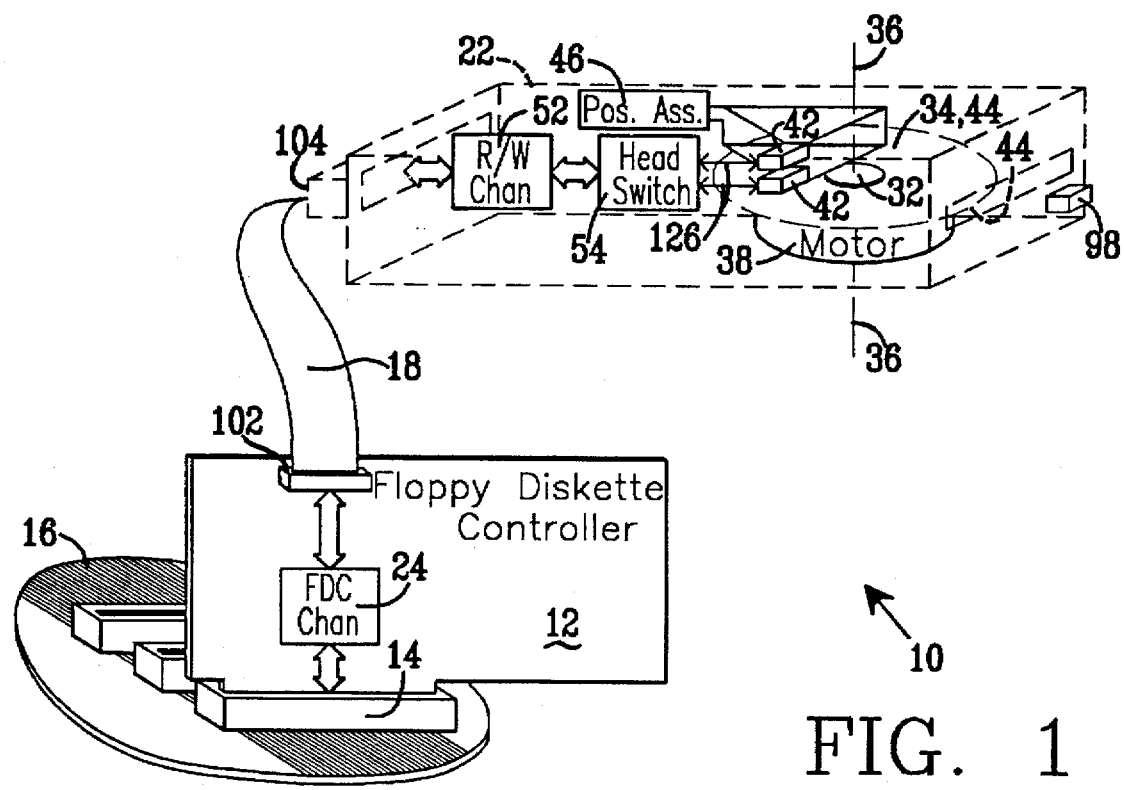
FIG. 1 is a functional-type block diagram depicting a conventional, prior art floppy diskette drive subsystem including a floppy diskette drive controller and a floppy diskette drive.
Figure 2:
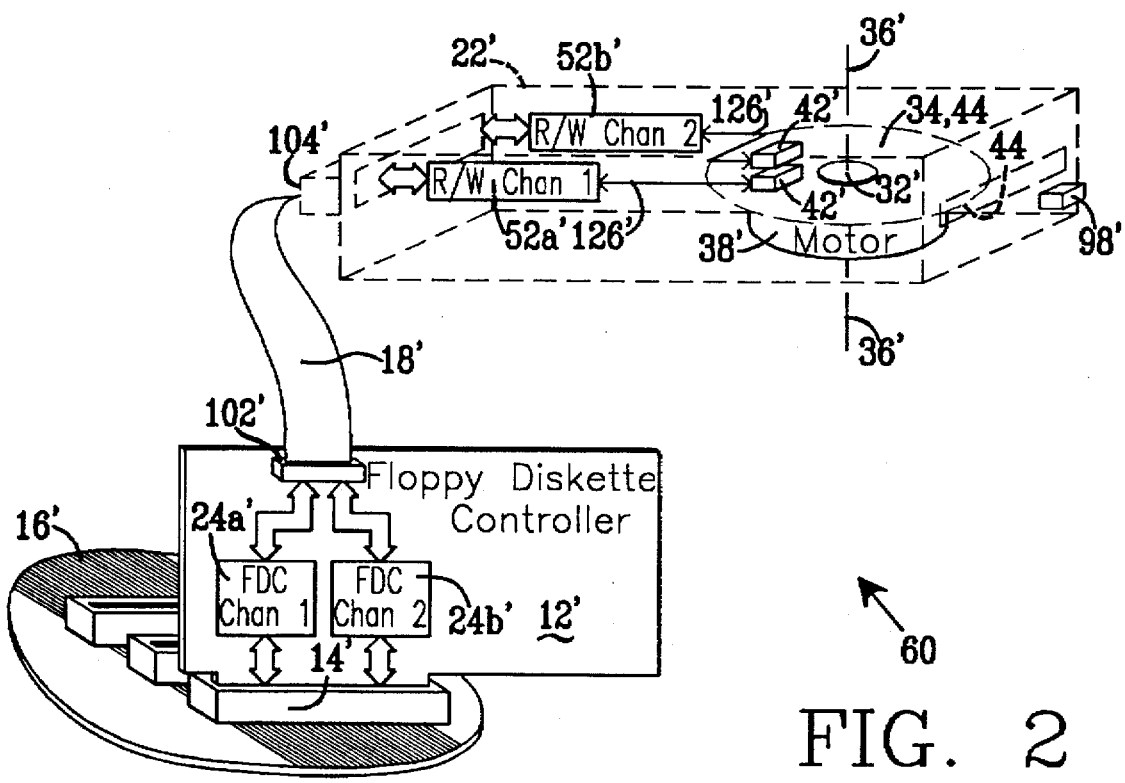
FIG. 2 is a functional-type block diagram depicting a special purpose, prior art floppy diskette drive subsystem, including a floppy diskette drive controller and a floppy diskette drive, that is used for software publishing.

Those elements of the enhanced-performance floppy diskette subsystem 70 depicted in FIG. 3 that are similar to elements of the floppy diskette subsystem 10 depicted in FIG. 1 and/or the floppy disk writer subsystem 60 depicted in FIG. 2 carry the same reference numeral distinguished by a double prime ("''") designation. Similar to FIG. 2, to increase the clarity of FIG. 3, the head positioning assembly 46 depicted in FIG. 1 has been omitted from the floppy diskette drive 22" illustrated in FIG. 3 although the floppy diskette drive 22" does, in fact, include a head positioning assembly.

The enhanced-performance floppy diskette subsystem 70 includes an enhanced-performance floppy diskette drive 22" and an enhanced-performance floppy diskette controller 12". The floppy diskette controller 12" includes dual separate and independent floppy diskette controller channels 24a" and 24b" which preferably are either a PC8477B (SuperFDC™) Advanced Floppy Disk Controller IC manufactured by National Semiconductor Corporation of Santa Clara, Calif., or an 82078 CHMOS Single-Chip Floppy Disk Controller IC manufactured by Intel Corporation of Santa Clara, Calif. Within the floppy diskette controller 12", operating autonomously through the use of direct memory access ("DMA"), each floppy diskette controller channel 24a" and 24b" fetches digital data to be recorded onto a floppy diskette 34 from a cache memory 72 via a FDC bus 74. Correspondingly, each floppy diskette controller channel 24a" and 24b" stores data reproduced from the floppy diskette 34 into the cache memory 72 via the FDC bus 74 using DMA. The cache memory 72 is preferably a 1.5 mega-byte ("Mbyte") dynamic random access memory ("DRAM").

As described in greater detail in Intel Corporation and National Semiconductor Corporation literature respectively describing the 82078 CHMOS Single-Chip Floppy Disk Controller IC or the PC8477B (SuperFDC™) Advanced Floppy Disk Controller IC, each IC respectively includes a phase locked loop ("PLL") data separator which effects the reproduction of recorded data from the floppy diskette 34. Also, either a crystal (usually either a 24 megaHertz ("MHz") or a 48 MHz crystal) must be directly connected to the floppy diskette controller channel IC to permit generation internally within the IC of a clock signal that is required for the IC's proper operation, or the IC must be supplied with an appropriate clock signal from an external source. Internally, the floppy diskette controller channels 24a" and 24b" respectively use either the 24 MHz or 48 MHz clock signal in establishing an operating mode for the PLL which permits reproducing data read from the floppy diskette 34 either at 250 kilo-bits per second ("kb/s") or at 500 kb/s.

The FDC bus 74 included in the floppy diskette controller 12" also couples the cache memory 72 to FDC register emulation logic 76, which is also coupled, via the socket 14", to the mother board bus 16" included in a host IBM PC XT or AT, or IBM PC clone computer system. Accordingly, the FDC register emulation logic 76 exchanges digital data to be recorded on the floppy diskette 34 or reproduced from the floppy diskette 34 both with the mother board bus 16" and with the cache memory 72. For receiving data to be recorded onto the floppy diskette 34, the combined cache memory 72 and FDC register emulation logic 76 operate at a data rate limited solely by the speed of the mother board bus 16". The combined cache memory 72 and FDC register emulation logic 76 also operate at that same data rate in supplying data reproduced from the floppy diskette 34 if such data is already present in the cache memory 72.

A microcontroller 82 is also coupled to the cache memory 72 via the FDC bus 74, to the FDC register emulation logic 76 via a FDC register emulation control bus 84, and to the floppy diskette controller channels 24a" and 24b" via a controller channels control bus 86. Exchanges of digital data between the microcontroller 82 and the FDC register emulation logic 76 permit the floppy diskette controller 12" to mimic the operation of the conventional floppy diskette subsystem 10. The microcontroller 82 preferably includes a 80C188 manufactured by Intel Corporation, and a 32 kilobyte ("kbyte") read only memory ("ROM") for storing a computer program executed by the 80C188. The computer program executed by the microcontroller 82 is a real-time executive program which provides timely response to events occurring in the floppy diskette controller channels 24a" and 24b", and in the FDC register emulation logic 76 so digital data is supplied to or received from the floppy diskette drive 22" via the independent floppy diskette controller channels 24a" and 24b" and the read/write channels 52a" and 52b" at the fastest rate practicable.

To facilitate detecting an attempt to access the enhanced-performance floppy diskette subsystem 70 by a computer program that requires conventional floppy diskette subsystem performance for its successful execution, the floppy diskette controller 12" preferably includes a 16 kbyte read only memory ("ROM") basic input/output system ("BIOS") 92. The ROM BIOS 92 stores an input/output routine that is executed by a host microprocessor in facilitating an application computer program's, also executed by the host microprocessor, access to the floppy diskette drive 22". For host IBM PC XT or AT, or IBM PC clone computer systems, such an application computer program attempting to record data on the floppy diskette 34 or to reproduce data from the floppy diskette 34 generally issues a software interrupt 13, also identified as Int 13h. The ROM BIOS 92 stores a software interrupt 13 I/O routine which the host microprocessor executes if an application computer program executed by the host microprocessor issues software interrupt 13 to access the floppy diskette drive 22". If a computer program executed by the host microprocessor accesses the enhanced-performance floppy diskette subsystem 70 through the software interrupt 13 I/O routine stored in the ROM BIOS 92, then the enhanced-performance floppy diskette subsystem 70 operates its high performance operating mode. If, however, a computer program accesses the FDC register emulation logic 76 other than through the software interrupt 13 I/O routine stored in the ROM BIOS 92, the computer program executed by the microcontroller 82 emulates the reduced performance of the conventional floppy diskette subsystem 10.

Similar to the floppy diskette drive 22' depicted in FIG. 2, the enhanced-performance floppy diskette drive 22" depicted in FIG. 3 includes two (2) separate and independent read/write channels 52a" and 52b". However, as will be explained in greater detail below, the read/write channels 52a" and 52b" differ markedly from the read/write channels 52a' and 52b' included in the floppy diskette drive 22' depicted in FIG. 2.

The floppy diskette drive 22" illustrated in FIG. 3 also includes a solenoid 94 which is not present in the floppy diskette drive 22 or 22' respectively depicted in FIGS. 1 and 2. Upon being energized in response to a signal transmitted from the floppy diskette controller 12" to the floppy diskette drive 22" over either a Coil 1 or a Coil 2 signal line included in the ribbon cable 18", the solenoid 94 extends a pin 96 into a mating aperture formed in a diskette eject button 98" which is present in each of the floppy diskette drives 22, 22' and 22". Extension of the pin 96 into the diskette eject button 98" during writing of a floppy diskette 34 locks the button 98" to prevent ejection of the floppy diskette 34 from the floppy diskette drive 22" while data to be recorded on the floppy diskette 34 remains in the cache memory 72.

Figure 4:
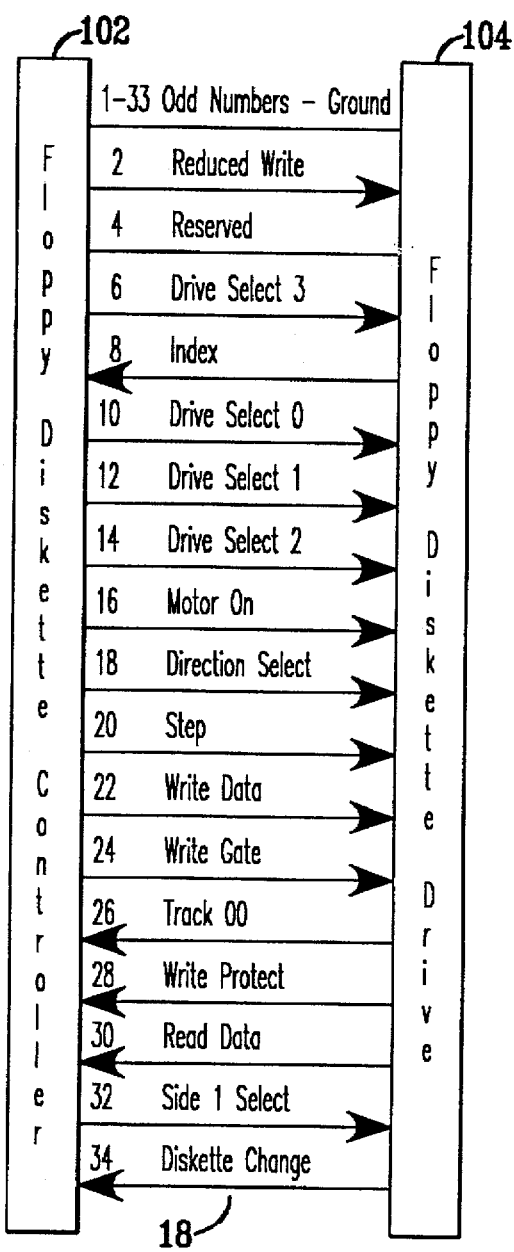
FIG. 4 is a functional-type block diagram depicting signal lines included in a ribbon cable coupling the conventional floppy diskette drive controller illustrated in FIG. 1 to the conventional floppy diskette drive illustrated in FIG. 1.
Figure 5:
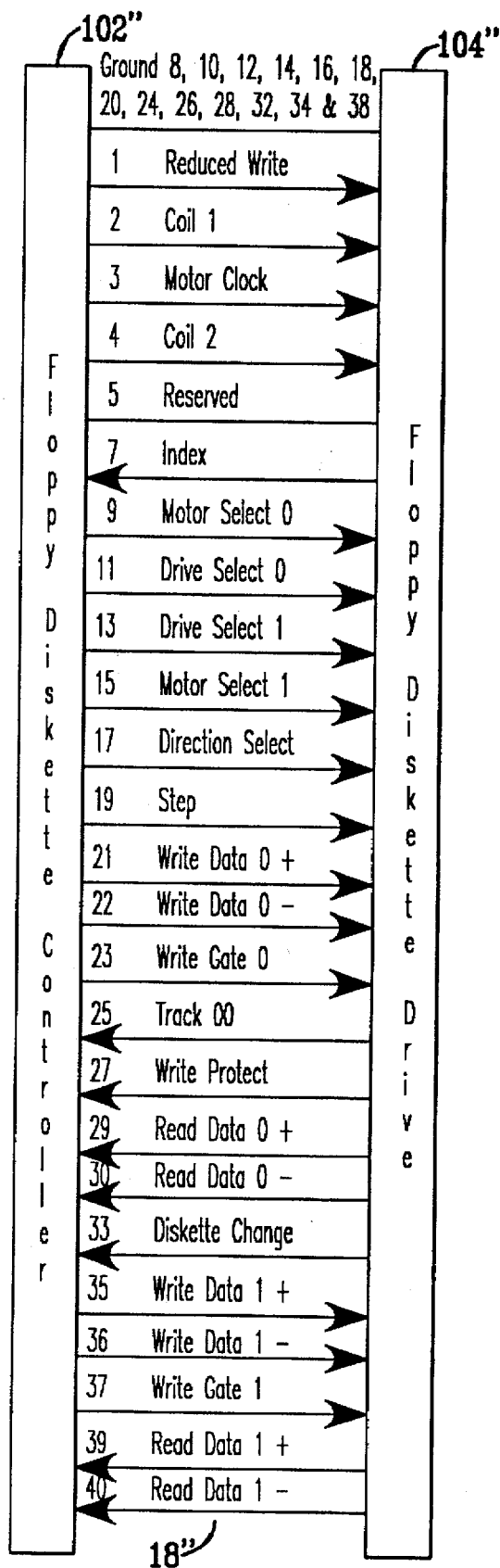
FIG. 5, is a functional-type block diagram depicting signal lines included in a ribbon cable coupling the enhanced-performance floppy diskette drive controller depicted in FIG. 3 to the enhanced-performance floppy diskette drive depicted in FIG. 3.

FIG. 4 depicts signal lines included in the ribbon cable 18 which couples the floppy diskette controller 12, depicted in FIG. 1, to up to four (4) of the floppy diskette drives 22 also illustrated in FIG. 1. The ribbon cable 18 includes a floppy diskette controller connector 102 at one end, and one (1) or more floppy diskette drive connectors 104 distributed along the length of and at the other end of the ribbon cable 18. The most significant difference between the signal lines and connectors 102 and 104 included in the ribbon cable 18 depicted in FIG. 4 and those depicted in FIG. 5 for the ribbon cable 18" which couples the floppy diskette controller 12" to the floppy diskette drive 22" are:

1. that the ribbon cable 18" is adapted for coupling the floppy diskette controller 12" to no more than two (2) floppy diskette drives 22" because the ribbon cable 18" includes only Drive Select 0 and Drive Select 1 signal lines;

2. a Motor On signal line in the ribbon cable 18, which extends from the floppy diskette controller connector 102 depicted in FIG. 4 in parallel to all of the floppy diskette drives 22 respectively connected to the floppy diskette drive connectors 104, is replaced in the ribbon cable 18" by a pair of Motor Select signal lines which respectively supply a motor select signal from the floppy diskette controller 12" to only one (1) of up to two (2) floppy diskette drives 22";

3. a single ended Write Data signal line in the ribbon cable 18, which extends from the floppy diskette controller connector 102 depicted in FIG. 4 in parallel to all of the floppy diskette drives 22 respectively connected to the floppy diskette drive connectors 104, is replaced in the ribbon cable 18" by pairs of differential Write Data− and Write Data+ signal lines which respectively exchange data to be recorded on a floppy diskette 34 between the floppy diskette controller 12" and one or the other of the read/write channels 52a" and 52b" include in each floppy diskette drive 22";

4. a Write Gate signal line in the ribbon cable 18, which extends from the floppy diskette controller connector 102 depicted in FIG. 4 in parallel to all of the floppy diskette drives 22 respectively connected to the floppy diskette drive connectors 104, is replaced in the ribbon cable 18" by a pair of Write Gate signal lines which respectively supply a Write Gate signal from the floppy diskette controller 12" to one or the other of the read/write channels 52a" and 52b" include in each floppy diskette drive 22";

5. a single ended Read Data signal line in the ribbon cable 18, which extends from the floppy diskette controller connector 102 depicted in FIG. 4 in parallel to all of the floppy diskette drives 22 respectively connected to the floppy diskette drive connectors 104, is replaced in the ribbon cable 18" by pairs of differential Read Data− and Read Data+ signal lines respectively for exchanging data reproduced from a floppy diskette 34 between the floppy diskette controller 12" and one or the other of the read/write channels 52a" and 52b" include in each floppy diskette drive 22";

6. a Side 1 Select signal line included in the ribbon cable 18 depicted in FIG. 4 is omitted from the ribbon cable 18" depicted in FIG. 5; and 7. the ribbon cable 18" depicted in FIG. 5 adds the following signal lines to those depicted in FIG. 4 for the ribbon cable 18:

a. an optional Motor Clock signal line; and
b. Coil 1 and Coil 2 signal lines.

While the ribbon cable 18 and the ribbon cable 18" both include a Diskette Change signal line, transmission of a signal over the Diskette Change signal line in the ribbon cable 18" from the floppy diskette drive 22" to the floppy diskette controller 12" operates distinctly differently from transmission of a signal over the Diskette Change signal line in the ribbon cable 18 from the floppy diskette drive 22 to the floppy diskette controller 12. In the floppy diskette subsystem 10, a signal is transmitted from the floppy diskette drive 22 to the floppy diskette controller 12 over the Diskette Change signal line only if a floppy diskette 34 is removed from the floppy diskette drive 22, and if the floppy diskette controller 12 energizes the spindle motor 38. That is, when a floppy diskette 34 is removed from the floppy diskette drive 22 the floppy diskette drive 22 merely stores data recording that event, but does not report the event to the floppy diskette controller 12 until the floppy diskette controller 12 attempts to access a floppy diskette 34 in the floppy diskette drive 22 by energizing the spindle motor 38. Conversely, in the enhanced-performance floppy diskette subsystem 70 the floppy diskette drive 22" transmits a signal to the floppy diskette controller 12" over the Diskette Change signal line immediately upon ejection of a floppy diskette 34 from the floppy diskette drive 22".

The enhanced-performance floppy diskette subsystem 70 must employ this interrupt, as opposed to polling, mode of operation for the Diskette Change signal line because, in most instances, an attempt by a computer program executed by the host microprocessor to retrieve data present on a floppy diskette 34 in the floppy diskette drive 22" does not cause the spindle motor 38" to be energized. Rather, because under most circumstances such data is present in the cache memory 72, the computer program executed by the microcontroller 82 will, in general, provide the computer program executed by the host microprocessor with requested data directly from the cache memory 72 without energizing the spindle motor 38". However, after removal of the floppy diskette 34 from the floppy diskette drive 22" the computer program executed by the microcontroller 82 must not provide data from the cache memory 72 to a computer program executed by the host microprocessor because such data is no longer valid. Accordingly, in the enhanced-performance floppy diskette subsystem 70, a signal transmitted from the floppy diskette drive 22" to the floppy diskette controller 12" over the Diskette Change signal line truly constitutes a "cache flush" signal which directs the computer program executed by the microcontroller 82 to flush all data from the cache memory 72.

Figure 6:
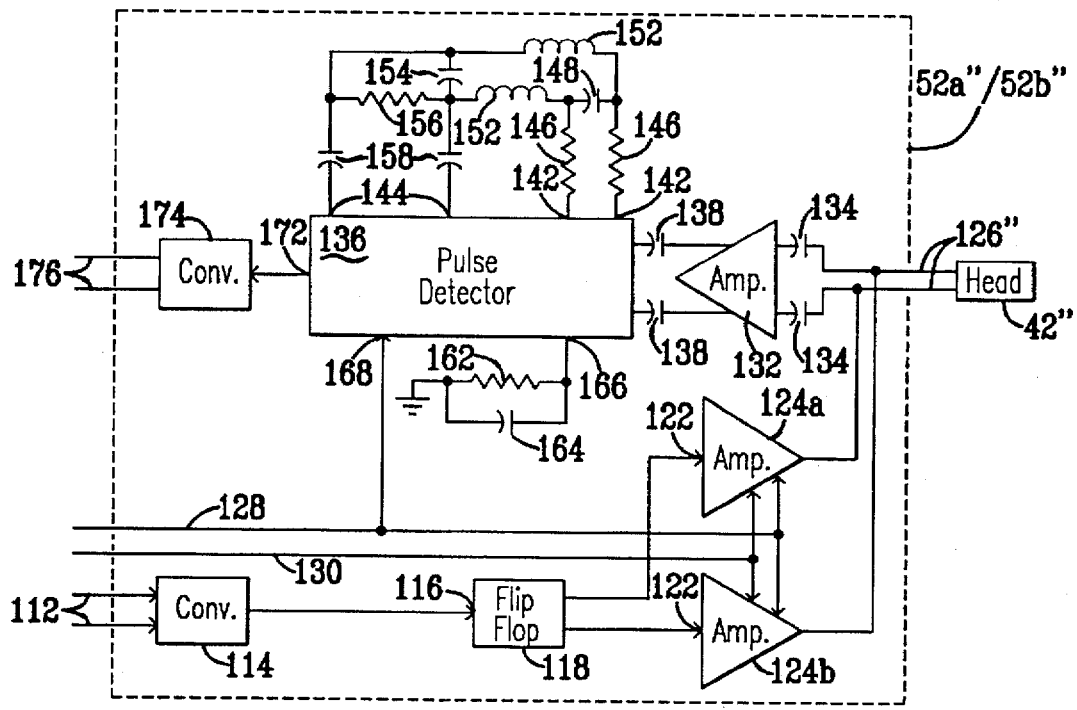
FIG. 6, is a functional-type block diagram depicting a read/write channel included in the enhanced-performance floppy diskette drive illustrated in FIG. 3.

Referring now to FIG. 6, depicted there is the read/write channel 52a" or 52b" included in the floppy diskette drive 22". A pair of write data leads 112 respectively couple Write Data+ and Write Data− signals from the floppy diskette drive connector 104" to a differential to single ended signal conversion IC 114. An output signal from the conversion IC 114 is supplied to a clock input 116 of a flip-flop 118. Bipolar output signals from the flip-flop 118 are supplied respectively to inputs 122 respectively of write amplifiers 124a and 124b. Output signals from the write amplifiers 124a and 124b are coupled to the read/write head 42" by a pair of read/write head leads 126". If a signal present on a write gate signal line 128, which is coupled to either one or the other of the Write Gate signal lines included in the ribbon cable 18", enables transmission of an output signal from the write amplifiers 124a and 124b, then the write amplifiers 124 transmit a data writing current through the read/write heads 42". A signal present on a Reduced Write signal line in the ribbon cable 18" is also supplied, via a writing current control signal line 130, to the write amplifiers 124a and 124b. A signal present on the writing current control signal line 130 permits the floppy diskette controller 12 to select between two different writing current levels that may be supplied by the write amplifiers 124a and 124b to the read/write heads 42. The signal transmitted on this line by the floppy diskette controller 12" causes the floppy diskette drive 22" to supply a current which is 70% higher when recording on the inner ten (10) tracks of a floppy diskette 34 than that supplied when recording on the remaining outer tracks of the floppy diskette 34.

The read/write channel 52a" or 52b", as illustrated in FIG. 6, also includes a sense amplifier 132 which has bipolar inputs that are respectively coupled by 0.1 micro-Farad ("μF") capacitors 134 to the read/write head leads 126". Accordingly, any electrical signal which varies with time is coupled via the capacitors 134 from the read/write head leads 126" to the inputs of the sense amplifier 132. The sense amplifier 132 supplies bipolar output signals to bipolar inputs of a pulse detector IC 136 via 2200 picofarad ("pF") capacitors 138. The pulse detector IC 136 is preferably a DP8464B Disk Pulse Detector IC manufactured by National Semiconductor Corporation of Santa Clara, Calif. The DP8464B Disk Pulse Detector IC, which is intended for use in hard disk drives, is used in the enhanced-performance floppy diskette drive 22" to accommodate the higher data rates which result from rotation of the floppy diskette 34 by the floppy diskette drive 22" at a maximum speed which is two (2) to three (3) times faster than the 300 RPM maximum speed of the conventional 3½" floppy diskette drive 22.

As described in greater detail in National Semiconductor Corporation literature describing the DP8464B Disk Pulse Detector IC, proper operation of the DP8464B requires that a filter circuit be connected between bipolar outputs 142 of a gain controlled amplifier, included in the DP8464B, and bipolar time channel and gate channel inputs 144 of the DP8464B. Accordingly, each read/write channel 52a" or 52b" illustrated in FIG. 6 includes a pair of 220 ohm ("Ω") resistors 146 one terminal of which is respectively connected to one of the outputs 142. Connected between the other terminals of the resistors 146 is a 150 pF capacitor 148. Connected to each juncture between the terminals of the capacitor 148 with the terminals of the resistors 146 are terminals of 47 micro-Henry ("μH") inductors 152. Connected in parallel between the other terminals of the inductors 152 are a 1000 pF capacitor 154 and a 560 Ω resistor 156. A pair of 0.01 μF capacitors 158 are respectively coupled between the bipolar time channel and gate channel inputs 144 and the junctures of the terminals of the capacitor 154 and the resistor 156 with the terminals of the inductors 152. Experimental tests indicate that the preceding filter connected between the outputs 142 and the inputs 144 provides optimal results at a data rate of 1.0 MHz while a 3½" floppy diskette 34 rotates at nominal speed of 600 RPM.

A 100 kilo-Ohm ("kΩ") resistor 162 connected in parallel with a 0.1 μF capacitor 164 are coupled between an automatic gain control circuit input 166 of the pulse detector IC 136 and circuit ground. The resistor 162 connected in parallel with the capacitor 164 establishes a 10 millisecond time constant for an automatic gain control circuit included in the pulse detector IC 136.

In addition to receiving the output signals from the sense amplifier 132, a not-read/write input 168 of the pulse detector IC 136 also receives the signal present on the write gate signal line 128. When the signal present on the write gate signal line 128 enables the write amplifiers 124a and 124b for transmitting a write current to the read/write head 42", that same signal applied to the not-read/write input 168 also reduces the sensitivity of the gain controlled amplifier included in the pulse detector IC 136, suppresses any output signal from the outputs 142, and freezes the current gain of the automatic gain control circuit included in the pulse detector IC 136.

An encoded data output 172 of the pulse detector IC 136 supplies an output signal to a single ended to differential conversion IC 174. Output signals from the conversion IC 174 are respectively coupled via a pair of read data leads 176 and the floppy diskette drive connector 104" to one of the pairs of Read Data+ and Read Data− signal lines included in the ribbon cable 18".

In addition to the electronic and electro-mechanical differences described thus far between the enhanced-performance floppy diskette drive 22" and the floppy diskette drive 22 and 22', in one embodiment of the present invention a slight modification is also made to the spindle motor 38" of the floppy diskette drive 22" to increase its nominal rotation speed from 300 RPM to 600 RPM, and even to 900 RPM. The conventional floppy diskette drive 22 includes an electronic circuit for energizing the spindle motor 38. This conventional electronic circuit includes a resonant element, either a crystal or a piezoelectric device, for generating an approximately 4.0 MHz motor drive clock signal. Consequently, the nominal speed at which the spindle motor 38" spins the floppy diskette 34 may be increased from 300 RPM to 600 RPM merely by doubling the frequency of this resonant element from 4.0 MHz to 8.0 MHz, and by reducing to approximately one-half, i.e. from 0.47 to 0.22, the capacitance of a feed-back capacitor included in the motor drive electronic circuit. Analogously, the nominal speed at which the spindle motor 38" spins the floppy diskette 34 may be increased to 900 RPM by increasing the frequency of this resonant element to 12.0 MHz, and by reducing to one-third the capacitance of the feed-back capacitor.

Figures 7A, 7B:
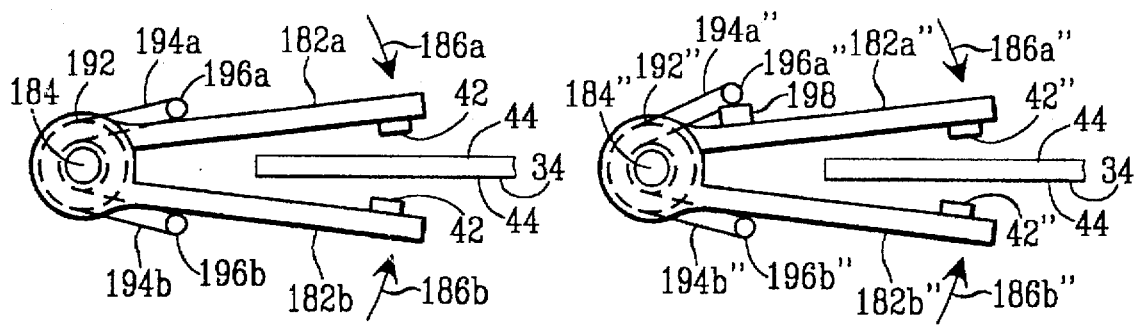
FIG. 7a is an elevational view depicting a portion of a read/write head positioning assembly included in the conventional floppy diskette drive illustrated in FIG. 1.
FIG. 7b is an elevational view depicting a portion of a modified read/write head positioning assembly included in the enhanced-performance floppy diskette drive illustrated in FIG. 3.

Moreover, proper operation of the floppy diskette drive 22" at higher floppy diskette rotation speeds also requires increasing the force which the read/write heads 42" apply to the surfaces 44 of the floppy diskette 34. To operate the floppy diskette drive 22" at a floppy diskette rotation rate of 600, the force which the read/write heads 42" apply to the surfaces 44 is preferably increased from 30 grams to 45 grams. FIG. 7a illustrates pair of mechanical beams 182a and 182b included in the head positioning assembly 46 of a conventional floppy diskette drive 22 manufactured by Teac Corporation to which the read/write heads 42 are secured. The beams 182a and 182b are secured together by a pin 184 for rotation with respect to each other as indicated by curved arrows 186a and 186b. A coil spring 192, which encircles a portion of the pin 184, includes arms 194a and 194b which respectively extend along the beams 182a and 182b away from the pin 184 toward the read/write heads 42. Ends of the arms 194a and 194b furthest from the pin 184 are formed with hooks 196a and 196b which respectively engage the beams 182a and 182b to apply a force to the beams 182a and 182b that urges the read/write heads 42 toward each other. As illustrated in FIG. 7b, in the floppy diskette drive 22" the force applied to the beams 182a" and 182b" by the coil spring 192" is increased by disposing a 0.063 inch thick block 198 between the beam 182a" and the hook 196a" of the coil spring 192", and fastening the block 198 to the beam 182a" with Krazy Glue®.

Figure 8:
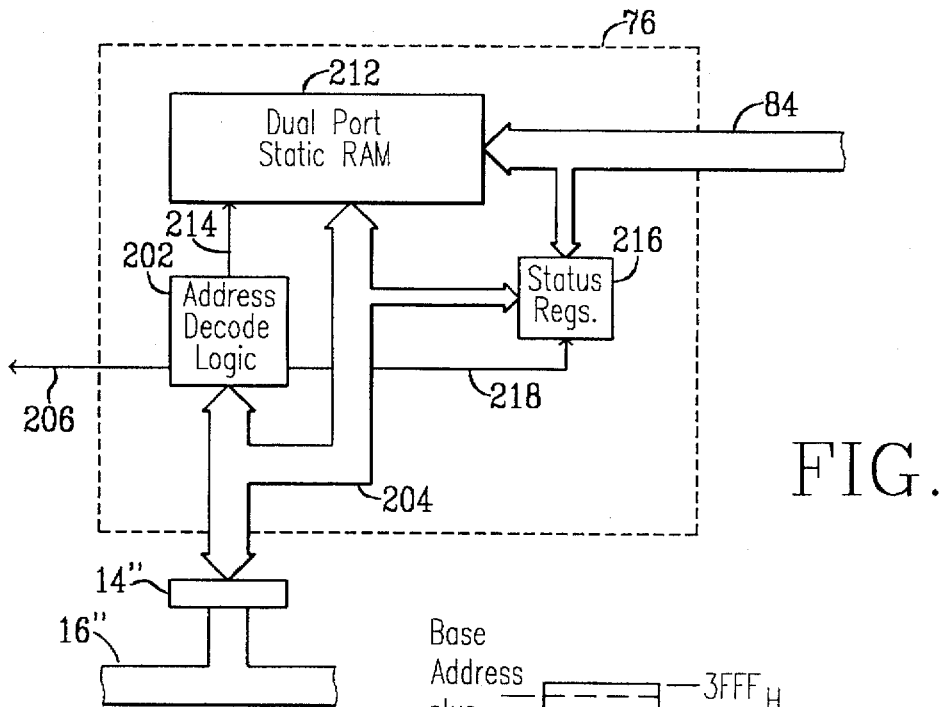
FIG. 8 is a functional type block diagram illustrating a FDC register emulation logic included in the enhanced-performance floppy diskette drive depicted in FIG. 3.

FIG. 8 is a block diagram illustrating in greater detail the FDC register emulation logic 76 depicted in FIG. 3. The FDC register emulation logic 76 includes an address decode logic 202 which is coupled by a host computer bus 204 through the socket 14 to the mother board bus 16. The address decode logic 202 responds to address and control signals present on the mother board bus 16 to transmit selection signals either to the ROM BIOS 92 via a ROM BIOS selection line 206, to a dual port static random access memory ("RAM") 212 via a RAM selection line 214, or to status registers 216 via a status register selection line 218.

Figure 9:
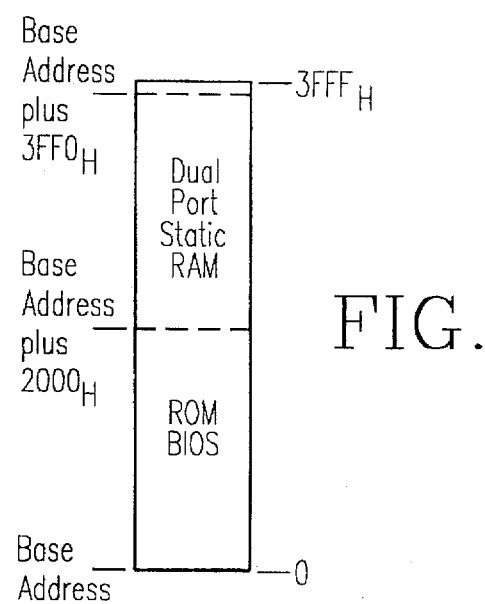
FIG. 9 is a computer memory allocation diagram depicting the address space in which a computer program executed by a host microprocessor accesses the enhanced-performance floppy diskette drive controller illustrated in FIG. 3.

Base address selection switches, not depicted in any of the FIGs., are included in the address decode logic 202 to permit selecting a base address for the floppy diskette controller 12" on the mother board bus 16 within the address space of the host microprocessor of either $C000_H$, $C400_H$, $D000_H$, $D400_H$, or $D800_H$. The addresses for accessing the ROM BIOS 92, the dual port static RAM 212, and the status registers 216 are all related to the selected base address. FIG. 9 is a memory address space diagram which depicts the respective address spaces on the mother board bus 16 of the ROM BIOS 92, of the dual port static RAM 212, and of the status registers 216 in relationship to the selected base address. Addresses on the mother board bus 16 that lie between the base address and the base address plus $1FFF_H$ access the ROM BIOS 92. Addresses on the mother board bus 16 that lie between the base address plus $2000_H$ and the base address plus $3FEF_H$ access the dual port static RAM 212. Addresses on the mother board bus 16 that lie between the base address plus $3FF0_H$ and the base address plus $3FFF_H$ access the status registers 216.

In addition to being coupled to the host computer bus 204, both the dual port static RAM 212 and the status registers 216 are also coupled via the FDC register emulation control bus 84 to the microcontroller 82. Consequently, both the dual port static RAM 212 and the status registers 216 may be accessed independently both by the computer program executed by the host microprocessor and by the computer program executed by the microcontroller 82. Accordingly, the computer program stored in the ROM BIOS 92 and the computer program executed by the microcontroller 82 exchange, via the dual port static RAM 212, data, and command and status information pertinent to storing data onto the floppy diskette 34 and retrieving recorded data from the floppy diskette 34. Alternatively, the computer program stored in the ROM BIOS 92, by writing up to four (4) bits of status information into a register located in the status registers 216 that may be read by the microcontroller 82, provides such status information to the computer program executed by the microcontroller 82. For example, when the interrupt 13 routine in the ROM BIOS 92 is invoked by a computer program executed by the host microprocessor to access the floppy diskette drive 22", the interrupt 13 routine sets a bit in the status registers 216 which indicates to the computer program executed by the microcontroller 82 that the enhanced-performance floppy diskette subsystem 70 is to operate in its high performance mode. If after the interrupt 13 routine completes its execution a computer program executed by the host microprocessor attempts to directly access the 76, the computer program executed by the microcontroller 82 detects such an event and immediately commences operating in a manner identical to that of a conventional floppy diskette subsystem 10. Analogously, the computer program executed in the microcontroller 82, by writing up to four (4) bits of status information into a register located in the status registers 216 that may be read by any computer program executed by the host microprocessor including the computer program stored in the ROM BIOS 92, provides such status information for use by the computer program stored in the ROM BIOS 92.

As described thus far, the enhanced-performance floppy diskette subsystem 70, by concurrently processing both surface 44 of the floppy diskette 34 and by spinning the floppy diskette 34 at a higher rotation speed, is capable of recording data onto the floppy diskette 34, and of reproducing recorded data from the floppy diskette 34 several times faster than that of the conventional floppy diskette subsystem 10. However, certain operating features of the computer program executed by the microcontroller 82 further increase the performance of the enhanced-performance floppy diskette subsystem 70 over that of the conventional floppy diskette subsystem 10. For example, when moving the read/write heads 42 from track to track across the surfaces 44 of the floppy diskette 34, the conventional floppy diskette subsystem 10 waits 15 milliseconds before attempting to record data onto or reproduce data from the floppy diskette 34. Conversely, in the enhanced-performance floppy diskette subsystem 70 the computer program continuously monitors status information present in the floppy diskette controller channels 24a" and 24b", and immediately begins reproducing data from or recording data onto the floppy diskette 34 upon observing that the floppy diskette controller channels 24a" and 24b" no longer report cyclic redundancy check ("CRC") errors in the data being received from the floppy diskette drive 22". By observing the absence of a CRC error in the data which the floppy diskette controller 12" receives from the floppy diskette drive 22", the computer program executed by the microcontroller 82 senses that the read/write heads 42" are properly positioned in relationship to the track on the surface 44 of the floppy diskette 34. In general, this permits accessing the floppy diskette 34 only 5 milliseconds after stepping from one track to the next track rather than waiting the conventional interval of 15 milliseconds.

Similarly, much of the time the spindle motor 38 of a floppy diskette drive 22 is unenergized and the floppy diskette 34 is motionless. The spindle motor 38 is energized only if a computer program executed by the host microprocessor attempts to reproduce data from or record data onto the floppy diskette 34. Upon energizing the spindle motor 38, the conventional floppy diskette subsystem 10 waits approximately 1.2 seconds before attempting to access the floppy diskette 34 for recording or reproducing data. Conversely, the enhanced-performance floppy diskette subsystem 70, again by continuously monitoring status information present in the floppy diskette controller channels 24a" and 24b", is able to begin accessing the floppy diskette 34 approximately 0.5 seconds after first energizing the spindle motor 38".

To permit the enhanced-performance floppy diskette subsystem 70 to swiftly provide data to the microprocessor in the host IBM PC XT or AT, or IBM PC clone computer system, immediately upon insertion of the floppy diskette 34 into the floppy diskette drive 22" in the absence of a request from the computer program executed by the host microprocessor to access the floppy diskette 34, the computer program executed by the microcontroller 82 reads the entire floppy diskette 34 and stores a copy of the data in the cache memory 72. Thus, if a computer program executed by the host microprocessor subsequently requests reproduction of data from the floppy diskette 34, the floppy diskette controller 12" immediately provides such data directly from the cache memory 72. Analogously, if the computer program executed by the host microprocessor requests recording data onto the floppy diskette 34, the computer program executed by the microcontroller 82 immediately stores all the data to be written onto the floppy diskette 34 into the cache memory 72. After such data has been first stored in the cache memory 72, the floppy diskette controller 12" then transfers the data from the cache memory 72 to the floppy diskette drive 22" for recording on the floppy diskette 34.

The preceding features by which the computer program senses when the floppy diskette controller 12 may safely access the floppy diskette 34 in combination both with the higher rotation speed of the floppy diskette 34 and with concurrently processing both surfaces 44 of the floppy diskette 34 permits the enhanced-performance floppy diskette subsystem 70 either to reproduce all the data contained on a 1.44 Mbyte floppy diskette 34 or completely record an entire 1.44 Mbyte floppy diskette 34 in approximately six seconds compared with 30 seconds for the conventional floppy diskette subsystem 10. However, inclusion in an alternative embodiment of the floppy diskette controller 12" of a synthesized generation variable frequency oscillator ("VFO") 222, as depicted in FIG. 3, permits the enhanced-performance floppy diskette subsystem 70 to achieve even greater performance. The VFO 222 is coupled to the microcontroller 82 by a VFO control bus 224 to permit transmission by the computer program executed by the microcontroller 82 of digital data to the VFO 222 which specifies the frequency of a clock signal produced by the VFO 222. In this alternative embodiment of the floppy diskette controller 12, the crystal(s) used in generating the clock signal required for operation of the floppy diskette controller channels 24a" and 24b" are omitted from the floppy diskette controller 12", and the VFO 222 supplies, via a VFO clock output signal line 226, a variable frequency clock signal to both the floppy diskette controller channels 24a" and 24b". Moreover, this same variable frequency clock signal is also supplied via the VFO clock output signal line 226 to a divider 228 which reduces the clock signal to one-sixth (⅙) of that transmitted by the VFO 222. The divider 228 transmits the divided clock signal, via a divided clock signal output line 232, to an alternative embodiment enhanced performance floppy diskette drive 22" via a motor clock signal line optionally included in the ribbon cable 18". Within the floppy diskette drive 22", the divided clock signal replaces the signal provided by the resonant element which is removed from the electronic circuit of the spindle motor 38" of the alternative embodiment floppy diskette drive 22".

With the output signal coupled in this way from the VFO 222 to the floppy diskette controller channels 24a" and 24b" and to the spindle motor 38", upon starting the spindle motor 38 control data transmitted from the microcontroller 82 to the VFO 222 causes the VFO 222 to progressively increase the frequency of the clock signal present on the status register selection line 218. The increasing frequency clock signal from the VFO 222 concurrently supplies the floppy diskette controller channels 24a" and 24b" and the spindle motor 38" with clock signals having a fixed frequency and phase relationship, i.e. one-sixth (6:1). In this way the clock signal produced by the VFO 222 regulates the operation of the floppy diskette controller channels 24a" and 24b" and of the spindle motor 38". Moreover, the VFO 222 by supplying the floppy diskette controller channels 24a" and 24b" with an increasing frequency clock signal automatically compensates the PLLs included in the floppy diskette controller channels 24a" and 24b" for the changing rate at which data signals are reproduced from the floppy diskette 34 as the spindle motor 38" accelerates the floppy diskette 34 up to its maximum speed. Because the PLLs included in the floppy diskette controller channels 24a" and 24b" and the data reproduced from the floppy diskette 34 are both kept in phase, the floppy diskette controller channels 24a" and 24b"

operate over a speed range for the floppy diskette 34 which is limited primarily by the strength of the electrical signal generated in the read/write heads 42" due to rotation of the floppy diskette 34. Consequently, upon starting the spindle motor 38 this alternative embodiment of the floppy diskette controller 12" begins accessing the floppy diskette 34 in the alternative embodiment floppy diskette drive 22" sooner than a floppy diskette controller 12" which employs only a fixed frequency clock signal for the floppy diskette controller channels 24a" and 24b" and for the spindle motor 38".

It should be apparent that while including the ROM BIOS 92 in the floppy diskette controller 12" is helpful, a functional enhanced-performance floppy diskette subsystem 70 may be assembled which omits the ROM BIOS 92. In such an enhanced-performance floppy diskette subsystem 70, the computer program executed by the microcontroller 82 must periodically interrogate the FDC register emulation logic 76 to determine when a computer program executed by the host microprocessor attempts to access the floppy diskette drive 22". Analogously, whenever the computer program executed by the microcontroller 82 is occupied servicing the floppy diskette controller channels 24a" and 24b", that computer program must first store data into the FDC register emulation logic 76 emulating a busy condition for the floppy diskette controller channel 24 included in the floppy diskette controller 12. Correspondingly, when the computer program executed by the microcontroller 82 is no longer occupied servicing the floppy diskette controller channels 24a" and 24b", that computer program then must store data into the FDC register emulation logic 76 which clears the previously established busy condition.

The floppy diskette drive 22" preferably employs the solenoid 94 and the pin 96 which lock the diskette eject button 98 to prevent ejection of the floppy diskette 34 before all data present in the cache memory 72 has been recorded on the floppy diskette 34 because in the event of a power failure in the host computer the floppy diskette 34 may still be easily removed from the floppy diskette drive 22". However, an alternative technique is to replace the diskette eject button 98 and the solenoid 94 with an electrically energized mechanism for ejecting the floppy diskette 34 from the floppy diskette drive 22". For a floppy diskette drive 22" employing such an alternative technique for ejecting the floppy diskette 34, the computer program executed by the microcontroller 82 blocks energization of the mechanism for ejecting the floppy diskette 34 while data to be recorded on the floppy diskette 34 remains in the cache memory 72.

While the floppy diskette controller 12' has been disclosed as being assembled from several ICs, it is readily apparent that the floppy diskette controller channels 24a" and 24b", the FDC register emulation logic 76, the microcontroller 82, and the ROM BIOS 92 could be incorporated into an application specific integrated circuit ("ASIC"). Similarly, the VFO 222 and the divider 228 could also be incorporated into such an ASIC. Analogously, the two read/write channels 52a" and 52b" included in the floppy diskette drive 22" could also be incorporated into a single ASIC.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

DOCKET NO. 2055

BIOS COMPUTER PROGRAM LISTING

MODULE BIOSDATA.INC

```
_ABS0    SEGMENT       AT 0H org  4*01EH
@disk_pointer  dd    ?

IF HOOKS_INT40H
    org  4*040H
    ELSE
    org  4*060H
    ENDIF
@disk_vector   dd    ?

org  043EH
@seek_status       db    ?
@motor_status      db    ?
@motor_count       db    ?
@dskette_status    db    ?
@fdc_status        db    7 dup(?)

; additional media data
    org  048BH
@lastrate          db    ?
@hf_status         db    ?
@hf_error          db    ?
@hf_int_flag       db    ?
@hf_cntrl          db    ?
@dsk_state         db    4 dup(?)
@dsk_trk           db    2 dup(?)

org  04A0H
@rtc_wait_flag     db    ?

_ABS0    ENDS
```

MODULE DUALMEM.INC

```
PAGE 60,132
TITLE Turbo Floppy Disk Controller. CSC Copyright(C) 1995.
;*******************************************************************
;
; DUALMEM.INC - defines dual memory data structures
;
;*******************************************************************

BUFFER_OFFSET    EQU    2150H        ;

; Flags
FL_PC_REQUEST    EQU    08H
FL_PC_RESPONSE   EQU    04H
```

- 31 -

DOCKET NO. 2055

```
FL_MC_READY     EQU    08H
FL_MC_RESPONSE  EQU    04H

REQUEST    STRUCT                          ; see int13h
   cmd       db ?     ; command      ; AH
   drive        db ?     ; drive #      ; DL
   head         db ?     ; head #       ; DH
   track        db ?     ; track #      ; CH
   sector       db ?     ; sector #     ; CL
   sect_count   db ?     ; sector count           ; AL
REQUEST ENDS RESPONSE  STRUCT
   res_seek_status     db ?      ; drive recalibration status
   res_motor_status    db ?      ;
   res_motor_count     db ?              ; time out
   res_dskette_status  db ?              ;
;  res_timer_count     db ?
   res_dsk_trk         dw ?
   res_dsk_state       dw ?
   res_fdc_status         db    10 dup (?)
   res_lastrate        db    ?
   res_sec_rd_wrtn     db    ?   ; number sectors read or written -> AL
RESPONSE  ENDS ; Diskette Parameter Table
; This 10-byte structure is also known as the "Disk Base Table."
; It specifies a variety of critical variables for diskette drives.

DSKTAB    STRUCT
   srt_unload   db ? ; bits 0-3: SRT (step rate time); bits 4-7: head unload time
   dma_load     db ? ; bit 0: 1=use DMA; bits 2-7: head load time
   motor_wait   db ? ; motor wait (55-ms increments before turning off disk motor)
   sector_size  db ? ; sector size (0=128, 1=256, 2=512, 3=1024)
   eot       db ? ; EOT (last sector on a track)
   gap_len      db ? ; gap length for read/write operations
   dtl       db ? ; DTL (Data Transfer Length) max transfer when length not set
   dtlfmt       db ? ; gap length for format operation
   fill_fmt  db ? ; fill character for format (normally 0f6H '÷')
   head_settle  db ? ; head-settle time (in milliseconds)
   motor_start  db ? ; motor-startup time (in 1/8th-second intervals)
DSKTAB    ENDS DBG_REG   STRUCT
   regs         db    16 dup (?)    ; 'AXBXCXDXSIDISPBP'
                db 16 dup (?)
   segs         db    16 dup (?)    ; 'CS DS ES SS FL  '
                db 16 dup (?)
DBG_REG   ENDS
```

- 32 -

DOCKET NO. 2055

MODULE PCDEBUG.INC

HOOKS_INT40H    EQU  1

MODULE PCDEFS.INC

PAGE 60,132
TITLE Turbo Floppy Disk Controller. CSC Copyright(C) 1995.
;****************************************************************
;
; PCDEFS.ASM - defines for PC
;
;****************************************************************

```
bptr equ  byte ptr
wptr equ  word ptr
dptr equ  dword ptr

; assume cs = segment TFLPBIOS

MC_STATUS EQU  3FF0H
PC_STATUS EQU  3FF0H

SZSECTOR  EQU  512

; FNC_TAB equates only for check AH in INT13H and return BAD_CMD without
; sending request to FDC DISK_RESET      EQU  00     ; reset disk system
DISK_STATUS     EQU  01     ; get disk system prev status
DISK_READ  EQU  02     ; read
DISK_WRITE      EQU  03     ; write
DISK_VERF       EQU       0FFH;04  ; verify
DISK_FORMAT     EQU  0FFH;05    ; format
DISK_PARMS      EQU       0FFH;08  ; read drive parameters
DISK_RECAL      EQU       0FFH;11H ; recalibrate drive
MC_RAM          EQU       0FFH;12H ; MC RAM diagnostic
MC_DRIVE        EQU       0FFH;13H ; MC drive diagnostic
MC_DIAGS        EQU       0FFH;14H ; MC internal diagnostic
DISK_TYPE       EQU       0FFH;15H ; read DASD type
DISK_CHANGE     EQU       0FFH;16H ; diskette change line status
FORMAT_SET      EQU  0FFH;17H ; set DASD type for format
FNC_ERR         EQU  0FFH ; INT 13H returns with the Carry Flag set (CF=CY=1) when service failed and
; it places one of the following error codes in AH. These are also the values
; returned when disk status is requested (SubFn 00H).

;--------------     DISKETTE ERRORS
NO_ERR          EQU 00H  ; no error on last operation
BAD_CMD         EQU 01H  ; bad command: invalid request to controller
BAD_ADDR_MARK   EQU 02H  ; bad address mark
WRITE_PROTECT   EQU 03H  ; write protect: attempted to write on write-protected
diskette
RECORD_NOT_FND  EQU 04H  ; sector ID bad or not found.
MEDIA_CHANGE    EQU 06H  ; diskette was removed
```

- 33 -

```
BAD_DMA          EQU 08H  ; DMA failure
DMA_OVERRUN      EQU 08H
DMA_BOUNDARY     EQU 09H  ; DMA overrun: attempted to write across a 64K-byte
boundary.
BAD_CRC          EQU 10H  ; bad CRC: invalid CRC when data checked.
BAD_FDC          EQU 20H  ; controller failure
BAD_SEEK    EQU 40H  ; bad seek.  requested track not found
TIME_OUT    EQU 80H  ; time out.  drive did not respond
; only for fixed disk ?        RESET_FAILED    EQU 05H  ; reset failed
```

MODULE TAL.INC

```
;************ type (tty) AL (hex) **********
;     mov al,code
;     call ttal
;*******************************************
TTAL PROC push cx
    push ax
    mov  cx,4
    shr  al,cl
    call hexit
    pop  ax
    push ax
    and  al,0fh
    call hexit
    pop  ax
    pop  cx
    ret HEXIT     PROC
        or   al,30h
        cmp  al,3ah
        jl   yes1
        add  al,7
    yes1:
        mov  ah,0eh
        int  10h
        ret
    HEXIT     ENDP
TTAL ENDP
```

MODULE TAX.INC

```
;************ type (tty) AX (hex) **********************
;     mov  ax, code
;     call ttax
;*******************************************************
TTAX PROC push ax
    push ax
```

- 34 -

DOCKET NO. 2055

```
        mov   al,ah
        call  ttal
        pop   ax
        call  ttal
        pop   ax
        ret

TTAL PROC push cx
            push ax
            mov  cx,4
            shr  al,cl
            call hexit
            pop  ax
            push ax
            and  al,0fh
            call hexit
            pop  ax
            pop  cx
            ret HEXIT    PROC
                or   al,30h
                cmp  al,3ah
                jl   yes1
                add  al,7
            yes1:
                mov  ah,0eh
                int  10h
                ret
            HEXIT    ENDP
        TTAL ENDP
TTAX ENDP
```

MODULE TFDC.INC

```
PAGE 60,132
TITLE Turbo Floppy Disk Controller. CSC Copyright(C) 1995.
;*****************************************************************
;
; TFDC.INC - File defines turbo floppy controller constants
;
;*****************************************************************

NOFIFO         EQU   0
MOTOR_STARTUP  EQU   1000 ; wait 1 second
SZSECTOR       EQU   512

; FOR DEBUG WITH LOGIC ANALYZER
RESETINT   EQU   0

TRG_INT        EQU   0

TRGF1     MACRO
     push ax
```

- 35 -

DOCKET NO. 2055

```
        push dx
        mov  dx, F1+MSR
        in   al, dx
        pop  dx
        pop  ax
ENDM
;--------------------------------

;------- REGISTERS
SRA  EQU  0
SRB  EQU  1
DOR  EQU  2
TDR  EQU  3
MSR  EQU  4
DSR  EQU  4
FIFO EQU  5
DIR  EQU  7
CCR  EQU  7

;------- MAIN STATUS REGISTER (MSR) READ ONLY
;              76543210
MSR_RQM           EQU  10000000b
MSR_DIO           EQU  01000000b
MSR_NONDMA        EQU  00100000b
MSR_CMDPROG       EQU  00010000b
MSR_DRV3_BUSY     EQU  00001000b
MSR_DRV2_BUSY     EQU  00000100b
MSR_DRV1_BUSY     EQU  00000010b
MSR_DRV0_BUSY     EQU  00000001b

;------- COMMANDS FDC
CMD_SENSE_INT   EQU  008H

CMD_SPECIFY     EQU  003H

CMD_READ    EQU  046H      ; 0C6H
CMD_WRITE   EQU  045H      ;
CMD_VERIFY       EQU     056H      ;
CMD_READ_TRACK   EQU  042H
;CMD_RD_WR_VF1 EQU   080H ; IPS/EC = 1

IF NOFIFO
CMD_CONFIG0       EQU  013H      ;
CMD_CONFIG1       EQU  000H ;
CMD_CONFIG2       EQU  020H      ; EIS=0 FIFO=0 THRESH=8
CMD_CONFIG3       EQU  000H          ; PRETRK=0

CMD_MODE0 EQU   001H       ;
CMD_MODE1 EQU   002H
CMD_MODE2 EQU   0E0H
CMD_MODE3 EQU   040H
CMD_MODE4 EQU   000H
ELSE
CMD_CONFIG0       EQU  013H      ;
CMD_CONFIG1       EQU  000H ;
CMD_CONFIG2       EQU  008H      ; EIS=0 FIFO=0 THRESH=8
CMD_CONFIG3       EQU  000H          ; PRETRK=0
```

- 36 -

DOCKET NO. 2055

```
CMD_MODE0    EQU    001H     ;
CMD_MODE1    EQU    002H
CMD_MODE2    EQU    000H
CMD_MODE3    EQU    040H
CMD_MODE4    EQU    000H
ENDIF

CMD_SEEK     EQU    00FH
CMD_DUMPREG         EQU    00EH
CMD_RECAL    EQU    007H
CMD_LOCK     EQU    094H
CMD_READ_ID         EQU    04AH

; INT 13H returns with the Carry Flag set (CF=CY=1) when service failed and
; it places one of the following error codes in AH. These are also the values
; returned when disk status is requested (SubFn 00H).

;--------------  DISKETTE ERRORS
NO_ERR              EQU  00H  ; no error on last operation
BAD_CMD             EQU  01H  ; bad command: invalid request to controller
BAD_ADDR_MARK       EQU  02H  ; bad address mark
WRITE_PROTECT       EQU  03H  ; write protect: attempted to write on write-protected
diskette
RECORD_NOT_FND      EQU  04H  ; sector ID bad or not found.
MEDIA_CHANGE        EQU  06H  ; diskette was removed
BAD_DMA             EQU  08H  ; DMA failure
DMA_OVERRUN         EQU  08H
DMA_BOUNDARY        EQU  09H  ; DMA overrun: attempted to write across a 64K-byte
boundary.
BAD_CRC             EQU  10H  ; bad CRC: invalid CRC when data checked.
BAD_FDC             EQU  20H  ; controller failure
BAD_SEEK     EQU  40H  ; bad seek.  requested track not found
TIME_OUT     EQU  80H  ; time out.  drive did not respond
; only for fixed disk ?      RESET_FAILED    EQU 05H  ; reset failed ;--------------- DISKETTE EQUATES
END_OF_TRACK    EQU    80H
DUAL       EQU    01H
INT_FLAG   EQU    80H
DSK_CHG         EQU    80H
DETERMINED      EQU    20H
HOME       EQU    20H
SENSE_DRV_ST    EQU    04H
TRK_SLAP   EQU    30H
QUIET_SEEK      EQU    0AH
MAX_DRV         EQU    2
HD12_SETTLE     EQU    15
HD320_SETTLE    EQU    20
;MOTOR_WAIT     EQU    37

;--------------- MEDIA/DRIVE STATE INDICATORS
TRK_CAPA   EQU    01H
FMT_CAPA   EQU    02H
DRV_DET         EQU    04H
MED_DET         EQU    10H
DBL_STEP   EQU    20H

RATE_MSK   EQU    0C0H
```

- 37 -

DOCKET NO. 2055

```
RATE_500    EQU    00H
RATE_250    EQU    80H

STRT_MSK    EQU    00CH
SEND_MSK    EQU    0C0H

H           EQU    256
X           EQU    H+1
```

MODULE TTAX.INC

```
IF 0
print_text     proc near USES ax ds es si di cx bx
     pushf
     mov  ax, cs
     mov  ds, ax mov  ah, 9
     int  21h
     popf
     ret
print_text     endp
ENDIF print_text     proc near USES ax bx
     pushf
@@:
     mov  al, bptr cs:[bx]
     cmp  al, '$'
     jz   @f
     mov  ah, 0eh
     int  10h
     inc  bx
     jmp  @b
;    mov  ah, 9
;    int  21h
@@:
     popf
     ret
print_text     endp
;************ type (tty) AX (hex) ***********************
;    mov  ax, code
;    call ttax
;********************************************************
TTAX PROC NEAR USES ds es si di dx bx
     pushf
     push ax
     push ax
     mov  al,ah
     call ttal
     pop  ax
     call ttal
     pop  ax
     popf
     ret
TTAX ENDP
```

- 38 -

DOCKET NO. 2055

```
TTAB  PROC NEAR USES ds es si di dx bx
      pushf
      push ax
      call ttal
      pop  ax
      popf
      ret
TTAB  ENDP TTAA  PROC NEAR USES ds es si di dx bx cx ax
      and  al, 0fh
      call hexit
      ret
TTAA  ENDP TTAL  PROC
      push cx
      push ax
      mov  cx,4
      shr  al,cl
      call hexit
      pop  ax
      push ax
      and  al,0fh
      call hexit
      pop  ax
      pop  cx
      ret

TTAL  ENDP

HEXIT     PROC
      push dx
      or   al,30h
      cmp  al,3ah
      jl   yes1
      add  al,7
yes1:
      mov  ah,0eh
      int  10h
;     mov  dl, al
;     mov  ah, 02
;     int  21h
      pop  dx
      ret
HEXIT     ENDP prbuf_bl  db     ' ','$'
prbuf_col db     ':','$'
prbuf_nl  db     0dh,0ah,'$'
      ALIGN PRBUF     PROC NEAR
      push cx
      push dx
      push bx
      push si
```

DOCKET NO. 2055

```
        push ax
        xor  bx,bx
        xor  dx,dx
prbuf_pr_loop_@:
        or   cx,cx
        jne  prbuf_pr_char_@ puts prbuf_nl
        pop  ax
        pop  si
        pop  bx
        pop  dx
        pop  cx
        ret prbuf_pr_char_@:
        or   bx,bx
        jne  prbuf_no_nl_@
        puts prbuf_nl
        mov  bx, 16
        mov  ax,dx
        call ttax puts prbuf_col
        puts prbuf_bl
prbuf_no_nl_@:
        mov  al, es:[si]
        inc  si
        call ttab puts prbuf_bl inc  dx
        dec  bx
        dec  cx
        jmp  prbuf_pr_loop_@

PRBUF   ENDP
```

MODULE 80188.ASM

```
        .MODEL   TINY
        include defs188.inc
        include pcbmap.inc
        include dualmem.inc
        include tfdc.inc include memdata.asm

.286

CODE SEGMENT    BYTE PUBLIC     'CODE'
        ASSUME   CS:CODE, DS:_MCDATA
        ORG  0000H banner  db      'CSC Turbo Floppy 1995'
```

- 40 -

DOCKET NO. 2055

```
IFDEF DEBUG
      include debug.inc
      ORG  020H
      include req_data.asm      ; for debug
      include debug.asm
fw_start:
      include maindeb.asm
ELSE
fw_start:
      include mainloop.asm
ENDIF IFDEF DEBUG
stop_loop:
      jmp  stop_loop
ENDIF include   busy.asm
      include   handlers.asm
      include   fldriver.asm
      include   drvfunc.asm
      include   testdrv.asm
      include   dmasetup.asm
;****************************************************************
      ORG  0fc00H
cpu_init:
      include testcpu.asm
      include init_cu.asm
      include memtest.asm
      include   stack.asm
      include init_vec.asm
      include init_fdc.asm
      include   init_tim.asm
      jmp  fw_start START     LABEL     NEAR
;------- POWER ON
      ORG  0FFF0h DB   0EAH
      DW   OFFSET    cpu_init
      DW   0F000H date db    '02/28/95'

ORG  0FFFFH
ch_sum   db      0FH

CODE ENDS

END
```

DOCKET NO. 2055

MODULE BANNER.ASM

```
PAGE 60,132
TITLE Turbo Floppy Disk Controller. CSC Copyright(C) 1995.
;*******************************************************************
;
; BANNER.ASM - initialization
;
;*******************************************************************

; banner
    push ax
    push bx
    push cx lea  bx, banner
@@:
    mov  ah, 0eh
    mov  al, bptr cs:[bx]
    cmp  al, '$'
    jz   ban_ex
    int  10h
    inc  bx
    jmp  @b banner       db   13, 10, 0c9h
             db   76 dup (0cdh)
             db   0bbh, 13,10, 0bah
db ' CSC Turbo Floppy Disk Controller                              beta  Rev. 0.0.0 '
             db   0bah, 13, 10, 0bah
db ' Copyright 1995 by CSC. All Rights Reserved.                                     '
             db   0bah, 13, 10, 0c8h
             db   76 dup (0cdh)
             db   0bch, 13, 10, '$'
ban_ex:
    pop  cx
    pop  bx
    pop  ax
```

MODULE BIOSDATA.ASM

```
_ABS0   SEGMENT    AT 0H org 4*01EH
@disk_pointer   dd   ?

IF HOOKS_INT40H
    org 4*040H
ELSE
    org 4*060H
ENDIF
@disk_vector    dd   ?

org 043EH
@seek_status        db   ?
```

- 42 -

DOCKET NO. 2055

```
    @motor_status        db   ?
    @motor_count         db   ?
    @dskette_status           db   ?
    @fdc_status          db   7 dup(?)

; additional media data
        org  048BH
    @lastrate        db   ?
    @hf_status            db   ?
    @hf_error        db   ?
    @hf_int_flag          db   ?
    @hf_cntrl        db   ?
    @dsk_state            db   4 dup(?)
    @dsk_trk         db   2 dup(?)

org  04A0H
    @rtc_wait_flag       db   ?

_ABSO    ENDS

MODULE CHKSUMFL.ASM

; open file 'path'
; calculate sum 100 hex
; write sum into last byte
; close file .MODEL   SMALL
        .286
    _TEXT    SEGMENT   WORD PUBLIC   'CODE'
        ORG  100H
        ASSUME    CS:_TEXT, DS:_TEXT

SZFILE       EQU  2000H

START:
        call read_file
        jc   er
        call chk_sum
        call write_file
        jc   er mov  ah, 9h
        lea  dx, mess
        int  21h
        mov  ax, chksum
        call ttax
        mov  ah, 0
    ;   int  16h
    er:
        int  20h READ_FILE PROC NEAR
        push cs
        pop  ds
```

DOCKET NO. 2055

```
        lea   dx, path
        mov   ah, 3Dh
        mov   al, 2
        int   21h
        jc    open_ex mov   handle, ax
        mov   bx, ax
        mov   ah, 3FH
        mov   cx, SZFILE
        lea   dx, buf
        int   21h
open_ex:
        ret
READ_FILE  ENDP CHK_SUM          PROC NEAR
        lea   bx, buf
        xor   ax, ax
        mov   cx, SZFILE
l1:
        add   al, byte ptr [bx]
        inc   bx
        loop  l1
        sub   ah, al
        dec   ah
        dec   bx
        mov       byte ptr [bx], ah
        mov   chksum, ax
        ret
CHK_SUM          ENDP WRITE_FILE       PROC NEAR
        mov   bx, handle
        mov   ah, 42h
        mov   cx, 0
        mov   dx, 0
        mov   al, 0
        int   21h
        jc    wr_er mov   bx, handle
        mov   ah, 40h
        mov   cx, SZFILE
        lea   dx, buf
        int   21h
        jc    wr_er mov   ah, 3eh
        mov   bx, handle
        int   21h
wr_er:
        ret
WRITE_FILE       ENDP handle      dw   0
chksum      dw   0
path  db   'tflpbios.rom', 0
```

- 44 -

DOCKET NO. 2055

```
mess    db      13, 10, 'CheckSum D000: 0 - 1FFFH: ', '$'
        include tax.inc buf     db      SZFILE dup (0)

_TEXT   ENDS
        END     START
```

MODULE FNC_TAB.ASM

```
PAGE 60,132
TITLE Turbo Floppy Disk Controller. CSC Copyright(C) 1995.
;*****************************************************************
;
; FNC_TAB.ASM - INT13H functions
;
;*****************************************************************

;------------------------------------------------------------------
FNC_TAB  dw   DISK_RESET              ; 00H reset disk system
         dw   DISK_STATUS             ; 01H get disk system prev status
         dw   DISK_READ               ; 02H read
         dw   DISK_WRITE              ; 03H write
         dw   DISK_VERF               ; 04H verify
         dw   FNC_ERR;DISK_FORMAT        ; 05H format
         dw   FNC_ERR                 ; 06H
         dw   FNC_ERR                 ; 07H
         dw   FNC_ERR;DISK_PARMS         ; 08H read drive parameters
         dw   FNC_ERR                 ; 09H
         dw   FNC_ERR                 ; 0AH
         dw   FNC_ERR                 ; 0BH
         dw   FNC_ERR                 ; 0CH
         dw   FNC_ERR                 ; 0DH
         dw   FNC_ERR                 ; 0EH
         dw   FNC_ERR                 ; 0FH
         dw   FNC_ERR                 ; 10H
         dw   FNC_ERR;DISK_RECAL         ; 11H recalibrate drive
         dw   FNC_ERR;MC_RAM             ; 12H MC RAM diagnostic
         dw   FNC_ERR;MC_DRIVE           ; 13H MC drive diagnostic
         dw   FNC_ERR;MC_DIAGS           ; 14H MC internal diagnostic
         dw   FNC_ERR;DISK_TYPE          ; 15H read DASD type
         dw   FNC_ERR;DISK_CHANGE        ; 16H diskette change line status
         dw   FNC_ERR;FORMAT_SET         ; 17H set DASD type for format
FNC_TAE  EQU  $
```

DOCKET NO. 2055

MODULE INIT_PC.ASM

```
PAGE 60,132
TITLE Turbo Floppy Disk Controller. CSC Copyright(C) 1995.
;*****************************************************************
;
; INIT_PC.ASM - initialization
;
;*****************************************************************
      push  ds
      push  es
      push  ax
      push  bx ; hooks interrupt 40h
      mov   ax, SEG _ABS0
      mov   ds, ax
      lea   ax, int_40h
      mov   wptr @disk_vector, ax
      mov   ax, cs
      mov   wptr @disk_vector+2, ax IFDEF DEBUG
      Print   13, 10, '! Hello, Igor!',13,10
      call  dumpregs
ENDIF
      pop   bx
      pop   ax
      pop   es
      pop   ds call  clr_busy
```

MODULE INT_40H.ASM

```
PAGE 60,132
TITLE Turbo Floppy Disk Controller. CSC Copyright(C) 1995.
;*****************************************************************
;
; INT_40H.ASM - int 13h for diskette
;
;*****************************************************************

SI_TRC          EQU  1
DEL_TIMEOUT     EQU  3

;-----------------------------------------------------------------
; INT_40H int13h for diskette
;
; EXIT: AH = dskette_status, AL = # sectors
;       CY = 0 if dskette_status == 0
;       CY = 1 if dskette_status != 0
;       ES:BX -> DATA
;-----------------------------------------------------------------
INT_40H         PROC FAR  USES DS SI DI
      sti
```

- 46 -

DOCKET NO. 2055

```
        .IF DL & 80H
        ret 2
        .ENDIF
        push cs
        pop  ds
        mov  di, ax IFDEF DEBUG
        Print      'N '
        call dumpregs
ENDIF
        call check_req IF SI_TRC
        mov  si, 1
ENDIF
        jc      int_ex call mc_ready
IF SI_TRC
        mov  si, 2
ENDIF
        jc      int_ex call send_req
IF SI_TRC
        mov  si, 3
ENDIF
        jc      int_ex ;       mov  ah, BAD_CMD
;       stc call wait_res
IF SI_TRC
        mov  si, 4
ENDIF
        jc      int_ex
        call get_response
IF SI_TRC
        mov  si, 5
ENDIF int_ex:

IFDEF DEBUG
        pushf
        Print      'X '
        call dumpregs
        popf
ENDIF ret 2
INT_40H         ENDP ;-----------------------------------------------------------------
; CHECK_REQ    check request before send to MC
```

- 47 -

DOCKET NO. 2055

```
;
; ENTRY:  AH = function of int13h
;
; EXIT:   CY = 1, AH = BAD_CMD
;         CY = 0, OK
;-------------------------------------------------------------------
CHECK_REQ PROC NEAR USES BX CX
      cmp  ah, (fnc_tae - fnc_tab)/2
      jb   ok_func
bad_fnc:
      mov  ah, BAD_CMD
      stc
      jmp  ch_ex
ok_func:
      mov  cl, ah
      xor  ch, ch
      shl  cl, 1
      lea  bx, fnc_tab
      add  bx, cx
      cmp  wptr [bx], FNC_ERR
      jz   bad_fnc
      clc
ch_ex:
      ret
CHECK_REQ ENDP ;-------------------------------------------------------------------
; MC_READY     test MC ready before send request
;
; EXIT:   CY = 1 MC is busy, AH = TIME_OUT
;         CY = 0 MC is ready
;-------------------------------------------------------------------
; OK
MC_READY  PROC NEAR USES BX CX SI
      mov  si, MC_STATUS
      mov  bl, DEL_TIMEOUT
      xor  cx, cx
@@:
      test bptr [si], FL_MC_READY
      jnz  @f
      loop @b
      dec  bl
      jnz  @b
      mov  ah, TIME_OUT
      mov  bptr [si], 0
      stc
      jmp  mcb_ex
@@:
      clc
mcb_ex:
      ret
MC_READY  ENDP ;-------------------------------------------------------------------
; SEND_REQ     send request to MC and set FL_PC_REQUEST
;
; EXIT:   CY = 1 - FAIL,  AH = TIME_OUT
;         CY = 0 - OK
```

- 48 -

DOCKET NO. 2055

```
;-------------------------------------------------------------------
SEND_REQ  PROC NEAR
      call set_busy
      jc   sr_er
      lea  si, req mov  [si].cmd, ah
      mov  [si].drive, dl
      mov  [si].head, dh
      mov  [si].track, ch
      mov  [si].sector, cl
      mov  [si].sect_count, al
sr_ex:
      mov  si, PC_STATUS
      mov  bptr [si], FL_PC_REQUEST ; call    clr_busy
      clc
      ret
sr_er:
      mov  ah, TIME_OUT
      stc
      ret
SEND_REQ  ENDP ;-------------------------------------------------------------------
; WAIT_RES     wait response from MC
;
; EXIT:   CY = 0, response is ready
;         CY = 1, AH = TIME_OUT drive not ready
;-------------------------------------------------------------------
WAIT_RES  PROC NEAR USES BX CX SI
      mov  si, MC_STATUS
      mov  bl, DEL_TIMEOUT
      xor  cx, cx
@@:
      test bptr cs:[si], FL_MC_RESPONSE
      jnz  @f
      loop @b
      dec  bl
      jnz  @b
      mov  ah, TIME_OUT
;:
      mov  bptr cs:[si], 0
      stc
      jmp  mcwt_ex
@@:
      clc
mcwt_ex:
      ret
WAIT_RES  ENDP ;-------------------------------------------------------------------
; GET_RESPONSE
;
; Copy response to PC registers, data to ES:BX, status to BIOS
; data area and DPT to DOS
;
; ENTRY: dual memory is locked by PC
; EXIT:  dual memory is unlocked by PC
```

- 49 -

DOCKET NO. 2055

```
;----------------------------------------------------------------
GET_RESPONSE   PROC NEAR
    call set_busy
    jc   gr_er ; copy drive status to DOS
    call stat2dos
    jc   pr_er ; copy DPT to DOS
    PUSHF
    call dpt2dos ; copy data to DOS
    push dx
    mov  dx, di                ; restore #function int13h
IF 0;DEF DEBUG
    Print    'DATA: '
    call dumpregs
ENDIF
    .IF  (DH == 02h)
        call data2dos
    .ENDIF
    pop  dx
    POPF
pr_er:
    pushf
    mov  si, PC_STATUS
    mov  bptr [si], FL_PC_RESPONSE
    popf
    ret
gr_er:
    mov  si, PC_STATUS
    mov  bptr [si], FL_PC_RESPONSE
    mov  ah, TIME_OUT
    stc
    ret
GET_RESPONSE   ENDP ;----------------------------------------------------------------
; STAT2DOS    copy status of operation to BIOS data area
;
; EXIT: AH = res_dskette_status
;       CY = 0 if res_dskette_status == 0
;       CY = 1 if res_dskette_status != 0
;----------------------------------------------------------------
STAT2DOS  PROC NEAR USES DS ES SI
    mov  si, SEG _ABS0
    mov  es, si
    lea  si, res
IF 0
 res_seek_status    db ?    ; drive recalibration status
 res_motor_status   db ?    ;
 res_motor_count    db ?         ; time out
 res_dskette_status db ?         ;
; res_timer_count   db ?         ;
 res_dsk_trk        dw ?
 res_dsk_state      dw ?
```

- 50 -

DOCKET NO. 2055

```
    res_fdc_status          db   10 dup (?)
ENDIF
    mov   al, bptr [si].res_seek_status
    mov   bptr es:@seek_status, al mov   al, bptr [si].res_motor_status
    mov   bptr es:@motor_status, al mov   al, bptr [si].res_motor_count
    mov   bptr es:@motor_count, al mov   al, bptr [si].res_dskette_status
    mov   bptr es:@dskette_status, al ;   mov   al, bptr [si].res_timer_count
;   mov   bptr es:@timer_count, al mov   al, bptr [si].res_dsk_trk
    mov   bptr es:@dsk_trk, al
    mov   al, bptr [si].res_dsk_trk+1
    mov   bptr es:@dsk_trk+1, al mov   al, bptr [si].res_dsk_state
    mov   bptr es:@dsk_state, al
    mov   al, bptr [si].res_dsk_state+1
    mov   bptr es:@dsk_state+1, al mov   al, bptr [si].res_fdc_status
    mov   bptr es:@fdc_status, al
    mov   al, bptr [si].res_fdc_status+1
    mov   bptr es:@fdc_status+1, al
    mov   al, bptr [si].res_fdc_status+2
    mov   bptr es:@fdc_status+2, al
    mov   al, bptr [si].res_fdc_status+3
    mov   bptr es:@fdc_status+3, al
    mov   al, bptr [si].res_fdc_status+4
    mov   bptr es:@fdc_status+4, al
    mov   al, bptr [si].res_fdc_status+5
    mov   bptr es:@fdc_status+5, al
    mov   al, bptr [si].res_fdc_status+6
    mov   bptr es:@fdc_status+6, al mov   al, bptr [si].res_lastrate
    mov   bptr es:@lastrate, al ; check   CY of operation dskette_status
    mov   ah, bptr [si].res_dskette_status
    mov   al, bptr [si].res_sec_rd_wrtn
    .IF (ah == 0)
        clc
    .ELSE
        stc
    .ENDIF
    ret
STAT2DOS  ENDP
;----------------------------------------------------------------
; DPT2DOS copy DPT to DOS
```

- 51 -

```
;-----------------------------------------------------------------------
DPT2DOS         PROC NEAR USES CX ES DI SI
     mov  di, SEG _ABS0
     mov  ds, di mov  di, wptr @disk_pointer+2
IFDEF DEBUG
;    puth di
ENDIF
     mov  es, di
     mov  di, wptr @disk_pointer
IFDEF DEBUG
;    puth di
ENDIF
     push cs
     pop  ds              ; restore DS lea  si, dpt
     mov  cx, 11
     cld
     rep  movsb ret
DPT2DOS         ENDP ;-----------------------------------------------------------------------
; DATA2DOS    copy data to DOS ES:BX from dual memory data buffer
;
; ENTRY: DI number of sectors to read
;        AL = sector count after DATA2DOS
;-----------------------------------------------------------------------
DATA2DOS  PROC NEAR USES AX CX DI
; transfer count
                          ;  AL == #sectors from struct res
     mov  cx, SZSECTOR    ; sector size
     mul  cx                   ; CX * AL = AX
     mov  cx, ax          ; CX number of bytes to transfer mov  si, BUFFER_OFFSET
     mov  di, bx
IF 0 ;DEF DEBUG
     Print    'DATA: '
     call dumpregs
ENDIF
     cld
     rep  movsb           ; DS:SI -> ES:DI(BX)
     ret
DATA2DOS  ENDP
```

DOCKET NO. 2055

MODULE PCBUSY.ASM

```
PAGE 60,132
TITLE Turbo Floppy Disk Controller. CSC Copyright(C) 1995.
;***********************************************************************
;
; PCBUSY.ASM - lock and unlock dual memory by PC
;
;***********************************************************************

DDELAY          EQU   5          ; 0 - MAX
FL_BUSY         EQU   01H

;-----------------------------------------------------------------------
; ENTER:
;
; EXIT:    CY=1 - FAIL, TIMEOUT
;          CY=0 - OK
;-----------------------------------------------------------------------
SET_BUSY  PROC NEAR USES AX BX CX DI
     mov  di, MC_STATUS
     mov  bh, 5
sb_1:
     mov  bl, 5
     xor  cx, cx
@@:
     mov  al, bptr cs:[di]
     test al, FL_BUSY
     jz   @f
     loop @b
     dec  bl
     jnz  @b
     jmp  sb_er
@@:
;------- set BUSY
     mov  bptr cs:[di], FL_BUSY ;------- wait check BUSY
     mov  cx, DDELAY
@@:
     loop @b ;------- check BUSY
     mov  al, bptr cs:[di]
     test al, FL_BUSY
     jz   sb_ok ;------- clear BUSY
     mov  bptr cs:[di], 0
     dec  bh
     jnz  sb_1
sb_er:
     stc
     ret
sb_ok:
     clc
     ret
SET_BUSY  ENDP
```

- 53 -

DOCKET NO. 2055

```
;-----------------------------------------------------------------
; clear BUSY
;-----------------------------------------------------------------
CLR_BUSY  PROC      NEAR       USES di
     mov  di, MC_STATUS
     mov  bptr cs:[di], 0      ; AND NOT FL_BUSY
     ret
CLR_BUSY  ENDP

MODULE PCDEBUG.ASM

NEWLINE   MACRO
     mov  ah, 0EH
     mov  al, 13
     int  10H
     mov  ah, 0Eh
     mov  al, 10
     int  10H
ENDM SPACE     MACRO
     mov  ah, 0eh
     mov  al, ' '
     int  10h
ENDM PRN_AX    MACRO
     call ttax
     SPACE
ENDM DUMPREGS  PROC      NEAR
     pushf
     push ax Print     'A'
     call ttax
     Print     ' B'
     mov  ax, bx
     call ttax Print     ' C'
     mov  ax, cx
     call ttax Print     ' D'
     mov  ax, dx
     call ttax Print     ' S'
     mov  ax, SI
     call ttax Print     ' D'
     mov  ax, DI
```

- 54 -

DOCKET NO. 2055

```
        call ttax

Print    ' S'
        mov  ax, SP
        call ttax

Print    ' B'
        mov  ax, BP
        call ttax

Print    ' C'
        mov  ax, CS
        call ttax

Print    ' D'
        mov  ax, DS
        call ttax

Print    ' E'
        mov  ax, ES
        call ttax

Print    ' S'
        mov  ax, SS
        call ttax pushf
        pop  ax

Print    ' F'
        call ttax
        NEWLINE pop  ax
        popf
        retn
DUMPREGS  ENDP TRACE_AX_DX     PROC NEAR USES AX
        pushf
        Print    ' AX='
        call ttax
        Print    ' DX='
        mov  ax, dx
        call ttax
        popf
        ret
TRACE_AX_DX     ENDP IF 0
DUMPREGS  PROC       NEAR
        pushf
        push ax
        Print    13, 10, 'AX='
        call ttax
        Print    ' BX='
        mov  ax, bx
        call ttax
```

- 55 -

DOCKET NO. 2055

```
        Print       ' CX='
        mov   ax, cx
        call ttax
        Print       ' DX='
        mov   ax, dx
        call ttax
        Print       ' SP='
        mov   ax, sP
        call ttax
        Print       ' BP='
        mov   ax, BP
        call ttax
        Print       ' SI='
        mov   ax, SI
        call ttax
        Print       ' DI='
        mov   ax, DI
        call ttax
        Print    13, 10, 'DS='
        mov   ax, DS
        call ttax
        Print       ' ES='
        mov   ax, ES
        call ttax
        Print       ' SS='
        mov   ax, SS
        call ttax
        Print       ' CS='
        mov   ax, CS
        call ttax
        Print    13, 10
        pop   ax
        popf
        retn
DUMPREGS   ENDP DUMPREGS   PROC       NEAR
        pushf
        push ax Print       'AX='
        call ttax
        Print       ' BX='
        mov   ax, bx
        call ttax Print       ' CX='
        mov   ax, cx
        call ttax Print       ' DX='
        mov   ax, dx
        call ttax ;       Print       ' SP='
;       mov   ax, sP
```

- 56 -

DOCKET NO. 2055

```
;       call ttax

Print     ' SI='
        mov  ax, SI
        call ttax

Print     ' DI='
        mov  ax, DI
        call ttax

Print     ' DS='
        mov  ax, DS
        call ttax

Print     ' ES='
        mov  ax, ES
        call ttax

Print     ' CS='
        mov  ax, CS
        call ttax
        NEWLINE pop  ax
        popf
        retn
DUMPREGS    ENDP

ENDIF

IF 0

;----------------------------------------------------------------
; print from buffer to the screen
;----------------------------------------------------------------
PRN_BUFF    PROC NEAR      USES di
        mov  si, cs
        mov  ds, si
        lea  si, buff
        mov  di, DATA_OFF mov  cx, ROWS main_loop:
        push      cx
; PRINT address
        mov  ax, DATA_SEG
        call ttax
        mov  al, ':'
        call prn_char mov  ax, di              ; di - offset
        call ttax mov  al, ' '
```

- 57 -

DOCKET NO. 2055

```
        call prn_char
        mov  al, ' '
        call prn_char mov  cx, 8
str1:
        mov  al, byte ptr ds:[si]
        inc  si
        call ttal
        mov  al, ' '
        call prn_char
        loop str1 mov  al, ' '
        call prn_char mov  cx, 8
str2:
        mov  al, byte ptr ds:[si]
        inc  si
        call ttal
        mov  al, ' '
        call prn_char
        loop str2
; ASCII
        mov  al, ' '
        call prn_char
        mov  al, ' '
        call prn_char sub  si, 16
        mov  cx, 16
str3:
        mov  al, ds:[si]
        inc  si
        call prn_char
        loop str3 mov  al, 13
        call prn_char
        mov  al, 10
        call prn_char
        add  di, 10h
        pop  cx
        loop main_loop ; move cursor to 0, 0
        xor  dx, dx
        xor  bh, bh
        mov  ah, 2
        int  10h ret
PRN_BUFF  ENDP TTAX PROC NEAR USES ds es si di dx bx
        pushf
        push ax
```

- 58 -

DOCKET NO. 2055

```
        push ax
        mov  al,ah
        call ttal
        pop  ax
        call ttal
        pop  ax
        popf
        ret
TTAX ENDP TTAL PROC
        push cx
        push ax
        mov  cx,4
        shr  al,cl
        call hexit
        pop  ax
        push ax
        and  al,0fh
        call hexit
        pop  ax
        pop  cx
        ret

TTAL ENDP

HEXIT   PROC
        push dx
        or   al,30h
        cmp  al,3ah
        jl   yes1
        add  al,7
yes1:

mov  ah,0eh
        int  10h
        pop  dx
        ret
HEXIT   ENDP

PRN_CHAR  PROC NEAR USES bx
        .IF ((al < ' ') || (al > '~'))
            mov  al, '.'
        .ENDIF
        mov  ah, 0eh
        int  10h
        ret
PRN_CHAR  ENDP
ENDIF
```

DOCKET NO. 2055

MODULE TFLPBIOS.ASM

```
PAGE 60,132
TITLE Turbo Floppy Disk Controller. CSC Copyright(C) 1995.
;*****************************************************************
;
; TFLPBIOS.ASM - BIOS of Turbo Floppy Disk Controller
;
;*****************************************************************
        .MODEL   TINY
        include  pcdebug.inc
        include  pcdefs.inc
        include  dualmem.inc
        include  macs.mac
        include  tfdc.inc

.286 include  biosdata.asm

CODE SEGMENT    BYTE PUBLIC    'CODE'
        ASSUME    CS:CODE, DS:_ABS0
        ORG   0000H
        db    55H, 0AAH
        db    10H             ; BIOS EPROM size = 8192 / 512 = 16 start:  jmp   begin db    'Turbo Floppy Disk Controller. CSC Copyright (C) 1995' begin:
        include  banner.asm
        include  init_pc.asm
;       include  test_mc.asm
        retf include  ttax.inc
        include  pcdebug.asm
        include  int_40h.asm            ; int40h entry
        include  pcbusy.asm
        include  fnc_tab.asm ORG   01FFFH
chk_sum db    0FFH req     REQUEST       <>
res     RESPONSE      <>
dpt     DSKTAB        <>

CODE ENDS

END
```

- 60 -

DOCKET NO. 2055

MODULE WR_HSTRK.ASM

```
; write diskette all tracks in format

; 0 byte   7 bit = 0,1 #head, 6-0 = #sector
; 1 byte   7-0 bits = #track

.MODEL    SMALL
      .286

DSK144     EQU  1

DRIVE_A          EQU  0
DRIVE_B          EQU  1
SECTORS          EQU  1
SECTOR           EQU  1
TRACK            EQU  0
HEAD       EQU   0

INT13H_RESET     EQU  00H
INT13H_GETERR        EQU  01H
INT13H_RD EQU    02H
INT13H_WR EQU    03H
INT13H_VF EQU    04H
INT13H_FMT       EQU  05H
INT13H_GETPARM EQU   08H
INT13H_SEEK      EQU  0CH
INT13H_RECAL     EQU  11H
INT13H_DSKTYPE EQU   15H
INT13H_SETDSKT EQU   17H

_TEXT     SEGMENT   WORD PUBLIC    'CODE'
     ORG   100H
         ASSUME    CS:_TEXT, DS:_TEXT

START:
     push cs
     pop  ds
     push cs
     pop  es lp:

@@:
     mov  ah, 1
     int  16h
     jnz  ex

.WHILE    cur_sect <= 18
     call make_buff
     call write
     inc  cur_sect
     .ENDW mov  cur_sect, 1
```

- 61 -

DOCKET NO. 2055

```
        inc  cur_head
        .WHILE    cur_sect <= 18
        call make_buff
        call write
        inc  cur_sect
        .ENDW
        mov  cur_sect, 1
        dec  cur_head
        inc  cur_trk
        cmp  cur_trk, 80
        jb   @b ex:
;       call ttax
        int  20h
        ret MAKE_BUFF PROC NEAR
        ; make AL
        mov  al, cur_sect
        mov  ah, cur_head
        ror  ah, 1
        or   al, ah ; make AH
        mov  ah, cur_trk lea  di, Buff
        cld
        mov  cx, 256
        rep  stosw ret
MAKE_BUFF ENDP WRITE   PROC NEAR
        mov  ah, INT13H_WR
        mov  al, 1
        mov  dl, DRIVE_A
        mov  dh, cur_head
        mov  ch, cur_trk
        mov  cl, cur_sect
        lea  bx, Buff
        int  13h
        jc   wr_er
        ret
wr_er:
        call ttax
        int  20h
WRITE   ENDP cur_trk         db   0
cur_sect  db    1
cur_head  db    0
```

- 62 -

```
        org   200h
Buff    db    512 dup (0)

include tax.inc
_TEXT   ENDS
        END   START
```

DOCKET NO. 2055

DOCKET NO. 2055

80188 MICROCONTROLLER COMPUTER PROGRAM LISTING

MODULE DEBUG.INC

```
PAGE 60,132
TITLE Turbo Floppy Disk Controller. CSC Copyright(C) 1995.
;******************************************************************
;
; DEBUG.INC - File defines debug macros
;
;******************************************************************

; clear trace buffer
CLRTRC      MACRO
        push    ax
        push    cx
        push    di
        push    ds
        mov     di, _MCDATA
        mov     ds, di
        lea     di, trace
        mov     cx, 7fh
        xor     al, al
@@:
        mov     bptr ds:[di], al
        inc     di
        loop    @b
        pop     ds
        pop     di
        pop     cx
        pop     ax
ENDM AX14_LP     MACRO
        call    ax14
@@:     nop
        jmp     @b
ENDM DDR_LP      MACRO
        call    dump_regs
@@:     nop
        jmp     @b
ENDM DDM_LP      MACRO
        call    dump_mc
@@:     jmp     @b
ENDM DDR     MACRO
        call    dump_regs
ENDM DDM     MACRO
        call    dump_mc
ENDM
```

DOCKET NO. 2055

```
DDBS    MACRO
        call    dump_buff_sect
ENDM

DMR_LP  MACRO
;       MOV     SI, 3333H
        DDM
        DDR_LP
ENDM

DMR     MACRO
        DDR
        DDM
ENDM

DDBT    MACRO
        call    dump_buff_track
ENDM
```

MODULE DEFS188.INC

```
PAGE 60,132
TITLE Turbo Floppy Disk Controller. CSC Copyright(C) 1995.
;***************************************************************
;
; DEFS188.INC - File defines various constants
;
;***************************************************************
IFDEF DEBUG
TRC_OUT             EQU     1
TRC_IN              EQU     1
TRC_IN_RES_DATA     EQU     1
TRC_IN_RES_STAT     EQU     1
TRC_INT             EQU     1
TRC_DSKCHNG EQU     1
ELSE
TRC_OUT             EQU     0
TRC_IN              EQU     0
TRC_IN_RES_DATA     EQU     0
TRC_IN_RES_STAT     EQU     0
TRC_INT             EQU     0
TRC_DSKCHNG EQU     0
ENDIF wptr    equ     word ptr
bptr    equ     byte ptr
dptr    equ     dword ptr

CLKCPU20    EQU     0

PORT_BASE   EQU     0h

F1          EQU     PORT_BASE
F2          EQU     PORT_BASE+128
```

- 66 -

DOCKET NO. 2055

```
BANK_SEL      EQU    PORT_BASE+256+3

; PC can read/write this port as memory at BIOS_BASE+2000H+1FF0H
; uses only 0-3 bits
;
; MC can read/write this port at PORT_STATUS

PORT_STATUS EQU    PORT_BASE+256

FL_BUSY            EQU    00000001b    ; MC can read/write dual memory
FL_02H             EQU    00000010b    ;
FL_04H             EQU    00000100b    ; reserved
FL_08H             EQU    00001000b    ; reserved ; MC can control IRQ 5-9 of PC
PORT_INT_PC EQU    PORT_BASE+257

FL_SET_INT  EQU    00000001b    ; to set high level of IRQ
FL_CLR_INT  EQU    00000000b    ; to set low level of IRQ ;--------------- REFRESH CONTROL UNIT
;RF_DRAM_ADDR      EQU    00000h
;RF_CLOCK    EQU        00020H
;RF_ENABLE         EQU      08000H ;--------------- INTERRUPT CONTROL UNIT
;INT_CLRMSK EQU    11010101b    ; INT1+DMA1 ; INT3-0, DMA10, X, TMR
INT_CLRMSK  EQU    11010101b    ; INT1 ;INT3-0, DMA10, X, TMR
INT_SETMSK  EQU    11111101b ;--------------- END OF INTERRUPT
EOI_TMR                   EQU    08
EOI_DMA0    EQU    10
EOI_DMA1    EQU    11
EOI_INT0    EQU    12
EOI_INT1    EQU    13
EOI_INT2    EQU    14
EOI_INT3    EQU    15
```

MODULE DUALMEM.INC

```
PAGE 60,132
TITLE Turbo Floppy Disk Controller. CSC Copyright(C) 1995.
;*****************************************************************
;
; DUALMEM.INC - defines dual memory data structures
;
;*****************************************************************

;BUFFER_OFFSET     EQU    2100H

; Flags
FL_PC_REQUEST     EQU    08H
FL_PC_RESPONSE    EQU    04H
FL_MC_READY EQU    08H
FL_MC_RESPONSE    EQU    04H
```

DOCKET NO. 2055

```
REQUEST         STRUCT                                  ; see int13h
  cmd           db ?    ; command        ; AH
  drive               db ?    ; drive #       ; DL
  head          db ?    ; head #         ; DH
  track               db ?    ; track #       ; CH
  sector              db ?    ; sector #      ; CL
  sect_count db ?     ; sector count   ; AL
REQUEST ENDS RESPONSE        STRUCT
  res_seek_status  db ?          ; drive recalibration status
  res_motor_status db ?          ;
  res_motor_count  db ?          ; time out
  res_dskette_status     db ?           ;
; res_timer_count db ?
  res_dsk_trk            dw ?
  res_dsk_state          dw ?
  res_fdc_status         db      10 dup (?)
  res_lastrate           db      ?
  res_sec_rd_wrtn  db    ?       ; number sectors read or written -> AL
RESPONSE      ENDS ; Diskette Parameter Table
; This 10-byte structure is also known as the "Disk Base Table."
; It specifies a variety of critical variables for diskette drives.

DSKTAB          STRUCT
  srt_unload db ? ; bits 0-3: SRT (step rate time); bits 4-7: head unload time
  dma_load   db ? ; bit 0: 1=use DMA; bits 2-7: head load time
  motor_wait     db ? ; motor wait (55-ms increments before turning off disk
motor)
  sector_size    db ? ; sector size (0=128, 1=256, 2=512, 3=1024)
  eot       db ? ; EOT (last sector on a track)
  gap_len        db ? ; gap length for read/write operations
  dtl       db ? ; DTL (Data Transfer Length) max transfer when length not set
  dtlfmt         db ? ; gap length for format operation
  fill_fmt  db ? ; fill character for format (normally 0f6H '÷')
  head_settle    db ? ; head-settle time (in milliseconds)
  motor_start    db ? ; motor-startup time (in 1/8th-second intervals)
DSKTAB          ENDS DBG_REG         STRUCT
  regs          db      16 dup (?)   ; 'AXBXCXDXSIDISPBP'
                db      16 dup (?)
  segs          db      16 dup (?)   ; 'CS DS ES SS FL  '
                db      16 dup (?)
DBG_REG         ENDS
```

- 68 -

DOCKET NO. 2055

MODULE FLPBIOS.INC

PAGE 60,132
TITLE Test Floppy Disk Controller. CSC Copyrigth(C) 1995.

```
;****************************************************************
;
;       FLPBIOS.INC -     BIOS common equates
;
;****************************************************************

; INT 13H returns with the Carry Flag set (CF=CY=1) when service failed and
; it places one of the following error codes in AH. These are also the values
; returned when disk status is requested (SubFn 00H).

;---------------    DISKETTE ERRORS
NO_ERR              EQU   00H  ; no error on last operation
BAD_CMD             EQU   01H  ; bad command: invalid request to controller
BAD_ADDR_MARK       EQU   02H  ; bad address mark
WRITE_PROTECT       EQU   03H  ; write protect: attempted to write on
write-protected diskette
RECORD_NOT_FND      EQU   04H  ; sector ID bad or not found.
MEDIA_CHANGE        EQU   06H  ; diskette was removed
BAD_DMA             EQU   08H  ; DMA failure
DMA_BOUNDARY        EQU   09H  ; DMA overrun: attempted to write across a 64K-byte
boundary.
BAD_CRC             EQU   10H  ; bad CRC: invalid CRC when data checked.
BAD_NEC             EQU   20H  ; controller failure
BAD_SEEK      EQU   40H  ; bad seek. requested track not found
TIME_OUT      EQU   80H  ; time out. drive did not respond
; only for fixed disk ?        RESET_FAILED       EQU   05H  ; reset failed ;---------------    DISKETTE EQUATES
DUAL          EQU   01H
INT_FLAG      EQU   80H
DSK_CHG             EQU   80H
DETERMINED    EQU   20H
HOME          EQU   20H
SENSE_DRV_ST        EQU   04H
TRK_SLAP      EQU   30H
QUIET_SEEK    EQU   0AH
MAX_DRV             EQU   2
HD12_SETTLE EQU     15
HD320_SETTLE        EQU   20
;MOTOR_WAIT EQU     37

;---------------    DISK CHANGE LINE EQUATES
NOCHGLN             EQU   01H
CHGLN         EQU   02H

;---------------    MEDIA/DRIVE STATE INDICATORS
TRK_CAPA      EQU   01H
FMT_CAPA      EQU   02H
DRV_DET             EQU   04H
MED_DET             EQU   10H
DBL_STEP      EQU   20H
RATE_MSK      EQU   0C0H
RATE_500      EQU   00H
```

- 69 -

DOCKET NO. 2055

```
        RATE_300    EQU    40H
        RATE_250    EQU    80H
        STRT_MSK    EQU    0CH
        SEND_MSK    EQU    0C0H

;--------------- MEDIA/DRIVE STATE INDICATORS COMPATIBILITY
        M3D3U       EQU    00H
        M3D1U       EQU    01H
        M1D1U       EQU    02H
        MED_UNK            EQU    07H

;--------------- INTERRUPT
        EOI         EQU    20H
        INTA00             EQU    20H
        INTA01             EQU    21H

;--------------- DMA
        DMA08       EQU    008H
        DMA         EQU    000H
        DMA18       EQU    0D0H
        DMA1        EQU    0C0H

DMA_PAGE        EQU    081H
        LAST_DMA_PAGE   EQU    08FH

H           EQU    256
        X           EQU    H+1

PORT_A             EQU    060H
        PORT_B             EQU    061H

REFRESH_BIT EQU    10H

CMOS_PORT   EQU    070H
        CMOS_DATA   EQU    071H
        CMOS_REG_D  EQU    0DH

CMOS_DISKETTE   EQU    010H
        CMOS_DIAG   EQU    00EH
        BAD_BAT            EQU    080H
        BAD_CKSUM   EQU    040H
```

MODULE PCBMAP.INC

```
PAGE 60,132
TITLE Turbo Floppy Disk Controller. CSC Copyright(C) 1995.
;*********************************************************************
;
; PCBMAP.INC - File declares register location and names
;
;*********************************************************************

;--------------- Chip-select
REG_UMCS        EQU    0FFA0H
```

DOCKET NO. 2055

```
REG_LMCS      EQU    0FFA2H
REG_PACS      EQU    0FFA4H
REG_MMCS      EQU    0FFA6H
REG_MPCS      EQU    0FFA8H

;---------------- Refresh
REG_RFBASE    EQU    0FFE0H
REG_RFTIME    EQU    0FFE2H
REG_RFCON     EQU    0FFE4H ;---------------- Interrupt Control Unit
REG_EOI              EQU    0FF22H
REG_POLL      EQU    0FF24H
REG_POLLSTS   EQU    0FF26H
REG_IMASK     EQU    0FF28H
REG_PRIMSK    EQU    0FF2AH
REG_INSERV    EQU    0FF2CH
REG_REQST     EQU    0FF2EH
REG_INTSTS    EQU    0FF30H
REG_TCUCON    EQU    0FF32H
REG_DMA0CON   EQU    0FF34H
REG_DMA1CON   EQU    0FF36H
REG_I0CON     EQU    0FF38H
REG_I1CON     EQU    0FF3AH
REG_I2CON     EQU    0FF3CH
REG_I3CON     EQU    0FF3EH ;---------------- Timer
REG_T0CNT     EQU    0FF50H
REG_T0CMPA    EQU    0FF52H
REG_T0CMPB    EQU    0FF54H
REG_T0CON     EQU    0FF56H REG_T1CNT     EQU    0FF58H
REG_T1CMPA    EQU    0FF5AH
REG_T1CMPB    EQU    0FF5CH
REG_T1CON     EQU    0FF5EH REG_T2CNT     EQU    0FF60H
REG_T2CMPA    EQU    0FF62H
REG_T2CON     EQU    0FF66H ;---------------- DMA
REG_D0SRCL    EQU    0FFC0H
REG_D0SRCH    EQU    0FFC2H
REG_D0DSTL    EQU    0FFC4H
REG_D0DSTH    EQU    0FFC6H
REG_D0TC      EQU    0FFC8H
REG_D0CON     EQU    0FFCAH REG_D1SRCL    EQU    0FFD0H
REG_D1SRCH    EQU    0FFD2H
REG_D1DSTL    EQU    0FFD4H
REG_D1DSTH    EQU    0FFD6H
REG_D1TC      EQU    0FFD8H
REG_D1CON     EQU    0FFDAH

RELREG               EQU    0FFFEH
```

MODULE TAX.INC

```
;************ type (tty) AX (hex) ***********************
;     mov   ax, code
;     call  ttax
;********************************************************
TTAX  PROC push  ax
      push  ax
      mov   al,ah
      call  ttal
      pop   ax
      call  ttal
      pop   ax
      ret

TTAL  PROC push  cx
            push  ax
            mov   cx,4
            shr   al,cl
            call  hexit
            pop   ax
            push  ax
            and   al,0fh
            call  hexit
            pop   ax
            pop   cx
            ret HEXIT PROC
                  or    al,30h
                  cmp   al,3ah
                  jl    yes1
                  add   al,7
            yes1:
                  mov   ah,0eh
                  int   10h
                  ret
            HEXIT ENDP
      TTAL  ENDP
TTAX  ENDP
```

MODULE TFDC.INC

```
PAGE 60,132
TITLE Turbo Floppy Disk Controller. CSC Copyright(C) 1995.
;********************************************************
;
; TFDC.INC - File defines turbo floppy controller constants
;
;********************************************************
```

DOCKET NO. 2055

```
NOFIFO          EQU     0
MOTOR_STARTUP   EQU     1000    ; wait 1 second
SZSECTOR        EQU     512

; FOR DEBUG WITH LOGIC ANALYZER
RESETINT        EQU     0

TRG_INT         EQU     0

TRGF1 MACRO
        push    ax
        push    dx
        mov     dx, F1+MSR
        in      al, dx
        pop     dx
        pop     ax
ENDM
;--------------------------------

;------- REGISTERS
SRA     EQU     0
SRB     EQU     1
DOR     EQU     2
TDR     EQU     3
MSR     EQU     4
DSR     EQU     4
FIFO    EQU     5
DIR     EQU     7
CCR     EQU     7

;------- MAIN STATUS REGISTER (MSR) READ ONLY
;               76543210
MSR_RQM         EQU     10000000b
MSR_DIO         EQU     01000000b
MSR_NONDMA  EQU 00100000b
MSR_CMDPROG EQU 00010000b
MSR_DRV3_BUSY   EQU     00001000b
MSR_DRV2_BUSY   EQU     00000100b
MSR_DRV1_BUSY   EQU     00000010b
MSR_DRV0_BUSY   EQU     00000001b

;------- COMMANDS FDC
CMD_SENSE_INT   EQU     008H

CMD_SPECIFY EQU 003H

CMD_READ        EQU     046H    ;   0C6H
CMD_WRITE       EQU     045H    ;
CMD_VERIFY  EQU     056H    ;
CMD_READ_TRACK  EQU     042H
;CMD_RD_WR_VF1  EQU     080H    ; IPS/EC = 1

IF NOFIFO
CMD_CONFIG0 EQU 013H    ;
CMD_CONFIG1 EQU 000H    ;
CMD_CONFIG2 EQU 020H    ; EIS=0 FIFO=0 THRESH=8
CMD_CONFIG3 EQU 000H            ; PRETRK=0
```

DOCKET NO. 2055

```
CMD_MODE0      EQU    001H    ;
CMD_MODE1      EQU    002H
CMD_MODE2      EQU    0E0H
CMD_MODE3      EQU    040H
CMD_MODE4      EQU    000H
ELSE
CMD_CONFIG0    EQU    013H    ;
CMD_CONFIG1    EQU    000H    ;
CMD_CONFIG2    EQU    008H    ; EIS=0 FIFO=0 THRESH=8
CMD_CONFIG3    EQU    000H           ; PRETRK=0

CMD_MODE0      EQU    001H    ;
CMD_MODE1      EQU    002H
CMD_MODE2      EQU    000H
CMD_MODE3      EQU    040H
CMD_MODE4      EQU    000H
ENDIF

CMD_SEEK       EQU    00FH
CMD_DUMPREG    EQU    00EH
CMD_RECAL      EQU    007H
CMD_LOCK       EQU    094H
CMD_READ_ID    EQU    04AH
```

; INT 13H returns with the Carry Flag set (CF=CY=1) when service failed and
; it places one of the following error codes in AH. These are also the values
; returned when disk status is requested (SubFn 00H).

```
;---------------    DISKETTE ERRORS
NO_ERR                  EQU    00H   ; no error on last operation
BAD_CMD                 EQU    01H   ; bad command: invalid request to controller
BAD_ADDR_MARK           EQU    02H   ; bad address mark
WRITE_PROTECT           EQU    03H   ; write protect: attempted to write on
write-protected diskette
RECORD_NOT_FND          EQU    04H   ; sector ID bad or not found.
MEDIA_CHANGE            EQU    06H   ; diskette was removed
BAD_DMA                 EQU    08H   ; DMA failure
DMA_OVERRUN    EQU      08H
DMA_BOUNDARY            EQU    09H   ; DMA overrun: attempted to write across a 64K-byte
boundary.
BAD_CRC                 EQU    10H   ; bad CRC: invalid CRC when data checked.
BAD_FDC                 EQU    20H   ; controller failure
BAD_SEEK       EQU      40H   ; bad seek.  requested track not found
TIME_OUT       EQU      80H   ; time out.  drive did not respond
; only for fixed disk ?        RESET_FAILED     EQU    05H   ; reset failed ;----------------  DISKETTE EQUATES
END_OF_TRACK            EQU    80H
DUAL           EQU      01H
INT_FLAG       EQU      80H
DSK_CHG                 EQU    80H
DETERMINED     EQU      20H
HOME           EQU      20H
SENSE_DRV_ST            EQU    04H
TRK_SLAP       EQU      30H
QUIET_SEEK     EQU      0AH
MAX_DRV                 EQU    2
HD12_SETTLE    EQU      15
```

- 74 -

DOCKET NO. 2055

```
HD320_SETTLE       EQU    20
;MOTOR_WAIT EQU    37

;---------------- MEDIA/DRIVE STATE INDICATORS
TRK_CAPA     EQU   01H
FMT_CAPA     EQU   02H
DRV_DET            EQU    04H
MED_DET            EQU    10H
DBL_STEP     EQU   20H

RATE_MSK     EQU   0C0H
RATE_500     EQU   00H
RATE_250     EQU   80H

STRT_MSK     EQU   00CH
SEND_MSK     EQU   0C0H

H            EQU   256
X            EQU   H+1
```

MODULE TTAX.INC

```
IF 0
print_text  proc near USES ax ds es si di cx bx
      pushf
      mov    ax, cs
      mov    ds, ax mov    ah, 9
      int    21h
      popf
      ret
print_text  endp
ENDIF print_text  proc near USES ax bx
      pushf
@@:
      mov    al, bptr cs:[bx]
      cmp    al, '$'
      jz     @f
      mov    ah, 0eh
      int    10h
      inc    bx
      jmp    @b
;     mov    ah, 9
;     int    21h
@@:
      popf
      ret
print_text  endp
;*********** type (tty) AX (hex) ***********************
;     mov    ax, code
;     call   ttax
;*******************************************************
TTAX  PROC NEAR USES ds es si di dx bx
```

- 75 -

DOCKET NO. 2055

```
            pushf
            push    ax
            push    ax
            mov     al,ah
            call    ttal
            pop     ax
            call    ttal
            pop     ax
            popf
            ret
    TTAX    ENDP TTAB    PROC NEAR USES ds es si di dx bx
            pushf
            push    ax
            call    ttal
            pop     ax
            popf
            ret
    TTAB    ENDP TTAA    PROC NEAR USES ds es si di dx bx cx ax
            and     al, 0fh
            call    hexit
            ret
    TTAA    ENDP TTAL    PROC
            push    cx
            push    ax
            mov     cx,4
            shr     al,cl
            call    hexit
            pop     ax
            push    ax
            and     al,0fh
            call    hexit
            pop     ax
            pop     cx
            ret

TTAL    ENDP

HEXIT   PROC
            push    dx
            or      al,30h
            cmp     al,3ah
            jl      yes1
            add     al,7
    yes1:
            mov     ah,0eh
            int     10h
    ;       mov     dl, al
    ;       mov     ah, 02
    ;       int     21h
            pop     dx
            ret
```

- 76 -

DOCKET NO. 2055

```
        HEXIT ENDP prbuf_bl    db      ' ','$'
prbuf_col   db      ':','$'
prbuf_nl    db      0dh,0ah,'$'
        ALIGN PRBUF PROC NEAR
        push    cx
        push    dx
        push    bx
        push    si
        push    ax
        xor     bx,bx
        xor     dx,dx
prbuf_pr_loop_@:
        or      cx,cx
        jne     prbuf_pr_char_@ puts    prbuf_nl
        pop     ax
        pop     si
        pop     bx
        pop     dx
        pop     cx
        ret prbuf_pr_char_@:
        or      bx,bx
        jne     prbuf_no_nl_@
        puts    prbuf_nl
        mov     bx, 16
        mov     ax,dx
        call    ttax puts    prbuf_col
        puts    prbuf_bl
prbuf_no_nl_@:
        mov     al, es:[si]
        inc     si
        call    ttab puts    prbuf_bl inc     dx
        dec     bx
        dec     cx
        jmp     prbuf_pr_loop_@

PRBUF ENDP
```

- 77 -

DOCKET NO. 2055

MODULE 80188.ASM

```
        .MODEL    TINY
        include defs188.inc
        include pcbmap.inc
        include dualmem.inc
        include tfdc.inc include memdata.asm

.286

CODE    SEGMENT    BYTE PUBLIC 'CODE'
        ASSUME     CS:CODE, DS:_MCDATA
        ORG    0000H banner      db     'CSC Turbo Floppy 1995'

ORG    020H

IFDEF DEBUG
        include debug.inc
        include req_data.asm        ; for debug
        include debug.asm
fw_start:
        include maindeb.asm
;       include mainloop.asm
ELSE
fw_start:
        include mainloop.asm
ENDIF IFDEF DEBUG
stop_loop:
        jmp    stop_loop
ENDIF include    busy.asm
        include    handlers.asm
        include    fldriver.asm
        include    drvfunc.asm
        include    testdrv.asm
        include    dmasetup.asm
        include    memmngr.asm
        include    req_resp.asm
;*****************************************************************
        ORG    0fc00H
cpu_init:
        include testcpu.asm
        include init_cu.asm
        include memtest.asm
        include stackint.asm
        include init_fdc.asm
        include     init_tim.asm
        jmp    fw_start

START LABEL NEAR
```

DOCKET NO. 2055

```
;------- POWER ON
        ORG     0FFF0h

DB      0EAH
        DW      OFFSET       cpu_init
        DW      0F000H date    db      '02/28/95'

ORG     0FFFFH
ch_sum  db      0FH

CODE    ENDS

END
```

MODULE BUSY.ASM

```
PAGE 60,132
TITLE Turbo Floppy Disk Controller. CSC Copyright(C) 1995.
;*********************************************************************
;
; BUSY.ASM - lock and unlock dual memory by micro controller
;
;*********************************************************************

BUSY_DELAY   EQU    10
CX_DELAY     EQU    10              ; 0 - MAX

;---------------------------------------------------------------------
; EXIT:     CY=1 - FAIL
;           CY=0 - OK
;---------------------------------------------------------------------
SETBUSY      PROC  NEAR  USES  ax cx dx
        cli
        mov     dx, PORT_STATUS
@@:
        in      al, dx
        rcr     al, 1
        jnc     set_busy
        call    delay
        jmp     @b ;------- set BUSY
set_busy:
        mov     al, st_port
        or      al, FL_BUSY
        mov     st_port, al
        out     dx, al
;------- check BUSY
        mov     cx, BUSY_DELAY
wait_loop2:
        loop    wait_loop2 in      al, dx
        rcr     al, 1
```

- 79 -

DOCKET NO. 2055

```
        jnc     ex_sb
;------- clear BUSY
        mov     al, st_port
        and     al, NOT FL_BUSY
        mov     st_port, al
        out     dx, al
        jmp     @b
ex_sb:
        sti
        ret

SETBUSY ENDP

;-------------------------------------------------------------
; clear BUSY
;-------------------------------------------------------------
CLRBUSY PROC NEAR   USES    ax dx
        cli
        mov     dx, PORT_STATUS
        mov     al, st_port
        and     al, NOT FL_BUSY
        mov     st_port, al
        out     dx, al
        sti
        ret
CLRBUSY ENDP DELAY PROC NEAR   USES    cx
        mov     cx, CX_DELAY
@@:
        nop
        loop    @b
        ret
DELAY ENDP
```

MODULE CHKSUM.ASM

```
        .MODEL      SMALL
        .286
_TEXT SEGMENT       WORD PUBLIC 'CODE'
        ORG     100H
        ASSUME      CS:_TEXT, DS:_TEXT
START:
        mov     bx, 0d000h
        mov     ds, bx
        xor     bx, bx
        xor     ax, ax
        mov     cx, 2000h
l1:
        add     al, byte ptr [bx]
        inc     bx
        loop    l1
        sub     ah, al
```

- 80 -

DOCKET NO. 2055

```
        dec   ah
        push  ax
        mov   ah, 9h
        push  cs
        pop   ds
        lea   dx, mess
        int   21h
        pop   ax
        call  ttax
        mov   ah, 0
        int   16h
        int   20h mess db    13, 10, 'CheckSum D000: 0 - 1FFEH: ', '$'
     include ttax.inc

_TEXT ENDS
     END   START
```

MODULE DEBUG.ASM

```
PATT    EQU   0;a5a5H
;END_BUF EQU  23D0H      ; 18 sectors/track
END_BUF EQU   11D0H      ; 09 sectors/track ;-----------------------------------------------------------------
; DUMP_REGS
;-----------------------------------------------------------------
DUMP_REGS  PROC  NEAR   ;USES ax cx ds bx ; !!! don't change !!!
        pushf cli
        push  ax
        push  cx
        push  ds
        push  bx
        call  setbusy
        mov   bx, SEG _DUAL;0C000h
        mov   ds, bx
        lea   bx, deb_reg mov   bptr [bx],   'A'
        mov   bptr [bx+1], 'X'
        mov   bptr [bx+2], 'B'
        mov   bptr [bx+3], 'X'
        mov   bptr [bx+4], 'C'
        mov   bptr [bx+5], 'X'
        mov   bptr [bx+6], 'D'
        mov   bptr [bx+7], 'X' mov   bptr [bx+8], 'S'
        mov   bptr [bx+9], 'P'
        mov   bptr [bx+10],'B'
        mov   bptr [bx+11],'P'
        mov   bptr [bx+12],'S'
```

DOCKET NO. 2055

```
        mov     bptr [bx+13],'I'
        mov     bptr [bx+14],'D'
        mov     bptr [bx+15],'I' mov     wptr [bx+16], ax
        mov     wptr [bx+20], cx

; show bx !!!
        pop     cx                              ; restore bx from stack to cx
        mov     wptr [bx+18], cx ;
        push    cx mov     wptr [bx+22], dx
        mov     wptr [bx+24], sp
        mov     wptr [bx+26], bp
        mov     wptr [bx+28], si
        mov     wptr [bx+30], di
; show segment registers
        add     bx, 32 mov     bptr [bx],      'D'
        mov     bptr [bx+1],    'S'
        mov     bptr [bx+2],    'E'
        mov     bptr [bx+3],    'S'
        mov     bptr [bx+4],    'S'
        mov     bptr [bx+5],    'S'
        mov     bptr [bx+6],    'C'
        mov     bptr [bx+7],    'S'
        mov     bptr [bx+8],    'F'
        mov     bptr [bx+9],    'L' pop     ax
        pop     cx
;       mov     ax, ds
        mov     wptr [bx+16], cx
        push    cx
        push    ax
        mov     ax, es
        mov     wptr [bx+18], ax ;
        mov     ax, ss
        mov     wptr [bx+20], ax
        mov     ax, cs
        mov     wptr [bx+22], ax
        pushf
        pop     ax
        mov     wptr [bx+24], ax
        call    clrbusy
        pop     bx
        pop     ds
        pop     cx
        pop     ax
        sti
        popf
        ret

DUMP_REGS   ENDP
```

- 82 -

DOCKET NO. 2055

```
;---------------------------------------------------------------
; DUMP_MC    dump MCDATA to DUAL
;---------------------------------------------------------------
DUMP_MC    PROC  NEAR  USES  ds es di si cx
     pushf
     cli
     call setbusy
     mov  di, SEG _DUAL
     mov  es, di
     lea  di, lsdata
     mov  si, SEG _MCDATA
     mov  ds, si
     lea  si, mcreq
     mov  cx, 0C0h
     rep  movsb
     call clrbusy
     sti
     popf
     ret
DUMP_MC    ENDP ;---------------------------------------------------------------
; DUMP_BUFF_TRACK dump the end of data buffer MCDATA to DUAL
;---------------------------------------------------------------
DUMP_BUFF_TRACK   PROC  NEAR  USES  ds es di si cx
     pushf
     cli
     call setbusy
     mov  di, SEG _DUAL
     mov  es, di
     lea  di, deb_buff
     LDS  SI, sector_offseg
;    mov  si, SEG _BUFF
;    mov  ds, si
;    lea  si, data_buff+END_BUF
     mov  cx, 090h
     rep  movsb
     call clrbusy
     sti
     popf
     ret
DUMP_BUFF_TRACK   ENDP ;---------------------------------------------------------------
; DUMP_BUFF dump data buffer MCDATA to DUAL
;---------------------------------------------------------------
DUMP_BUFF_SECT    PROC  NEAR  USES  ds es di si cx
     pushf
     cli
     call setbusy
     mov  di, SEG _DUAL
     mov  es, di
     lea  di, deb_buff
     LDS  SI, sector_offseg
;    mov  si, SEG _BUFF
;    mov  ds, si
;    lea  si, data_buff+1A0H
```

- 83 -

DOCKET NO. 2055

```
            mov     cx, 090h
            rep     movsb
            call    clrbusy
            sti
            popf
            ret
DUMP_BUFF_SECT  ENDP ;-----------------------------------------------------------------
; copy request from F000:20 to Dual memory C000:0
; you can edit data in ROM emulator memory: >e20
;-----------------------------------------------------------------
REQ2DUAL    PROC    NEAR    USES    DI ES SI DS CX
            pushf
            cli
            call    setbusy mov     si, 0F000H
            mov     ds, si
            lea     si, dbg_cmd mov     di, SEG _DUAL
            mov     es, di
            lea     di, pcreq mov     cx, REQ_LEN
            rep     movsb
            call    clrbusy
            sti
            popf
            ret
REQ2DUAL    ENDP AX14        PROC    NEAR    USES    ES DI
            pushf
            cli
            call    setbusy
            mov     di, SEG _DUAL
            mov     es, di
            mov     di, 14;70h
            mov     wptr es:[di], ax
            call    clrbusy
            sti
            popf
            ret
AX14        ENDP TRC_AL      PROC    NEAR    USES AX BX DS
            pushf
            cli
            mov     bx, SEG _MCDATA
            mov     ds, bx
            lea     bx, trace
            mov     ah, bptr ds:[bx]
            cmp     ah, 07FH
            jz      @f
            inc     ah
;           and     ah, 7fh
```

- 84 -

DOCKET NO. 2055

```
                mov     bptr ds:[bx], ah
                add     bl, ah
                mov     bptr ds:[bx], al
        @@:
                sti
                popf
                ret
        TRC_AL          ENDP TRC_AH          PROC    NEAR    USES AX BX DS
                pushf
                cli
                mov     bx, SEG _MCDATA
                mov     ds, bx
                lea     bx, trace
                mov     al, bptr ds:[bx]
                cmp     al, 07FH
                jz      @f
                inc     al
        ;       and     al, 7fh
                mov     bptr ds:[bx], al
                add     bl, al
                mov     bptr ds:[bx], ah
        @@:
                sti
                popf
                ret
        TRC_AH          ENDP ;---------------------------------------------------------------
        ; TEST_55AAH
        ;---------------------------------------------------------------
        TEST_55AAH      PROC    NEAR    USES ds si
                cli
        ;       mov     si, SEG _BUFF
                mov     ds, si
        ;       lea     si, data_buff+1FEH
                mov     ax, wptr ds:[si]
                sub     ax, 0aa55h
        ;       DDR
                sti
                ret
        TEST_55AAH      ENDP WRITE2BUFF      PROC    NEAR    USES es di ax cx
                cli
                mov     ax, 0f000h
                mov     es, ax
                mov     ax, wptr es:dbg_pattern ;       mov     di, SEG _BUFF
                mov     es, di
                xor     di, di
        ;       mov     ax, PATT
                mov     cx, 4608        ; 18*512/2
        ;       rep     stosw
        @@:
                mov     wptr es:[di], ax
```

- 85 -

DOCKET NO. 2055

```
        inc    di
        inc    di
        loop   @b
        sti
        ret
WRITE2BUFF ENDP
```

MODULE DMASETUP.ASM

```
PAGE 60,132
TITLE Turbo Floppy Disk Controller. CSC Copyright(C) 1995.
;*******************************************************************
;
; DMASETUP.ASM - setup DMA0 and DMA1 for read/write/verify operations
;
;*******************************************************************

; DMA1 PCS5/A1 = BASE + 640 (280H)
; DMA2 PCS6/A2 = BASE + 768 (300H)

RD_DMA1CON   equ    0A266H              ; TC = 1
WR_DMA1CON   equ    015A6H              ; TC = 1

;---------------------------------------------------------------
; RD_DMA_SETUP:    THIS ROUTINE SETS UP THE DMA FOR READ
;---------------------------------------------------------------
RD_DMA_SETUP    PROC   NEAR   USES AX DX CX
        cli
; DMA source address pointer
        mov    dx, REG_D1SRCH
        xor    ax, ax
        out    dx, ax mov    dx, REG_D1SRCL
        mov    ax, PORT_BASE+300h           ; to renegate PCS6 = DMA2
        out    dx, ax ; DMA destination address pointer
        mov    dx, REG_D1DSTH
        mov    ax, 00001h       ; LS - 10000H, MCS0 - 80000H, MCS1 - 90000H
        out    dx, ax mov    dx, REG_D1DSTL
        xor    ax, ax
        out    dx, ax ; DMA transfer count
        mov    dx, REG_D1TC
        xor    ax, ax
        mov    al, ds:[bp].sect_count
        mov    cx, SZSECTOR                 ; sector size
        mul    cx
        mov    cx, ax
        out    dx, ax                       ; ax = cx = number of bytes to transfer
        call   timer1tc ; DMA control register
```

- 86 -

DOCKET NO. 2055

```
; start DMA
        mov     dx, REG_D1CON
        mov     ax, RD_DMA1CON
        out     dx, ax
        sti
        ret
RD_DMA_SETUP    ENDP ;----------------------------------------------------------------
; RDT_DMA_SETUP: THIS ROUTINE SETS UP THE DMA FOR READ TRACK
;
; ENTRY:    CX = segment of destination
;           BX = offset of destination
;----------------------------------------------------------------
RDT_DMA_SETUP   PROC  NEAR  USES  AX DX BP
        cli ; bx = must be the first sector of track
        lea     bp, mcreq
        mov     ax, SZSECTOR
        xor     dx, dx
        mov     dl, bptr ds:[bp].sector
        dec     dl
        mul     dx
        mov     bx, wptr ds:sector_offseg
        sub     bx, ax                      ; BX=OFFSET 1st sector of track ; DMA source address pointer
        mov     dx, REG_D1SRCH
        xor     ax, ax
        out     dx, ax mov     dx, REG_D1SRCL
        mov     ax, PORT_BASE+300h          ; to generate PCS6 = DMA2
        out     dx, ax ; DMA destination address pointer
        mov     dx, REG_D1DSTH
        mov     ax, wptr ds:sector_offseg+2
        rol     ax, 4
        out     dx, ax mov     dx, REG_D1DSTL
        mov     ax, bx                      ; bx = offset
        out     dx, ax ; DMA transfer count for track
        mov     dx, REG_D1TC
        lea     bx, mcparm
        .IF ([bx].eot == 12h)
                mov     ax, 9216
        .ELSE
                mov     ax, 4608
        .ENDIF
        out     dx, ax
        mov     cx, ax
        call    timer1tc
```

- 87 -

DOCKET NO. 2055

```
; DMA control register
; start DMA
        mov     dx, REG_D1CON
        mov     ax, RD_DMA1CON
        out     dx, ax
        sti
        ret
RDT_DMA_SETUP   ENDP ;-----------------------------------------------------------------
; WR_DMA_SETUP:  THIS ROUTINE SETS UP THE DMA FOR WRITE
;-----------------------------------------------------------------
WR_DMA_SETUP    PROC    NEAR    USES    AX DX CX
        cli
; DMA source address pointer
        mov     dx, REG_D1SRCH
        mov     ax, 1           ; LS - 10000H, MCS0 - 80000H, MCS1 - 90000H
        out     dx, ax mov     dx, REG_D1SRCL
        xor     ax, ax
        out     dx, ax ; DMA destination address pointer
        mov     dx, REG_D1DSTH
        xor     ax, ax
        out     dx, ax mov     dx, REG_D1DSTL
        mov     ax, PORT_BASE+300h      ; to renegate PCS6 = DMA2
        out     dx, ax ; DMA transfer count
        mov     dx, REG_D1TC
        xor     ax, ax
        mov     al, ds:[bp].sect_count
        mov     cx, SZSECTOR            ; sector size
        mul     cx
        mov     cx, ax                  ; ax = cx = number of bytes to transfer
        out     dx, ax
        call    timer1tc IF 0
        mov     dx, REG_D1TC
        xor     ax, ax
        mov     al, ds:[bp].sect_count
        mov     cx, SZSECTOR            ; sector size
        mul     cx
        mov     cx, ax                  ; ax = cx = number of bytes to transfer
        out     dx, ax
        call    timer1tc
ENDIF ; DMA control register
; start DMA
        mov     dx, REG_D1CON
        mov     ax, WR_DMA1CON
        out     dx, ax
```

DOCKET NO. 2055

```
        sti
        ret
WR_DMA_SETUP    ENDP

;---------------------------------------------------------------
; TIMER1TC  setup timer1 to count DACK to generate TC
;
; ENTRY:    CX = number of bytes to transfer
;---------------------------------------------------------------
TIMER1TC    PROC  NEAR
        cli
        mov     dx, REG_T1CNT       ; clear Count register
        xor     ax, ax
        out     dx, ax mov     dx, REG_T1CMPA      ; set (count value)-1 to reg A
        dec     cx
        mov     ax, cx              ;
        out     dx, ax mov     dx, REG_T1CMPB      ; set max count value to reg B
        mov     ax, 1               ; ---------------A----|_B_|------
        out     dx, ax mov     dx, REG_T1CON       ; setup control word
        mov     ax, 0C006h          ; 1100 XXXX XXXX 0110
        out     dx, ax
        sti
        ret
TIMER1TC    ENDP ;---------------------------------------------------------------
; TIMER0TC  setup timer0 to count DACK to generate TC
;
; ENTRY:    CX = number of bytes to transfer
;---------------------------------------------------------------
TIMER0TC    PROC  NEAR
        cli
        mov     dx, REG_T0CNT       ; clear Count register
        xor     ax, ax
        out     dx, ax mov     dx, REG_T0CMPA      ; set  (count value)-1 to reg A
        dec     cx
        mov     ax, cx              ;
        out     dx, ax mov     dx, REG_T0CMPB      ; set max count value to reg B
        mov     ax, 1               ; ---------------A----|_B_|------
        out     dx, ax mov     dx, REG_T0CON       ; setup control word
        mov     ax, 0C006h          ; 1100 XXXX XXXX 0110
        out     dx, ax
        sti
        ret
TIMER0TC    ENDP
```

- 89 -

DOCKET NO. 2055

MODULE DRVFUNC.ASM

PAGE 60,132
TITLE Turbo Floppy Disk Controller. CSC Copyright(C) 1995.
;****************************************************************
;
; DRVFUNC.ASM - floppy driver functions
;
;****************************************************************

```
MOT_SEL           EQU    02DH
;-----------------------------------------------------------------
; WAIT_INT
;
; ON EXIT:  @DSKETTE_STATUS, CY REFLECT STATUS OF OPERATION
;-----------------------------------------------------------------
; ok
WAIT_INT   PROC  NEAR  USES BX CX DS BP
      sti
      clc
      mov   bp, SEG _MCDATA
      mov   ds, bp
      lea   bp, mcreq
      mov   bl, 5
      xor   cx, cx
j36:
      test  bptr ds:seek_status, INT_FLAG
      jnz   j37
      loop  j36
      dec   bl
      jnz   j36
j36a:
      or    bptr ds:dskette_status, TIME_OUT
      stc
j37:
      pushf
      and   bptr ds:seek_status, NOT INT_FLAG
;     DMR
      popf
      ret
WAIT_INT   ENDP ;-----------------------------------------------------------------
; FDC_OUT       send byte to the FDC FIFO (data) register
;
; ON ENTRY: AH    : BYTE TO BE OUTPUT
;
; ON EXIT:  CY = 0     SUCCSES
;           CY = 1     FAILURE
;              if a failure, the return is made one level higher than
;              the caller of FDC output. This removes the requirement
;              of testing after every call of FDC output
;-----------------------------------------------------------------
;ok
FDC_OUT           PROC  NEAR
```

DOCKET NO. 2055

```
        mov     dx, F2+MSR
        mov     bl, 2
        xor     cx, cx
j23:
        in      al, dx
IF TRC_IN
        call    trc_al
ENDIF
        and     al, MSR_RQM + MSR_DIO
        cmp     al, MSR_RQM
        jz      j27
        loop    j23
        dec     bl
        jnz     j23
;------  FAIL THRU TO ERROR RETURN
        or      bptr ds:dskette_status, TIME_OUT
        pop     ax
        stc
        ret
;------ OUTPUT BYTE
j27:
        mov     al, ah
        mov     dx, F2+FIFO
        out     dx, al
IF TRC_OUT
        call    trc_al
ENDIF
        ret
FDC_OUT         ENDP ;---------------------------------------------------------------
; RESULTS
;
; ON EXIT: @DSKETTE_STATUS, CY REFLECT STATUS OF OPERATION
;---------------------------------------------------------------
; not ok while does not use timer delay
RESULTS         PROC    NEAR
        push    di
        lea     di, fdc_status     ; points to data area
        mov     bl, 10             ; max status bytes
        mov     dx, F2+MSR
r10:
        mov     bh, 3              ;
        xor     cx, cx
j39:
        in      al, dx
IF TRC_IN_RES_STAT
        call    trc_al
ENDIF
        and     al, MSR_RQM+MSR_DIO
        cmp     al, MSR_RQM+MSR_DIO
        jz      j42                ; status and direction OK
        loop    j39
        dec     bh
        jnz     j39 or      dskette_status, TIME_OUT    ; set error return
        stc
```

- 91 -

DOCKET NO. 2055

```
        jmp     popres

;------- read in the status
j42:
        inc     dx
        in      al, dx              ; point at data port FIFO
IF TRC_IN_RES_DATA
        call    trc_al
ENDIF
        mov     bptr ds:[di], al    ; store the byte
        inc     di                  ; inc pointer
        call    delay
        dec     dx                  ; point to status port
        in      al, dx
        test    al, MSR_CMDPROG
        jz      popres              ; fdc still busy ?
        dec     bl
        jnz     r10
        or      bptr ds:dskette_status, BAD_FDC
        stc
popres:
        pop     di
        ret
RESULTS         ENDP ;----------------------------------------------------------------
; GET_PARM:     FROM DISKETTE PARAMETER TABLE
;
; ENTRY:   DL = INDEX OF BYTE TO BE FETCHED
;
; EXIT:         AH = THAT BYTE FROM BLOCK
;----------------------------------------------------------------
;ok
GET_PARM        PROC    NEAR    USES    bx
        lea     bx, mcparm
        add     bl, dl
        mov     ah, bptr ds:[bx]
        ret
GET_PARM        ENDP ;----------------------------------------------------------------
; SETUP_END:    restore motor_count to parameter provided in table
;               and loads dskette_status to AH, and sets CY
;
; EXIT:         AH, CY, dskette_status
;----------------------------------------------------------------
;ok
SETUP_END       PROC    NEAR
        mov     dl, 2
        push    ax
        call    get_parm
        mov     bptr ds:motor_count, ah
        pop     ax
        mov     ah, bptr ds:dskette_status
        or      ah, ah              ; check for error
        jz      num_err             ; no error
;       xor     al, al              ; clear ?;;; NUMBER OF SECTORS
num_err:
```

DOCKET NO. 2055

```
        cmp    ah, 1           ; set or reset the CY
        cmc
        ret
SETUP_END   ENDP ;----------------------------------------------------------------
;
;----------------------------------------------------------------
DUMPREG_FDC  PROC   NEAR
        lea    ax, dmpr_er
        push   ax
        mov    ah, CMD_DUMPREG
        call   fdc_out
        call   results
        pop    ax
dmpr_er:
        ret
DUMPREG_FDC  ENDP ;----------------------------------------------------------------
; CHK_STAT_2
;
; ON EXIT:  @DSKETTE_STATUS, CY REFLECT STATUS OF OPERATION
;----------------------------------------------------------------
; ok
CHK_STAT_2        PROC   NEAR
        mov    ax, offset cs_back
        push   ax
        call   wait_int
        jc     j34
        mov    ah, CMD_SENSE_INT
        call   fdc_out
        call   results
        jc     j34
        mov    al, bptr ds:fdc_status
        and    al, 01100000b
        cmp    al, 01100000b
        jz     j35
        clc
j34:
        pop    ax
cs_back:
        ret
j35:
        or     bptr ds:dskette_status, BAD_SEEK
;       DMR_LP
        stc
        jmp    short j34
CHK_STAT_2        ENDP ;----------------------------------------------------------------
; RECAL           RECALIBREATE DRIVE
;
; ON ENTRY:
;
; ON EXIT:  CY REFLECT STATUS OF OPERATION
;----------------------------------------------------------------
; ok
```

- 93 -

DOCKET NO. 2055

```
RECAL       PROC  NEAR
        push  cx
        lea   ax, rc_back
        push  ax
        mov   ah, CMD_RECAL
        call  fdc_out
        mov   ah, bptr ds:[bp].drive
        call  fdc_out
        call  chk_stat_2
        pop   ax
rc_back:
        pop   cx
        ret
RECAL       ENDP ;----------------------------------------------------------------
; WAITMS     - 1 ms delay * cx
;----------------------------------------------------------------
WAITMS      PROC  NEAR
        pushf
@@:
        call  timer0ms
        loop  @b
        popf
        ret
WAITMS      ENDP ;----------------------------------------------------------------
; TIMER1MS   Timer1 for delay 1 ms
;----------------------------------------------------------------
; CLOCKOUT  = CLK/2
; f(timer1) = 10Mhz / 4 = 2.5 Mhz
;           = 0.40 us
; T1CMPA(1ms) = 1 ms / 0.40 us = 2500
;
; f(timer1) = 6Mhz / 4 = 1.5 Mhz
;           = 0.66 us
; T1CMPA(1ms) = 1 ms / 0.66 us = 1500
;
IF CLKCPU20
T1Compare   EQU   2500          ; every 1 ms
ELSE
T1Compare   EQU   1500          ; every 1 ms
ENDIF

MAXCOUNT    EQU   0020H         ;

TIMER1MS    PROC  NEAR  USES  AX DX
        mov   dx, REG_T1CNT     ; clear Count register
        xor   ax, ax
        out   dx, ax mov   dx, REG_T1CMPA    ; set max count value
        mov   ax, T1Compare
        out   dx, ax mov   dx, REG_T1CON     ; setup control word
        mov   ax, 0C000h
```

- 94 -

DOCKET NO. 2055

```
        out     dx, ax
@@:
        in      ax, dx
        test    ax, MAXCOUNT
        jz      @b and     ax, not MAXCOUNT
        out     dx, ax
        ret
TIMER1MS        ENDP TIMEROMS        PROC    NEAR    USES    AX DX
        mov     dx, REG_TOCNT           ; clear Count register
        xor     ax, ax
        out     dx, ax mov     dx, REG_TOCMPA          ; set max count value
        mov     ax, T1Compare
        out     dx, ax mov     dx, REG_TOCON           ; setup control word
        mov     ax, 0C000h
        out     dx, ax
@@:
        in      ax, dx
        test    ax, MAXCOUNT
        jz      @b and     ax, not MAXCOUNT
        out     dx, ax
        ret
TIMEROMS        ENDP ;---------------------------------------------------------------
; RWV_COM:      SENDS PATAMETERS TO FDC
;
; ON EXIT:      @DSKETTE_STATUS, CY REFLECT STATUS OF OPERATION
;---------------------------------------------------------------
; ok
RWV_COM         PROC    NEAR
        lea     ax, er_2
        push    ax                      ; put error return
        mov     ah, bptr ds:fdc_cmd     ; output command
        call    fdc_out mov     ah, bptr ds:[bp].head
        sal     ah, 2
        mov     al, bptr ds:[bp].drive
        or      ah, al
        call    fdc_out mov     ah, bptr ds:[bp].track
        call    fdc_out mov     ah, bptr ds:[bp].head
        call    fdc_out mov     ah, bptr ds:[bp].sector
```

DOCKET NO. 2055

```
        call    fdc_out mov     dl, 3
        call    get_parm            ; byte per sector
        call    fdc_out mov     dl, 4               ; EOT
        call    get_parm
        call    fdc_out mov     dl, 5               ; gap length for read/write
        call    get_parm            ; for 720, 1.44 2.88 = 1BH
        call    fdc_out mov     dl, 6               ; DTL parametr = 0FFH
        call    get_parm
        call    fdc_out
        pop     ax
er_2:
        ret
RWV_COM         ENDP ;----------------------------------------------------------------
; MOTOR_ON: turn motor on and wait for motor start time
;----------------------------------------------------------------
MOTOR_ON        PROC    NEAR    ;USES AX DX
        call    turn_on
        jc      mot_is_on
m_wait:
        mov     cx, MOTOR_STARTUP   ; see tfdc.inc
        call    waitms
mot_is_on:
        ret
MOTOR_ON        ENDP ;----------------------------------------------------------------
; TURN_ON: turn motor on and return wait state
; ENTRY:
; EXIT:         CY = 0, means wait required
;               CY = 1, no waits required
;----------------------------------------------------------------
;;
TURN_ON         PROC    NEAR
        mov     bl, bptr ds:[bp].drive
        mov     cl, bl
        rol     bl, 4
        cli
        mov     bptr ds:motor_count, 0FFH
        mov     al, bptr ds:motor_status
        and     al, 00110000b
        mov     ah, 1
        shl     ah, cl cmp     al,bl jnz     turn_it_on
        test    ah, bptr ds:motor_status
        jnz     no_mot_wait
```

- 96 -

DOCKET NO. 2055

```
turn_it_on:
        or      ah, bl
        mov     bh, bptr ds:motor_status
        and     bh, 0fh
        and     bptr ds:motor_status, 11001111b
        or      bptr ds:motor_status, ah
        mov     al, bptr ds:motor_status
        mov     bl, al
        and     bl, 0fh
        sti
        and     al, 00111111b
        rol     al, 4
        or      al, 00001100b
        mov     dx, F2+DOR
IF MOT_SEL
MOV     AL, MOT_SEL
ENDIF IFDEF DEBUG
        call    trc_al
ENDIF
        out     dx, al
        cmp     bl, bh
        jz      no_mot_wait
        clc
        ret no_mot_wait:
        stc
        sti
        ret
TURN_ON         ENDP ;-----------------------------------------------------------------
; FDC_TERM: waits for the operation then accepts the status
;           from the FDC for read/write/verify
;
; ON EXIT:  @DSKETTE_STATUS, CY REFLECT STATUS OF OPERATION
;-----------------------------------------------------------------
; ok
FDC_TERM        PROC    NEAR
;       push    si
        call    wait_int
        pushf
        call    results
        jc      set_end_pop
        popf
        jc      set_end cld
        lea     si, ds:fdc_status
        lods    bptr ds:fdc_status
        and     al, 11000000b
        jz      set_end
        cmp     al, 01000000b
        jnz     j18 lods    bptr ds:fdc_status
```

- 97 -

DOCKET NO. 2055

```
        sal     al, 1
        mov     ah, RECORD_NOT_FND
        jc      j19
        sal     al, 2
        mov     ah, BAD_CRC
        jc      j19
        sal     al, 1
        mov     ah, BAD_DMA
        jc      j19
        sal     al, 2
        mov     ah, RECORD_NOT_FND
        jc      j19
        sal     al, 1
        mov     ah, WRITE_PROTECT
        jc      j19
        sal     al, 1
        mov     ah, BAD_ADDR_MARK
        jc      j19
j18:
        mov     ah, BAD_FDC
j19:
        or      bptr ds:dskette_status, ah
set_end:
        cmp     bptr ds:dskette_status, 1
        cmc
;       pop     si
        ret
set_end_pop:
        popf
        jmp     short set_end

FDC_TERM        ENDP

;-----------------------------------------------------------------
; SEEK
;
; ON ENTRY: DI    : DRIVE #
;           CH    : TRACK #
;
; ON EXIT:  @DSKETTE_STATUS, CY REFLECT STATUS OF OPERATION
;           AX, BX, CX, DX DESTROYED
;-----------------------------------------------------------------
SEEK            PROC    NEAR
        mov     bx, di
        mov     dx, offset nec_err      ; drive #
        push    dx
        mov     al, 1
        xchg    cl, bl
        rol     al, cl
        xchg    cl, bl
        test    al, seek_status jnz     j28a
        or      seek_status, al
```

DOCKET NO. 2055

```
        call    recal
        jnc     aft_recal mov     dskette_status, 0
        call    recal
        jc      rb aft_recal:
        mov     bptr ds:dsk_trk[di], 0
        or      ch, ch
        jz      do_waits
j28a:
r7:
        cmp     ch, bptr ds:dsk_trk[di]
        je      rb mov     bptr ds:dsk_trk[di], ch
        mov     ah, CMD_SEEK
        call    fdc_out
        mov     ax, di
        xchg    al, ah
        call    fdc_out
        mov     ah, bptr ds:dsk_trk[di]
        call    fdc_out
        call    chk_stat_2
do_waits:
        pushf
        mov     dl, 9
        call    get_parm        ; head-settle time
        push    cx
        mov     cl, ah
        xor     ch, ch
        call    waitms
        pop     cx
        popf
rb:
        pop     ax
nec_err:
        ret
SEEK    ENDP ;----------------------------------------------------------------
; MED_CHANGE:
;
; ON EXIT:  CY =1 MEANS MEDIA CHANGE OR TIMEOUT
;           @DSKETTE_STATUS = ERROR CODE
;----------------------------------------------------------------
;;
MED_CHANGE  PROC  NEAR
        call    read_dskchng
        jz      med_c9
        and     bptr dsk_state[di], not MED_DET
        mov     al, 1
        shl     al, cl
        not     al
        cli
        and     motor_status, al
        sti
```

- 99 -

DOCKET NO. 2055

```
;call trc_al
        call    disk_reset
        call    motor_on
        mov     ch, 10
        call    seek
        xor     ch, ch
        call    seek
        mov     dskette_status, MEDIA_CHANGE
        call    read_dskchng
        jz      med_c8
        mov     dskette_status, TIME_OUT
med_c8:
        stc
        ret
med_c9:
        clc
        ret
MED_CHANGE      ENDP ;--------------------------------------------------------------------
; READ_DSKCHNG
;
; ON EXIT: @DSKETTE_STATUS, CY REFLECT STATUS OF OPERATION
;--------------------------------------------------------------------
;OK
READ_DSKCHNG            PROC    NEAR
        call    motor_on
        mov     dx, F2+DIR
        in      al, dx
        test    al, DSK_CHG
IF TRC_DSKCHNG
        CALL    TRC_AL
ENDIF
        ret
READ_DSKCHNG            ENDP ;--------------------------------------------------------------------
; READ_ID:
;
; ENTRY:    DI: = drive
;
; EXIT:         DI: bit 2 is reset, bits 1,0 = drive
;               DISKETTE_STATUS, CY - STATUS OF OPERATION
;--------------------------------------------------------------------
;OK
READ_ID         PROC    NEAR
        mov     ax, offset er_3
        push    ax
        mov     ah, CMD_READ_ID         ;4ah
        call    fdc_out
        mov     ax, di                  ; al = drive
        mov     ah, ds:[bp].head        ;
        sal     ah, 2                   ;
        and     ah, 04h
        or      ah, al                  ; clean the rest bits
        call    fdc_out
        call    fdc_term
        pop     ax
```

- 100 -

DOCKET NO. 2055

```
er_3:
        ret
READ_ID         ENDP
;----------------------------------------------------------
; SEND_RATE
;       SENDS DATA RATE COMMAND TO FDC IF PREVIOUS RATE WAS DIFFERENT
;----------------------------------------------------------
;OK
SEND_RATE       PROC    NEAR
        mov     ah, bptr ds:lastrate
        mov     al, bptr ds:dsk_state[di]
        and     ax, SEND_MSK*X
        cmp     ah, al
        je      c_s_out and     bptr ds:lastrate, not SEND_MSK
        or      bptr ds:lastrate, al
        rol     al, 2 mov     dx, F2+CCR
        out     dx, al
;       mov     dx, F1+CCR
;       out     dx, al
c_s_out:
        ret
SEND_RATE       ENDP

MODULE FLDRIVER.ASM

PAGE 60,132
TITLE Turbo Floppy Disk Controller. CSC Copyright(C) 1995.
;******************************************************************
;
; FLDRIVER.ASM - floppy driver
;
;******************************************************************
;----------------------------------------------------------
; DISK_RESET
;
; ON EXIT:  @DSKETTE_STATUS, CY REFLECT STATUS OF OPERATION
;----------------------------------------------------------
;ok
;RDTR           EQU     0
;MODE_CONFIG    EQU     0       ; lock after hard ware reset -> 0

DISK_RESET      PROC    NEAR mov     dx, F2+DOR              ; control port
        cli
        mov     bp, SEG _MCDATA
        mov     ds, bp
        lea     bp, mcreq               ; ds:[bp] -> request
mov     ds:bptr ds:dskette_status, 0
        mov     al, bptr ds:motor_status
```

- 101 -

DOCKET NO. 2055

```
		and	al, 00111111b
		rol	al, 4
		or	al, 00001000b
		out	dx, al
		mov	bptr ds:seek_status, 0
		jmp	$+2
		or	al, 00000100b
		out	dx, al
		sti
		call	wait_int			; wait for the interrupt
		jc	dr_err mov	cx, 11000000b
nxt_drv:
		push	cx
		mov	ax, offset dr_pop_err
		push	ax
		mov	ah, CMD_SENSE_INT		;
		call	fdc_out
		pop	ax call	results
		pop	cx
		jc	dr_err
		cmp	cl, bptr ds:fdc_status
		jnz	dr_err
		inc	cl
		cmp	cl, 11000011b			; all drivers cleared ?
		jbe	nxt_drv mov	ax, offset resbac
		push	ax
		mov	ah, CMD_SPECIFY			;
		call	fdc_out
		sub	dl, dl				; step rate time and MFT
		call	get_parm
		call	fdc_out
		mov	dl, 1				; MNT and DMA
		call	get_parm			;
		call	fdc_out mov	ah, CMD_MODE0
		call	fdc_out
		mov	ah, CMD_MODE1
		call	fdc_out
		mov	ah, CMD_MODE2
		call	fdc_out
		mov	dl, 9				; head settle time
		call	get_parm
		and	ah, 0Fh
		or	ah, CMD_MODE3
		call	fdc_out
		mov	ah, CMD_MODE4
		call	fdc_out
		pop	ax
IF RESETINT
		call	wait_int
		jc	dr_err
```

- 102 -

DOCKET NO. 2055

```
ENDIF
resbac:
      call    setup_end
      ret
dr_pop_err:
      pop     cx
dr_err:
      or      bptr ds:dskette_status, BAD_FDC
      jmp     resbac
DISK_RESET  ENDP ;---------------------------------------------------------------
; DISK_STATUS:  DISKETTE STATUS
;
; ON ENTRY: AH: STATUS OF PREVIOS OPERATION
;
; ON EXIT:  AH, @DSKETTE_STATUS, CY REFLECT STATUS OF OPERATION
;---------------------------------------------------------------
;ok
DISK_STATUS PROC  NEAR
                             ; AL = status previous operation
      mov     al, bptr ds:dskette_status
; from setup_end
      mov     dl, 2
      push    ax
      call    get_parm
      mov     bptr ds:motor_count, ah
      pop     ax mov     ah, NO_ERR
      ret
DISK_STATUS ENDP ;---------------------------------------------------------------
; FNC_ERR:
;
; ON EXIT:  @DISKETTE_STATUS, CY REFLECT STATUS OF OPERATION
;---------------------------------------------------------------
;ok
FNC_ERR           PROC  NEAR
      mov     ah, BAD_CMD
      mov     bptr ds:dskette_status, ah
      stc
      ret
FNC_ERR           ENDP ;---------------------------------------------------------------
; DISK_READ
;
; ON ENTRY:
;
; ON EXIT: DISKETTE_STATUS, CY REFLECT STATUS OF OPERATION
;---------------------------------------------------------------
DISK_READ   PROC  NEAR
      call    abssector       ; bx - abs sector number
      call    select_bank     ; cx:bx = segment:offset for dmasetup call    check_tab       ; CY = 0-sector in cache, status-ok
```

- 103 -

DOCKET NO. 2055

```
        jnc     @f                      ; ah = 0, al = sect_count
        and     bptr ds:motor_status, 7fh
        mov     fdc_cmd, CMD_READ_TRACK
IF 1
        call    rdt_dma_setup           ; cx:bx = segment:offset for dmasetup
        PUSH    DS
        PUSH    BX
        MOV     BX, 8000H
        MOV     DS, BX
        MOV     BX, 0
        MOV     [BX], 1234H
        MOV     AX, 0001
        POP     BX
        POP     DS
        DMR_LP
;:
ELSE
        call    rdt_dma_setup           ; cx:bx = segment:offset for dmasetup
        call    rd_wr_vf
ENDIF
@@:
        ret
DISK_READ       ENDP ;-------------------------------------------------------------------
; DISK_READ_TRACK
;
; ON ENTRY:
;
; ON EXIT:  DISKETTE_STATUS, CY REFLECT STATUS OF OPERATION
;-------------------------------------------------------------------
DISK_READ_TRACK   PROC    NEAR
        and     bptr ds:motor_status, 7fh
        mov     fdc_cmd, CMD_READ_TRACK
        call    rd_wr_vf
        ret
DISK_READ_TRACK   ENDP ;-------------------------------------------------------------------
; DISK_WRITE
;
; ON ENTRY:
;
; ON EXIT:  DISKETTE_STATUS, CY REFLECT STATUS OF OPERATION
;-------------------------------------------------------------------
;:
DISK_WRITE      PROC    NEAR
;:
        or      bptr ds:motor_status, 80h
        mov     fdc_cmd, CMD_WRITE
;       call    write2buf
;       call    wr_dma_setup
        call    rd_wr_vf
        ret
DISK_WRITE      ENDP ;-------------------------------------------------------------------
; DISK_VERF
```

- 104 -

DOCKET NO. 2055

```
;
; ON ENTRY:
;
; ON EXIT:   @DISKETTE_STATUS, CY REFLECT STATUS OF OPERATION
;-----------------------------------------------------------------
DISK_VERF   PROC    NEAR
      and   bptr ds:motor_status, 7fh
      mov   fdc_cmd, CMD_VERIFY
      call  rd_wr_vf
      ret
DISK_VERF   ENDP ; ****************************************************************THE REST
; ****************************************************************THE REST
; ****************************************************************THE REST
; ****************************************************************THE REST
; ****************************************************************THE REST
; ****************************************************************THE REST
; ****************************************************************THE REST
; ****************************************************************THE REST
IF 0

;-----------------------------------------------------------------
; DISK_STATUS:   DISKETTE STATUS
;
; ON ENTRY: AH: STATUS OF PREVIOS OPERATION

; ON EXIT:  AH, @DSKETTE_STATUS, CY REFLECT STATUS OF OPERATION
;-----------------------------------------------------------------
DISK_STATUS PROC   NEAR
      mov   bptr ds:@dskette_status, ah
      call  setup_end
      mov   bx, si
      mov   al, bl
      ret
DISK_STATUS ENDP ;-----------------------------------------------------------------
; DISK_READ
;
; ON ENTRY: DI    : DRIVE #
;           SI-HI : HEAD #
;           SI-LO : # OF SECTORS
;           ES    : BUFFER SEGMENT
;           [BP]  : SECTOR #
;           [BP+1]    : TRACK #
;           [BP+2]    : BUFFER OFFSET
;
; ON EXIT:  DISKETTE_STATUS, CY REFLECT STATUS OF OPERATION
;-----------------------------------------------------------------
DISK_READ   PROC   NEAR   USES  ax bx cx dx si di and   bptr ds:@motor_status, 7fh
      mov   ax, 0c646h
;     mov   al, 46h          ; ah = NEC command, al = DMA command
;     mov   ah, 0c6h
      call  rd_wr_vf
```

- 105 -

DOCKET NO. 2055

```
        ret
DISK_READ    ENDP

;-----------------------------------------------------------------
; DISK_WRITE
;
; ON ENTRY: DI    : DRIVE #
;           SI-HI : HEAD #
;           SI-LO : # OF SECTORS
;           ES    : BUFFER SEGMENT
;           [BP]  : SECTOR #
;           [BP+1]    : TRACK #
;           [BP+2]    : BUFFER OFFSET
;
; ON EXIT:  DISKETTE_STATUS, CY REFLECT STATUS OF OPERATION
;-----------------------------------------------------------------
DISK_WRITE   PROC  NEAR mov   ax, 0c54ah        ; ax = NEC command, DMA command
        or    bptr ds:@motor_status, 80h
        call  rd_wr_vf
        ret

DISK_WRITE   ENDP

;-----------------------------------------------------------------
; DISK_VERF
;
; ON ENTRY: DI    : DRIVE #
;           SI-HI : HEAD #
;           SI-LO : # OF SECTORS
;           ES    : BUFFER SEGMENT
;           [BP]  : SECTOR #
;           [BP+1]    : TRACK #
;           [BP+2]    : BUFFER OFFSET
;
; ON EXIT:  @DISKETTE_STATUS, CY REFLECT STATUS OF OPERATION
;-----------------------------------------------------------------
DISK_VERF    PROC  NEAR and   bptr ds:@motor_status, 7fh
        mov   ax, 0e642h        ; ax = NEC command, DMA command
        call  rd_wr_vf
        ret

DISK_VERF    ENDP

;-----------------------------------------------------------------
; DISK_FORMAT
;
; ON ENTRY: DI    : DRIVE #
;           SI-HI : HEAD #
;           SI-LO : # OF SECTORS
;           ES    : BUFFER SEGMENT
;           [BP]  : SECTOR #
;           [BP+1]    : TRACK #
;           [BP+2]    : BUFFER OFFSET
```

- 106 -

DOCKET NO. 2055

```
;
; ON EXIT:  @DISKETTE_STATUS, CY REFLECT STATUS OF OPERATION
;-------------------------------------------------------------------
DISK_FORMAT PROC  NEAR
       ret
DISK_FORMAT ENDP ;-------------------------------------------------------------------
; DISK_PARMS:
;
; ON EXIT:  see int_13h
;-------------------------------------------------------------------
DISK_PARMS  PROC  NEAR ret
DISK_PARMS  ENDP ;-------------------------------------------------------------------
;      DRIVE PRAMETER TABLE
;-------------------------------------------------------------------
DR_PT  db    09h, 027h
       db    0fh, 04fh
       db    09h, 4fh
;...
DR_PTE      EQU   $ ;-------------------------------------------------------------------
; DISK_TYPE:
;
; ON EXIT:  AH: DRIVE TYPE, CY = 0
;see int_13h
;-------------------------------------------------------------------
DISK_TYPE   PROC  NEAR
       ret
DISK_TYPE   ENDP ;-------------------------------------------------------------------
; DISK_CHANGE:
;
; ON ENTRY: DI: DRIVE #
;
; ON EXIT:  AH : @DSKETTE_STATUS
;           00 - DISK CHANGE LINE INACTIVE, CY = 0
;           06 - DISK CHANGE LINE ACTIVE, CY = 1
;-------------------------------------------------------------------
DISK_CHANGE PROC  NEAR
       ret
DISK_CHANGE ENDP ;-------------------------------------------------------------------
; FORMAT_SET:
;
; ON ENTRY: SI LOW : DASD TYPE FOR FORMAT
;           DI     : DRIVE #
;
; ON EXIT:  @DSKETTE_STATUS REFLECT STATUS
;           AH : @DSKETTE_STATUS
```

- 107 -

DOCKET NO. 2055

```
;           CY = 1 IF ERROR
;
;---------------------------------------------------------------
FORMAT_SET  PROC  NEAR
        ret
FORMAT_SET  ENDP FNC_ERR           PROC   NEAR
        ret
FNC_ERR           ENDP mov     dx, DOR
        cli
        mov     al, bptr ds:@motor_status
        and     al, 00111111b
        rol     al, 4
        or      al, 00001000b
        mov     bptr ds:@seek_status, 0
        jmp     $+2
;       or      al, 00000100b
        and     al, 11111011b
;---------------
;mov cx, 50
@@:
        out     dx, al
;loop @b
;---------------
        or      al, 00000100b
        out     dx, al
        sti
        call    wait_int
        jc      dr_err
;call beep
        mov     cx, 11000000b
nxt_drv:
        push    cx
        mov     ax, offset dr_pop_err
        push    ax
        mov     ah, 08h; SENSE INTERRUPT
        call    nec_out
        pop     ax
        call    results
        pop     cx
        jc      dr_err
        cmp     cl, bptr ds:@nec_status
        jnz     dr_err
        inc     cl
        cmp     cl, 11000011b
        jbe     nxt_drv mov     ax, offset resbac
```

- 108 -

```
        push    ax
        mov     ah, 03h; SPECIFY
        call    nec_out
        sub     dl, dl
        call    get_parm
        call    nec_out
        mov     dl, 1
        call    get_parm
        call    nec_out
        pop     ax resbac:
        call    setup_end
        mov     bx, si
        mov     al, bl
        ret dr_pop_err:
        pop     cx dr_err:
;       call    beep
;       call    beep
        or      bptr ds:@dskette_status, BAD_NEC
        jmp     short resbac
ENDIF
```

MODULE FNC_TAB.ASM

```
PAGE 60,132
TITLE Turbo Floppy Disk Controller. CSC Copyright(C) 1995.
;****************************************************************
;
; FNC_TAB.ASM - INT13H functions
;
;****************************************************************

;---------------------------------------------------------------
FNC_TAB  dw     DISK_RESET              ; 00H reset disk system
         dw     DISK_STATUS             ; 01H get disk system prev status
         dw     DISK_READ              ; 02H read
         dw     DISK_WRITE              ; 03H write
         dw     DISK_VERF              ; 04H verify
         dw     FNC_ERR;DISK_FORMAT     ; 05H format
         dw     FNC_ERR                 ; 06H
         dw     FNC_ERR                 ; 07H
         dw     FNC_ERR;DISK_PARMS      ; 08H read drive parameters
         dw     FNC_ERR                 ; 09H
         dw     DISK_READ_TRACK;FNC_ERR          ; 0AH
         dw     FNC_ERR                 ; 0BH
         dw     FNC_ERR                 ; 0CH
         dw     FNC_ERR                 ; 0DH
         dw     FNC_ERR                 ; 0EH
         dw     FNC_ERR                 ; 0FH
         dw     FNC_ERR                 ; 10H
```

DOCKET NO. 2055

```
        dw      FNC_ERR;DISK_RECAL      ; 11H recalibrate drive
        dw      FNC_ERR;MC_RAM          ; 12H MC RAM diagnostic
        dw      FNC_ERR;MC_DRIVE        ; 13H MC drive diagnostic
        dw      FNC_ERR;MC_DIAGS        ; 14H MC internal diagnostic
        dw      FNC_ERR;DISK_TYPE       ; 15H read DASD type
        dw      FNC_ERR;DISK_CHANGE     ; 16H diskette change line status
        dw      FNC_ERR;FORMAT_SET      ; 17H set DASD type for format
FNC_TAE EQU     $
```

MODULE HANDLERS.ASM

```
PAGE 60,132
TITLE Turbo Floppy Disk Controller. CSC Copyright(C) 1995.
;****************************************************************
;
; HANDLERS.ASM - interrupt handlers
;
;****************************************************************

NO_OFF              EQU     0
TRC_INT_TIMER       EQU     0
TIMER_MOTOR_MSK     EQU     04H

; Vector Table

Vector_table        label   word dw      offset INT_00H          ; Divide Error
        dw      offset INT_01H          ; Single Step
        dw      offset INT_02H          ; NMI
        dw      offset INT_03H          ; Breakpoint
        dw      offset INT_04H          ; Overflow
        dw      offset INT_05H          ; Array Bounds
        dw      offset INT_06H          ; Unused Code
        dw      offset INT_07H          ; ESC Opcode
        dw      offset INT_08H          ; Timer0
        dw      offset INT_09H          ; Reserved
        dw      offset INT_0AH          ; DMA0
        dw      offset INT_0BH          ; DMA1
        dw      offset INT_0CH          ; INT0
        dw      offset INT_0DH          ; INT1
        dw      offset INT_0EH          ; INT2
        dw      offset INT_0FH          ; INT3
        dw      offset INT_10H          ; Numerics
        dw      offset INT_11H          ; Reserved
        dw      offset INT_12H          ; Timer1
        dw      offset INT_13H          ; Timer2
Vector_table_end    EQU     $ ; Interrupt Handlers INT_00H             PROC    FAR
        iret
INT_00H             ENDP
```

- 110 -

DOCKET NO. 2055

```
INT_01H          PROC  FAR
    iret
INT_01H    ENDP

INT_02H          PROC  FAR
    iret
INT_02H    ENDP

INT_03H          PROC  FAR
    iret
INT_03H    ENDP

INT_04H          PROC  FAR
    iret
INT_04H    ENDP

INT_05H          PROC  FAR
    iret
INT_05H    ENDP

INT_06H          PROC  FAR
    iret
INT_06H    ENDP

INT_07H          PROC  FAR
    iret
INT_07H    ENDP

INT_08H          PROC  FAR iret
INT_08H    ENDP

INT_09H          PROC  FAR
    iret
INT_09H    ENDP

INT_0AH          PROC  FAR
    iret
INT_0AH    ENDP

; DMA1
INT_0BH          PROC  FAR
        sti
;       MOV   DX, F2+FIFO
;       IN    AL, DX
        mov   dx, PORT_STATUS ;       mov   al, st_port
;       or    al, 0f0h
;       mov   st_port, al
;       out   dx, al call  delay
;       call  trc_al
```

- 111 -

DOCKET NO. 2055

```
        mov     dx, REG_EOI
        mov     ax, EOI_DMA1
IF TRC_INT
;       call    trc_al
ENDIF
        out     dx, ax
        iret
INT_0BH         ENDP INT_0CH         PROC    FAR
        iret
INT_0CH         ENDP ;----------------------------------------------------------------
; INT_0DH       INT1 from floppy 2
;
; ON EXIT:  @DSKETTE_STATUS, CY REFLECT STATUS OF OPERATION
;----------------------------------------------------------------
INT_0DH         PROC    NEAR    USES    AX DX DS BP
        sti IF TRG_INT
        TRGF1
ENDIF
        mov     bp, SEG _MCDATA
        mov     ds, bp
        lea     bp, mcreq
        or      bptr seek_status, INT_FLAG mov     dx, REG_EOI
        mov     ax, EOI_INT1
IF TRC_INT
        call    trc_al
ENDIF out     dx, ax
        iret
INT_0DH             ENDP

INT_0EH             PROC    FAR iret
INT_0EH     ENDP

INT_0FH             PROC    FAR iret
INT_0FH     ENDP

INT_10H             PROC    FAR iret
INT_10H     ENDP

INT_11H             PROC    FAR
```

- 112 -

DOCKET NO. 2055

```
        iret
INT_11H     ENDP

INT_12H           PROC  FAR iret
INT_12H     ENDP
;------------------------------------------------------------------
; timer2 generate interrupt 13H every 10 ms
; handler checks motor_status and motor_count and turn off motor if
; motor_count = 0
;------------------------------------------------------------------
INT_13H           PROC  FAR sti
;       TRGF1
        push  ax
        push  dx
        push  ds
        push  bp
        mov   bp, _MCDATA
        mov   ds, bp
        lea   bp, mcreq
        mov   al, motor_status
        and   al, 0FH
        jz    ex_13h
        test  timer_count, TIMER_MOTOR_MSK
        jz    ex_13h
        dec   motor_count
        jz    m_off
ex_13h:
        ; send end of interrupt
        inc   timer_count mov   dx, REG_EOI
        mov   ax, EOI_TMR
        out   dx, ax
        pop   bp
        pop   ds
        pop   dx
        pop   ax
        iret
m_off:
        mov   dx, F2+DOR
        mov   al, 0ch
IFE NO_OFF
        out   dx, al
        mov   bptr ds:motor_status, 0
ENDIF
        jmp   ex_13h
INT_13H     ENDP
```

- 113 -

DOCKET NO. 2055

MODULE INIT_CU.ASM

PAGE 60,132
TITLE Turbo Floppy Disk Controller. CSC Copyright(C) 1995.
```
;*******************************************************************
;
; INIT_CU.ASM - Chip-select Unit initialization
;
;*******************************************************************

;------- PERIPHERAL CONTROL BLOCK
UMCS_VAL     EQU    3006H       ; 64 Kbytes
LMCS_VAL     EQU    3FC0H       ; 256 KB
MPCS_VAL     EQU    4084H;
MMCS_VAL     EQU    8004H;
PACS_VAL     EQU    0004H;

mov    dx, REG_UMCS
     mov    ax, UMCS_VAL
     out    dx, al mov    dx, REG_LMCS
     mov    ax, LMCS_VAL
     out    dx, al mov    dx, REG_MPCS
     mov    ax, MPCS_VAL
     out    dx, al mov    dx, REG_MMCS
     mov    ax, MMCS_VAL
     out    dx, al mov    dx, REG_PACS                    ;0FFA4H;
     mov    ax, PACS_VAL                    ;0004H;
     out    dx, al ;------- DRAM Refresh Control Unit
;REG_RFBASE EQU    0FFE0H
;REG_RFTIME EQU    0FFE2H
;REG_RFCON  EQU    0FFE4H
;--------------- REFRESH CONTROL UNIT
RF_DRAM_ADDR       EQU    00000h
RF_CLOCK     EQU         00020H
RF_ENABLE          EQU         08000H mov    dx, REG_RFBASE
     mov    ax, RF_DRAM_ADDR
     out    dx, al mov    dx, REG_RFTIME
     mov    ax, RF_CLOCK
     out    dx, al mov    dx, REG_RFCON
     mov    ax, RF_ENABLE
     out    dx, al
```

- 114 -

DOCKET NO. 2055

```
        mov     cx, 8              ; 8 dummy cycles are required by DRAMS
        xor     di, di             ;    before actual use
exercise_ram:
        mov     wptr [di], 0
        loop    exercise_ram
```

MODULE INIT_FDC.ASM

```
; init floppy disk controllers
 call clr_dual
IFDEF DEBUG
; call      req2dual
        clrtrc
ENDIF call CLR_SECT_TAB mov   bp, _MCDATA
    mov   ds, bp
    lea   bp, mcparm mov   bptr ds:[bp].srt_unload, 0DFH  ; bits 0-3: SRT (step rate time); bits 4-7:
head unload time
    mov   bptr ds:[bp].dma_load, 02H     ; bit 0: 1=use DMA; bits 2-7: head load time
    mov   bptr ds:[bp].motor_wait, 25H   ; motor wait (55-ms increments before
turning off disk motor)
    mov   bptr ds:[bp].sector_size, 02H  ; sector size (0=128, 1=256, 2=512,
3=1024)
    mov   bptr ds:[bp].eot, 12H          ; EOT (last sector on a track)
;   mov   bptr ds:[bp].eot, 9H           ; EOT (last sector on a track)
    mov   bptr ds:[bp].gap_len, 1BH      ; gap length for read/write operations
    mov   bptr ds:[bp].dtl, 0FFH         ; DTL (Data Transfer Length) max transfer
when length not set
    mov   bptr ds:[bp].dtlfmt, 54H       ; gap length for format operation
    mov   bptr ds:[bp].fill_fmt, 0F6H    ; fill character for format (normally 0f6H
'÷')
    mov   bptr ds:[bp].head_settle,0FH   ; head-settle time (in milliseconds)
    mov   bptr ds:[bp].motor_start, 08H  ; motor-startup time (in 1/8th-second
intervals)

;------ software reset and initialization FDC
    mov   dx, F2+DOR            ; control port
    cli
    mov   bp, SEG _MCDATA
    mov   ds, bp
    lea   bp, mcreq
    mov   al, bptr ds:motor_status    ; ds:[bp] -> request
    and   al, 00111111b
    rol   al, 4
    or    al, 00001000b
    out   dx, al
    mov   bptr ds:seek_status, 0
    jmp   $+2
    or    al, 00000100b
```

- 115 -

DOCKET NO. 2055

```
        out     dx, al
        sti
        call    wait_int                        ; wait for the interrupt
        jc      dr_err1 mov     cx, 11000000b
nxt_drv1:
        push    cx
        lea     ax, dr_pop_err1
        push    ax
        mov     ah, CMD_SENSE_INT               ;
        call    fdc_out
        pop     ax call    results
        pop     cx
        jc      dr_err1
        cmp     cl, bptr ds:fdc_status
        jnz     dr_err1
        inc     cl
        cmp     cl, 11000011b                   ; all drivers cleared ?
        jbe     nxt_drv1

; data rate select register 500Mb/s
        mov     dx, F2+CCR
IF 1
        mov     al, RATE_500
        mov     lastrate, al
ELSE
        mov     al, RATE_250
        mov     lastrate, al
ENDIF
        out     dx, al mov     ax, offset resbac1
        push    ax
        mov     ah, CMD_SPECIFY                 ;
        call    fdc_out
        sub     dl, dl                          ; step rate time and MFT
        call    get_parm
        call    fdc_out
        mov     dl, 1                           ; MNT and DMA
        call    get_parm                        ;
        call    fdc_out mov     ah, CMD_MODE0
        call    fdc_out
        mov     ah, CMD_MODE1
        call    fdc_out
        mov     ah, CMD_MODE2
        call    fdc_out
        mov     dl, 9                           ; head settle time
        call    get_parm
        and     ah, 0Fh
        or      ah, CMD_MODE3
        call    fdc_out
        mov     ah, CMD_MODE4
```

- 116 -

DOCKET NO. 2055

```
        call    fdc_out mov     ah, CMD_CONFIG0
        call    fdc_out
        mov     ah, CMD_CONFIG1
        call    fdc_out
        mov     ah, CMD_CONFIG2
        call    fdc_out
        mov     ah, CMD_CONFIG3
        call    fdc_out
        pop     ax
;?????
IF RESETINT
        call    wait_int
        jc      dr_err1
ENDIF
        lea     ax, resbac1
        push    ax
        mov     ah, CMD_LOCK
        call    fdc_out
        pop     ax
        call    results
        jc      dr_err1
        jmp     resbac1
dr_pop_err1:
        pop     cx
dr_err1:
        or      bptr ds:dskette_status, BAD_FDC
resbac1:
        call    setup_end
```

MODULE INIT_TIM.ASM

```
;------- Init Timer2 for generate interrupt every 10 ms
; f(timer2) = 10Mhz / 4 = 2.5 Mhz
;           = 0.40 us
; T2CMPA(10ms) = 10 ms / 0.40 us = 25000
;
; f(timer2) = 6Mhz / 4 = 1.5 Mhz
;           = 0.66 us
; T2CMPA(10ms) = 10 ms / 0.66 us = 15000
;
IF CLKCPU20
T2Compare   EQU     50000           ; every 20 ms
ELSE
T2Compare   EQU     0ffffh;30000            ; every 20 ms
ENDIF
        mov     dx, REG_T2CNT       ; clear Count register
        xor     ax, ax
        out     dx, ax mov     dx, REG_T2CMPA      ; set max count value
        mov     ax, T2Compare
        out     dx, ax
```

- 117 -

DOCKET NO. 2055

```
        mov     dx, REG_T2CON       ; setup control word
        mov     ax, 0e001h
        out     dx, ax mov     dx, REG_TCUCON      ; setup interrupt controller
        xor     ax, ax              ; unmask highest priority int
        out     dx, ax
```

MODULE INIT_VEC.ASM

```
; stack
        mov     ax, 0
        mov     ss, ax
        mov     ax, 0fffeh
        mov     sp, ax ; SETUP Interrupt Vectors
        mov     si, cs
        mov     ds, si
        mov     ax, si              ; ax - segment of Vector_table
        lea     si, Vector_table mov     di, 0               ; es:[di] points to LS 0:0
        mov     es, di
        mov     bx, Vector_table_end loop_set_vectors:
        movsw                       ; copy offset from ds:[si] to es:[di]
        mov     wptr es:[di], ax    ; copy segment
        inc     di
        inc     di
        cmp     si, bx
        jnz     loop_set_vectors ;------- Interrupt Control Unit
        mov     dx, REG_IMASK
;       mov     ax, INT_SETMSK
        mov     ax, INT_CLRMSK
        out     dx, al
```

MODULE MAINDEB.ASM

```
PAGE 60,132
TITLE Turbo Floppy Disk Controller. CSC Copyright(C) 1995.
;********************************************************************
;
; MAINLOOP.ASM - this is the main loop of MC
;
;********************************************************************
;       call    req2dual manager_loop:
```

− 118 −

DOCKET NO. 2055

```
@@:
        call    req2dual
        call    manager
        call    isreqrdy
        jc      @b
        call    start_request
;       DMR_LP
        call    mc_response
;       DMR
;       DDR_LP OR      AH, AH
        JNZ     @F
        call    send_resp
        jmp     manager_loop
@@:
        DMR_LP hlt
        nop
        jmp     @b ;--------------------------------------------------------------------
; MANAGER   does many usefull things
;--------------------------------------------------------------------
MANAGER             PROC  NEAR  ;USES ax
        MOV     CX, 1000
        CALL    WAITMS
        CLRTRC
        CALL    CLR_DUAL
;       CALL    WRITE2BUFF
;       call    delay
        ret
MANAGER             ENDP ;--------------------------------------------------------------------
; ISREQRDY  Is there request from PC ?
;
; ENTRY         DS:BP -> mcreq
;
; EXIT          CY = 1 no request,
;               CY = 0 requset is ready
;               DS:BP -> mcreq
;--------------------------------------------------------------------
ISREQRDY   PROC  NEAR  USES   ax ds bp
        cli
        call    setbusy
        mov     bp, SEG _DUAL
        mov     ds, bp
        lea     bp, pcreq                       ; now ds:bp -> PC request
        .IF (ds:[bp].cmd == -1)
                stc
                jmp     isr_1
        .ELSE
                call    cp_req2mc       ; copy request PC to MC
                mov     bptr ds:[bp].cmd, -1    ; -1 means that request
                clc
        .ENDIF
```

- 119 -

DOCKET NO. 2055

```
isr_1:
        call    clrbusy
        sti
        ret
ISREQRDY        ENDP

SEND_RESP       PROC    NEAR
        call    setbusy
        push    bp
        push    ds
        mov     bp, SEG _DUAL
        mov     ds, bp
        lea     bp, pcreq
        mov     bptr ds:[bp].cmd, 0;2      ; now ds:bp -> PC request
;       INC     BPTR DS:[BP].TRACK
;       MOV     BPTR DS:[BP]. 2
        pop     ds
        pop     bp
        call    clrbusy
        ret
SEND_RESP       ENDP IF 0
;-------------------------------------------------------------------
; CP_REQ2MC copy PC request to LS memory of MC
;-------------------------------------------------------------------
CP_REQ2MC       PROC    NEAR    USES    cx di si ds es
        pushf
        cli
        mov     di, SEG _MCDATA
        mov     es, di
        lea     di, mcreq mov     si, SEG _DUAL
        mov     ds, si
        lea     si, pcreq mov     cx, REQ_LEN
        rep     movsb sti
        popf
        ret
CP_REQ2MC       ENDP ;-------------------------------------------------------------------
; START_REQUEST         jmp table ( ds:[bp].cmd - index),
; ENTRY         DS:BP -> copy of PC request block
; EXIT
;-------------------------------------------------------------------
START_REQUEST   PROC    NEAR
        sti
        mov     bp, SEG _MCDATA
        mov     ds, bp
        lea     bp, mcreq
        mov     ah, bptr ds:[bp].cmd
        cmp     ah, (fnc_tae - fnc_tab)/2
        jb      ok_func
```

- 120 -

DOCKET NO. 2055

```
        mov     ah, 14h                 ;replace with known invalid function
ok_func:
        cmp     ah, 1                   ; reset or status
        jbe     ok_drv
        cmp     ah, 8                   ; read drive parameters
        jz      ok_drv
        cmp     bptr ds:[bp].drive, 1   ; drives 0 and 1 OK
        jbe     ok_drv
        mov     ah, 14h
ok_drv:
        mov     cl, ah                  ; cl = function
        xor     ch, ch
        shl     cl, 1
        lea     bx, fnc_tab
        add     bx, cx                  ; bx = offset into table FNC_TAB
        mov     cl, [bp].drive
        mov     di, cx
        call    wptr cs:[bx]            ; jmp to function
        ret
IF 0
;-------------------------------------------------------------
FNC_TAB dw      DISK_RESET              ; 0 reset disk system
        dw        DISK_STATUS           ; 01 get disk system prev status
        dw        DISK_READ             ; 02 read
        dw        DISK_WRITE            ; 03 write
        dw        DISK_VERF             ; 04 verify
        dw        FNC_ERR;DISK_FORMAT     ; 05 format
        dw      FNC_ERR                 ; 06
        dw        FNC_ERR                 ; 07
        dw        FNC_ERR;DISK_PARMS      ; 08 read drive parameters
        dw      FNC_ERR                 ; 09
        dw        FNC_ERR                 ; 0A
        dw      FNC_ERR                 ; 0B
        dw        FNC_ERR                 ; 0C
        dw      FNC_ERR                 ; 0D
        dw        FNC_ERR                 ; 0E
        dw      FNC_ERR                 ; 0F
        dw        DISK_READ_TRACK;FNC_ERR   ; 10
        dw      FNC_ERR;DISK_RECAL      ; 11 recalibrate drive
        dw        FNC_ERR;MC_RAM          ; 12 MC RAM diagnostic
        dw      FNC_ERR;MC_DRIVE        ; 13 MC drive diagnostic
        dw        FNC_ERR;MC_DIAGS        ; 14 MC internal diagnostic
        dw      FNC_ERR;DISK_TYPE       ; 15 read DASD type
        dw        FNC_ERR;DISK_CHANGE     ; 16 diskette change line status
        dw        FNC_ERR;FORMAT_SET      ; 17 set DASD type for format
FNC_TAE EQU     $
ENDIF
        include fnc_tab.asm

START_REQUEST   ENDP

SEND_RESP       PROC NEAR
        call    setbusy
        push    bp
        push    ds
        mov     bp, SEG_DUAL
        mov     ds, bp
        lea     bp, pcreq               ; now ds:bp -> PC request
```

DOCKET NO. 2055

```
        mov    bptr ds:[bp].cmd, 0
        pop    ds
        pop    bp
        call   clrbusy
        ret
SEND_RESP  ENDP
ENDIF
```

MODULE MAINLOOP.ASM

```
PAGE 60,132
TITLE Turbo Floppy Disk Controller. CSC Copyright(C) 1995.
;****************************************************************
;
; MAINLOOP.ASM - this is the main loop of MC
;
;**************************************************************** manager_loop:
@@:
        call   manager

; set ready for PC FL_MC_READY
        mov    dx, PORT_STATUS
        mov    al, FL_MC_READY
        out    dx, al ; is there request and copy it to MC
        call   isreq
        jc     @b

;       TRGF1

; clear status FL_MC_READY
        xor    al, al
        mov    dx, PORT_STATUS
        out    dx, al call   clr_dual
IFDEF DEBUG
        CLRTRC
ENDIF
        TRGF1 call   start_request
        call   mc_response
        DMR
;       DMR_LP

; set response ready for PC
        mov    dx, PORT_STATUS
        mov    al, FL_MC_RESPONSE
        out    dx, al ; wait acknowledge from PC
@@:
```

- 122 -

DOCKET NO. 2055

```
	TRGF1
	mov	dx, PORT_STATUS
	in	al, dx
	test	al, FL_PC_RESPONSE
;	jz	@b

; clear FL_MC_RESPONSE
	xor	al, al
	out	dx, al

;	DMR_LP
	jmp	manager_loop

;-------------------------------------------------------------
; MANAGER
;-------------------------------------------------------------
MANAGER		PROC   NEAR; USES  ax dx

; does many usefull things
;	...
;	call	isnewdisk
;	jc	man_ex
;	call	read_track2mem
man_ex:
	ret
MANAGER		ENDP ;-------------------------------------------------------------
; ISREQ	Is there request from PC ?
;
; EXIT:		CY = 1 no request,
;		CY = 0 requset is ready
;-------------------------------------------------------------
ISREQ		PROC  NEAR  USES  ax dx cx
	mov	dx, PORT_STATUS
	mov	cx, 100
@@:
	in	al, dx
	test	al, FL_PC_REQUEST
	jnz	@f
	loop	@b
	stc
	ret
@@:
	call	cp_req2mc	; copy request PC to MC
	clc
	ret
ISREQ ENDP
```

DOCKET NO. 2055

MODULE MEDCHNG.ASM

```
        .MODEL      SMALL
        .286
_TEXT SEGMENT       WORD PUBLIC 'CODE'
        ORG     100H
        ASSUME      CS:_TEXT, DS:_TEXT

START:
st1:
        mov     ah, 1
        int     16h
        jnz     ex
; turn on
        xor     cx, cx
al:
        loop    al
        mov     dx, 3f2h
        mov     al, 01ch
        out     dx, al mov     dx, 3f7h
        in      al, dx ; turn off
        push    ax
        mov     dx, 3f2h
        mov     al, 0ch
        out     dx, al
        pop     ax test    al, 80h
        jz      st1
ex:
        int     20h mess    db      13, 10, 'CheckSum D000: 0 - 1FFEH: ', '$'
        include tax.inc

_TEXT ENDS
        END     START
```

MODULE MEMDATA.ASM

```
PAGE 60,132
TITLE Turbo Floppy Disk Controller. CSC Copyright(C) 1995.
;******************************************************************
;
; MEMDATA.ASM - memory data structures and data buffer
;
;******************************************************************

_MCDATA     SEGMENT     AT 40H mcreq               REQUEST <>                      ;
```

– 124 –

DOCKET NO. 2055

```
REQ_LEN            EQU     SIZEOF mcreq

ORG    10H
seek_status db ?           ; drive recalibration status
motor_status    db ?       ;
motor_count db ?           ; time out
dskette_status  db ?              ; floppy previous operation status
dsk_trk         dw ?              ; drive 0 and 1 current track
dsk_state   dw ?           ; drive 0 and 1 media state
fdc_cmd         db ?              ; command FDC
timer_count db ?           ;
lastrate    db ?           ; last diskette rate selected
fdc_status  db 10 dup (?)  ; FDC status bytes
retry_was   db ?
st_port         db ?

ORG    30H
mcparm          DSKTAB  <>
PARM_LEN   EQU     SIZEOF mcparm sector_offseg   dd    ?
abssect         dw    ?
abssect_trk dw  ?
IFDEF DEBUG
cur_bank    db    ?
ENDIF
       ORG    50H
trace      db     80h dup (?)

MAX_TRACKS EQU    80
MAX_HEADS       EQU    2
MAX_EOT         EQU    18
SZSECT_TAB EQU    MAX_TRACKS * MAX_HEADS * MAX_EOT ; = 2880 sector_tab db     SZSECT_TAB dup (?)

_MCDATA    ENDS

; Data buffer for read and write
;_BUFF      SEGMENT    AT 8000H
;data_buff  db    ?
;_BUFF      ENDS _DUAL SEGMENT     AT 0C000H
; !!!
pcreq           REQUEST <>                          ;
pcres      RESPONSE <>
pcparm          DSKTAB  <>
; !!!
       ORG    40h                                   ;
deb_reg         DBG_REG     <>

ORG    80H
lsdata     db     50h    dup (?)

ORG    0150h
deb_buff        db    ?                             ;
```

- 125 -

DOCKET NO. 2055

_DUAL ENDS

MODULE MEMMNGR.ASM

```
PAGE 60,132
TITLE Turbo Floppy Disk Controller. CSC Copyright(C) 1995.
;*****************************************************************
;
; MEMMNGR.ASM - memory manager
;
;*****************************************************************
IF 1
BANK0       EQU     00H
BANK1       EQU     01H
BANK2       EQU     02H
BANK3       EQU     03H
BANK4       EQU     04H
BANK5       EQU     05H
ELSE
BANK0       EQU     00H
BANK1       EQU     01H
BANK2       EQU     02H
BANK3       EQU     08H
BANK4       EQU     10H
BANK5       EQU     20H
ENDIF
SZBANK              EQU     40000H              ; 256K
BANKSECTOR  EQU     504                 ; (SZBANK/SZSECTOR)

;---------------------------------------------------------------
; SELECT_BANK
;
; ENTRY:    BX = abs sector #
;
; EXIT:     CX = SEGMENT
;           BX = OFFSET
;---------------------------------------------------------------
;ok
SELECT_BANK PROC   NEAR   USES   AX DX
        .IF   BX <= BANKSECTOR
              mov    al, BANK5;0
        .ELSEIF BX <= BANKSECTOR*2
              mov    al, BANK1
              sub    bx, BANKSECTOR
        .ELSEIF BX <= BANKSECTOR*3
              mov    al, BANK2
              sub    bx, BANKSECTOR*2
        .ELSEIF BX <= BANKSECTOR*4
              mov    al, BANK3
              sub    bx, BANKSECTOR*3
        .ELSEIF BX <= BANKSECTOR*5
              mov    al, BANK4
              sub    bx, BANKSECTOR*4
        .ELSEIF BX <= BANKSECTOR*6
              mov    al, BANK0;5
```

DOCKET NO. 2055

```
        sub    bx, BANKSECTOR*5
    .ENDIF mov    cl, al                ; cl = bank number
IFDEF DEBUG
        mov    cur_bank, al
ENDIF
        mov    dx, BANK_SEL
        out    dx, al                ; bank select port ; calculation of address
        dec    bx                    ; sector = 1,  offset = 0
        mov    ax, SZSECTOR
        mul    bx                    ; result dx:ax
        mov    bx, ax                ; BX = offset, DX = segment
        and    dx, 000FH             ; clear
        or     dx, 0008H             ; MCS0,1 = address 80000-BFFFFH
        .IF    cl == BANK0;5
        inc    dx                    ; 1st 64k in bank 5 is system mem
        .ENDIF
        mov    cx, dx                ; 80000; CX = segment, BX = offset
        mov    wptr sector_offseg, bx
        push   cx
        ror    cx, 4
        mov    wptr sector_offseg+2, cx
        pop    cx
;       DMR_LP
        ret
SELECT_BANK ENDP ;----------------------------------------------------------------
; STATUS_CACHE
;
; ENTRY:
;
; EXIT:        AH = dskette_status = 0, AL = mcreq.sector_count
;----------------------------------------------------------------
STATUS_CACHE    PROC  NEAR  USES  BP
        mov    ah, 0
        mov    al, ds:[bp].sect_count
;       MOV    SI,5555H
;       DMR_LP
        ret
STATUS_CACHE    ENDP ;----------------------------------------------------------------
; CLR_SECT_TAB
;----------------------------------------------------------------
CLR_SECT_TAB    PROC  NEAR  USES  AX CX DI DS
        mov    di, MCDATA
        mov    ds, di
        lea    di, sector_tab
        xor    al, al
        mov    cx, SZSECT_TAB
        cld
        rep    stosb
        ret
CLR_SECT_TAB    ENDP
```

DOCKET NO. 2055

```
;------------------------------------------------------------
; READ_CACHE
;
; EXIT:         CY = 0, sector in memory
;               CY = 1, sector is not in memory
;------------------------------------------------------------
READ_CACHE   PROC  NEAR
        call    check_tab
        jc      rm_ex
        call    status_cache
        clc
rm_ex:
        ret
READ_CACHE   ENDP ;------------------------------------------------------------
; CHECK_TAB     are sectors in memory ?
;
; EXIT:         CY = 0, sectors are in memory
;               CY = 1, sectors are not in memory
;------------------------------------------------------------
;ok
CHECK_TAB    PROC  NEAR  USES  SI CX BX
        mov     bp, SEG _MCDATA
        mov     ds, bp
        lea     bp, mcreq mov     bx, abssect         ; bx - abs sector number
        lea     si, sector_tab add     si, bx
        dec     si                  ; si -> to sector xor     cl, cl
        mov     cl, ds:[bp].sect_count
;       MOV     AL, BPTR [SI]
        .WHILE  (cl != 0 && bptr [si] == 1)
                dec     cl
                inc     si
        .ENDW
;:
;       DMR_LP .IF cl == 0
                clc
        .ELSE
                stc
        .ENDIF
        ret
CHECK_TAB    ENDP ;------------------------------------------------------------
; ABSSECTOR         calculation abs sector
;
; ENTRY:    request structure: head, track, sector
;                   abssector = sector + track*EOT + head*EOT
;
; EXIT:     BX - abs  sector number
```

- 128 -

DOCKET NO. 2055

```
;----------------------------------------------------------------
ABSSECTOR   PROC   NEAR   USES AX DX CX mov    dl, 4
        call   get_parm              ; AH = EOT
        xor    dx, dx
        mov    dl, ah                ; save AX = DX EOT xchg   al, ah
        xor    ah, ah
        mov    cl, ds:[bp].track
        mul    cl                    ; al = EOT shl    ax, 1
        mov    bx, ax                ; bx = track*EOT*2 mov    cl, ds:[bp].head
        xor    ah, ah
        mov    al, dl                ; AL = EOT
        mul    cl
        add    bx, ax                ; bx = track*EOT*2 + head*EOT
        mov    abssect_trk, bx
        inc    abssect_trk           ; 1st sector of track
        xor    ah, ah
        mov    al, ds:[bp].sector
        add    bx, ax
        mov    wptr ds:abssect, bx
;       DMR_LP
        ret
ABSSECTOR   ENDP ;----------------------------------------------------------------
;
;
; ENTRY:
;
; EXIT:
;----------------------------------------------------------------
;AH = dskette_status = 0, AL = sector_count

MODULE MEMTEST.ASM

;------- memory test Low CS  0 - 3ffffh (256Kb)
; ds - 0 - 3
; si - 0 - ffffh
; test 64K xor    si, si
        mov    ax, 5555h
m_test:
        not    ax
        mov    es, si
        mov    cx, 8000h             ; 32Kbyte*2
        xor    di, di
        cld
```

- 129 -

DOCKET NO. 2055

```
        rep     stosw           ; write pattern to es:[di]

xor     di, di
        mov     cx, 8000h
        cld
        repe    scasw           ; read and cmp es:[di]
        or      cx, cx
        jnz     err_mem
        cmp     ax, 0AAAAh
        jz      m_test
        add     si, 1000h
        cmp     si, 04000h
        jz      ex_mem_test
        jmp     m_test
err_mem:
        hlt
;       jmp     err_mem
ex_mem_test:
        xor     si, si
        xor     ax, ax
m_test2:
        not     ax
        mov     es, si
        mov     cx, 8000h       ; 32Kbyte*2
        xor     di, di
        cld
        rep     stosw           ; write pattern to es:[di]

xor     di, di
        mov     cx, 8000h
        cld
        repe    scasw           ; read and cmp es:[di]
        or      cx, cx
        jnz     err_mem
        cmp     ax, 0FFFFh
        jz      m_test2
        add     si, 1000h
        cmp     si, 04000h
        jz      ex_mem_test2
        jmp     m_test2
ex_mem_test2:

; test dual memory _DUAL 8Kb

MODULE REQ_DATA.ASM

;REQUEST        STRUCT                          ; see int13h
dbg_cmd                 db      2
dbg_drive       db      0
dbg_head        db      0
dbg_track       db      0H dbg_sector      db      1
dbg_sect_count          db      1h dbg_pattern     dw      055aah
dbg_seek_status         db      0
```

- 130 -

DOCKET NO. 2055

```
dbg_motor_status    db      0 dbg_motor_count             db      0
dbg_dskette_status          db      0
dbg_fdc_cmd         db      0
dbg_timer_count             db      0 dbg_dsk_trk         dw      0
dbg_dsk_state               db      0;MED_DET
                    db      0;MED_DET dbg_fdc_status              db      10 dup (0)

;REQUEST ENDS
```

MODULE REQ_RESP.ASM

```
PAGE 60,132
TITLE Turbo Floppy Disk Controller. CSC Copyright(C) 1995.
;*****************************************************************
;
; REQ_RESP.ASM - request and response routines
;
;*****************************************************************

;---------------------------------------------------------------
; CP_REQ2MC copy PC request to LS memory of MC
;---------------------------------------------------------------
; ok
CP_REQ2MC   PROC    NEAR    USES    cx di si ds es
        pushf
        cli
        call    setbusy
        mov     di, SEG _MCDATA
        mov     es, di
        lea     di, mcreq mov     si, SEG _DUAL
        mov     ds, si
        lea     si, pcreq mov     cx, REQ_LEN
        cld
        rep     movsb lea     si, pcreq
        .IF     ds:[si].cmd == 03       ; ah = 03 write sector(s)
            call    cp_data2mc
        .ENDIF call    clrbusy
        sti
        popf
        ret
CP_REQ2MC   ENDP
```

DOCKET NO. 2055

```
;----------------------------------------------------------------
; START_REQUEST      jmp table ( ds:[bp].cmd - index),
;
; EXIT:              CY and AH = status of operation
;----------------------------------------------------------------
START_REQUEST      PROC   NEAR
        sti mov    bp, SEG _MCDATA
        mov    ds, bp
        lea    bp, mcreq mov    ah, bptr ds:[bp].cmd   ; AH = command int13H
        mov    fdc_cmd, ah
        cmp    ah, (fnc_tae - fnc_tab)/2
        jb     ok_func
        mov    ah, 14h                ;replace with known invalid function
ok_func:
        cmp    ah, 1                  ; reset or status
        jbe    ok_drv
        cmp    ah, 8                  ; read drive parameters
        jz     ok_drv
        cmp    bptr ds:[bp].drive, 1  ; drives 0 and 1 OK
        jbe    ok_drv
        mov    ah, 14h
ok_drv:
        mov    cl, ah                 ; cl = function
        xor    ch, ch
        shl    cl, 1
        lea    bx, fnc_tab
        add    bx, cx                 ; bx = offset into table FNC_TAB
        mov    cl, ds:[bp].drive      ;
        mov    di, cx                 ; di = drive
        call   wptr cs:[bx]           ; jmp to function
        ret include fnc_tab.asm

START_REQUEST      ENDP

;----------------------------------------------------------------
; MC_RESPONSE     send data, status and DPT to PC
;----------------------------------------------------------------
MC_RESPONSE PROC   NEAR
        call   setbusy
        call   cp_stat2pc
        jc     re_er
        call   cp_dpt2pc
IF 0
        .IF (fdc_cmd == CMD_READ || fdc_cmd == CMD_READ_TRACK)
            call   cp_data2pc    ; AL = #sectors
        .ENDIF
ENDIF
        .IF (fdc_cmd == CMD_READ_TRACK)
            call   cp_data2pc    ; AL = #sectors
        .ENDIF
re_er:
        call   clrbusy
```

- 132 -

DOCKET NO. 2055

```
        ret
MC_RESPONSE ENDP
;-----------------------------------------------------------------
; CP_STAT2PC     copy diskette status from MC to PC
;
; ENTRY:   AH == dskette_status, AL = #sectors read or written
;
; EXIT:           CY  reflect status of operation
;-----------------------------------------------------------------
CP_STAT2PC PROC  NEAR   USES AX DS ES SI
        sti
        mov   si, SEG _MCDATA
        mov   ds, si mov   si, SEG _DUAL
        mov   es, si
        lea   si, pcres mov   es:[si].res_sec_rd_wrtn, al
        mov   al, seek_status
        mov   es:[si].res_seek_status, al mov   al, motor_status
        mov   es:[si].res_motor_status, al mov   al, motor_count
        mov   es:[si].res_motor_count, al ;       mov   al, dskette_status
;       mov   es:[si].res_dskette_status, al
        mov   es:[si].res_dskette_status, ah mov   al, bptr dsk_trk
        mov   bptr es:[si].res_dsk_trk, al mov   al, bptr dsk_trk+1
        mov   bptr es:[si].res_dsk_trk+1, al mov   al, bptr dsk_state
        mov   bptr es:[si].res_dsk_state, al mov   al, bptr dsk_state+1
        mov   bptr es:[si].res_dsk_state+1, al mov   al, bptr fdc_status
        mov   bptr es:[si].res_fdc_status, al
        mov   al, bptr fdc_status+1
        mov   bptr es:[si].res_fdc_status+1, al
        mov   al, bptr fdc_status+2
        mov   bptr es:[si].res_fdc_status+2, al
        mov   al, bptr fdc_status+3
        mov   bptr es:[si].res_fdc_status+3, al
        mov   al, bptr fdc_status+4
        mov   bptr es:[si].res_fdc_status+4, al
        mov   al, bptr fdc_status+5
        mov   bptr es:[si].res_fdc_status+5, al
        mov   al, bptr fdc_status+6
```

DOCKET NO. 2055

```
        mov     bptr es:[si].res_fdc_status+6, al mov     al, lastrate
        mov     es:[si].res_lastrate, al ; check         CY of operation dskette_status
        .IF (dskette_status == 0)
                clc
        .ELSE
                stc
        .ENDIF
        cli
        ret
CP_STAT2PC      ENDP ;-----------------------------------------------------------------
; CP_DPT2PC copy diskette parameter table from MC to PC
;-----------------------------------------------------------------
CP_DPT2PC    PROC  NEAR  USES   DS ES SI DI CX
        cli
        mov     si, SEG _MCDATA
        mov     ds, si
        lea     si, mcparm mov     di, SEG _DUAL
        mov     es, di
        lea     di, pcparm mov     cx, PARM_LEN
        cld
        rep     movsb
        sti
        ret
CP_DPT2PC    ENDP ;-----------------------------------------------------------------
; CP_DATA2PC       copy data from MC to PC
;
; ENTRY:   AL = # of sectors
;-----------------------------------------------------------------
CP_DATA2PC   PROC  NEAR  USES   AX ES SI DI CX BX DX
        cli
        push    ds
        xor     ax, ax
        lea     si, mcreq
        mov     al, [si].sect_count lds     si, sector_offseg
        mov     di, SEG _DUAL
        mov     es, di
        lea     di, es:deb_buff mov     cx, SZSECTOR
        mul     cx
        mov     cx, ax
        cld
        rep     movsb
;;
```

- 134 -

DOCKET NO. 2055

```
; updata sector_tab
        pop     ds mov     dl, 4
        call    get_parm
        xor     cx, cx
        mov     cl, ah                  ; CL = EOT mov     bx, abssect_trk
        lea     si, sector_tab
        dec     bx
        add     bx, si
;       DMR_LP
@@:
;       mov     bptr [bx], 1
        inc     bx
        loop    @b
        sti
        ret
CP_DATA2PC  ENDP ;---------------------------------------------------------------
; CP_DATA2MC      copy data from PC to MC
;
; ENTRY:   AL = # of sectors
;---------------------------------------------------------------
CP_DATA2MC  PROC  NEAR  USES  AX DS ES SI DI CX
        cli
;       mov     di, SEG _BUFF
        mov     ds, di
;       lea     di, data_buff mov     si, _DUAL
        mov     ds, si
        lea     di, deb_buff mov     cx, SZSECTOR
        mul     cx
        mov     cx, ax
        cld
        rep     movsb
        sti
        ret
CP_DATA2MC  ENDP IF 0 ; OLD VERSION
;---------------------------------------------------------------
; CP_DATA2PC      copy data from MC to PC
;
; ENTRY:   AL = # of sectors
;---------------------------------------------------------------
CP_DATA2PC  PROC  NEAR  USES  AX DS ES SI DI CX
        cli
        mov     si, SEG _BUFF
        mov     ds, si
```

DOCKET NO. 2055

```
        lea     si, data_buff mov     di, _DUAL
        mov     es, di
        lea     di, deb_buff mov     cx, SZSECTOR
        mul     cx
        mov     cx, ax
        cld
        rep     movsb
        sti
        ret
CP_DATA2PC ENDP
ENDIF
```

MODULE_SELBANK.ASM

```
        .MODEL    SMALL
        .286

_TEXT   SEGMENT    WORD PUBLIC 'CODE'
;       ORG    100H
        ASSUME     CS:_TEXT, DS:_TEXT

START:
        mov     bx, 2521
        call    select_bank
        .EXIT
;       int     20h ;----------------------------------------------------------------
; SELECT_BANK
;
; ENTRY:    BX = abs sector #
;
; EXIT:          DX = SEGMENT
;                AX = OFFSET
;----------------------------------------------------------------
BANK0           EQU     00H
BANK1           EQU     01H
BANK2           EQU     02H
BANK3           EQU     03H
BANK4           EQU     04H
BANK5           EQU     05H
SZBANK          EQU     40000H              ; 256K
BANKSECTOR      EQU     504           ; (SZBANK/SZSECTOR)
SZSECTOR        EQU     512

SELECT_BANK PROC NEAR
```

- 136 -

DOCKET NO. 2055

```
        .IF    BX <= BANKSECTOR
               mov    al, BANK0
        .ELSEIF BX <= BANKSECTOR*2
               mov    al, BANK1
               sub    bx, BANKSECTOR
        .ELSEIF BX <= BANKSECTOR*3
               mov    al, BANK2
               sub    bx, BANKSECTOR*2
        .ELSEIF BX <= BANKSECTOR*4
               mov    al, BANK3
               sub    bx, BANKSECTOR*3
        .ELSEIF BX <= BANKSECTOR*5
               mov    al, BANK4
               sub    bx, BANKSECTOR*4
        .ELSEIF BX <= BANKSECTOR*6
               mov    al, BANK5
               sub    bx, BANKSECTOR*5
        .ENDIF
        mov    cl, al              ; cl = bank number
;       mov    dx, BANK_SEL
;       out    dx, al
        dec    bx                  ; sector = 1, offset = 0
        mov    ax, SZSECTOR
        mul    bx                  ; result dx:ax
        and    dx, 000FH           ; clear
        or     dx, 0008H           ; MCS0,1 = address 80000-BFFFFH
        .IF    cl == BANK5
               inc    dx           ; 1st 64k in bank5 is system memory
        .ENDIF
        ret
SELECT_BANK ENDP mess   db     13, 10, 'CheckSum D000: 0 - 1FFEH: ', '$'
track  db     79
head   db     1
sector        db     18

;       include tax.inc
;       include      memmngr.tst

_TEXT ENDS
        END    START
```

DOCKET NO. 2055

MODULE STACK.ASM

; stack and interrupt vectors
```
        mov     ax, 0
        mov     ss, ax
        mov     ax, 0fffeh
        mov     sp, ax
;
```

MODULE STACKINT.ASM

; stack
```
        mov     ax, 0
        mov     ss, ax
        mov     ax, 0fffeh
        mov     sp, ax
```

; SETUP Interrupt Vectors
```
        mov     si, cs
        mov     ds, si
        mov     ax, si
        lea     si, Vector_table        ; ax - segment of Vector_table mov     di, 0
        mov     es, di                  ; es:[di] points to LS 0:0
        mov     bx, Vector_table_end loop_set_vectors:
        movsw                           ; copy offset from ds:[si] to es:[di]
        mov     wptr es:[di], ax        ; copy segment
        inc     di
        inc     di
        cmp     si, bx
        jnz     loop_set_vectors
```

;------- Interrupt Control Unit
```
        mov     dx, REG_IMASK
;       mov     ax, INT_SETMSK
        mov     ax, INT_CLRMSK
        out     dx, al
```

MODULE TEST.ASM

```
        .MODEL  SMALL
        .286

_TEXT SEGMENT   WORD PUBLIC 'CODE'
        ORG     100H
        ASSUME  CS:_TEXT, DS:_TEXT
```

DOCKET NO. 2055

```
START:

call    abssector
        int     20h mess    db      13, 10, 'CheckSum D000: 0 - 1FFEH: ', '$'
track   db      79
head    db      1
sector  db      18 include tax.inc
        include memmngr.tst

_TEXT ENDS
        END     START
```

MODULE TESTCPU.ASM

```
;-------------------------------------------
;       80188 PROCESSOR TEST            :
; DESCRIPTION                           :
;       VERIFY 80188 FLAGS, REGISTERS   :
;       AND CONDITIONAL JUMPS           :
;-------------------------------------------
        CLI                     ; DISABLE INTERRUPTS
        MOV     AH, 0D5H        ; SET SF, CF, ZF, AND AF FLAGS ON
        SAHF
        JNC     ERR01           ; GO TO ERR ROUTINE IF CF NOT SET
        JNZ     ERR01           ; GO TO ERR ROUTINE IF ZF NOT SET
        JNP     ERR01           ; GO TO ERR ROUTINE IF PF NOT SET
        JNS     ERR01           ; GO TO ERR ROUTINE IF SF NOT SET
        LAHF                    ; LOAD FLAG IMAGE TO AH
        MOV     CL,5            ; LOAD CNT REG WITH SHIFT CNT
        SHR     AH,CL           ; SHIFT AF INTO CARRY BIT POS
        JNC     ERR01           ; GO TO ERR ROUTINE IF AF NOT SET
        MOV     AL,40H          ; SET THE OF FLAG ON
        SHL     AL,1            ; SETUP FOR TESTING
        JNO     ERR01           ; GO TO ERR ROUTINE IF OF NOT SET
        XOR     AH,AH           ; SET AH=0
        SAHF                    ; CLEAR SF, CF, ZF, AND PF
        JBE     ERR01           ; GO TO ERR ROUTINE IF CF ON
                                ; GO TO ERR ROUTINE IF ZF ON
        JS      ERR01           ; GO TO ERR ROUTINE IF SF ON
        JP      ERR01           ; GO TO ERR ROUTINE IF PF ON
        LAHF                    ; LOAD FLAG IMAGE TO AH
        MOV     CL,5            ; LOAD CNT REG WITH SHIFT CNT
        SHR     AH,CL           ; SHIFT AF INTO CARRY BIT POS
        JC      ERR01           ; GO TO ERR ROUTINE IF ON
        SHL     AH,1            ; CHECK THAT OF IS CLEAR
        JO      ERR01           ; GO TO ERR ROUTINE IF ON

;-----   READ/WRITE THE 8088 GENERAL AND SEGMENTATION REGISTERS
;        WITH ALL ONE'S AND ZEROES'S.
```

DOCKET NO. 2055

```
              MOV    AX,0FFFFH          ; SETUP ONE'S PATTERN IN AX
              STC
       C8:    MOV    DS,AX              ; WRITE PATTERN TO ALL REGS
              MOV    BX,DS
              MOV    ES,BX
              MOV    CX,ES
              MOV    SS,CX
              MOV    DX,SS
              MOV    SP,DX
              MOV    BP,SP
              MOV    SI,BP
              MOV    DI,SI
              JNC    C9                 ; TST1A
              XOR    AX,DI              ; PATTERN MAKE IT THRU ALL REGS
              JNZ    ERR01              ; NO - GO TO ERR ROUTINE
              CLC
              JMP    C8
       C9:                              ; TST1A
              OR     AX,DI              ; ZERO PATTERN MAKE IT THRU?
              JZ     C10                ; YES - GO TO NEXT TEST
       ERR01: HLT                       ; HALT SYSTEM

C10:   NOP
```

MODULE TESTDRV.ASM

```
;-----------------------------------------------------------------
; RD_WR_VF : COMMON READ, WRITE AND VERIFY
;
; ON ENTRY:
;
; ON EXIT:  DISKETTE_STATUS, CY - STATUS OF OPERATION
;-----------------------------------------------------------------
; not ok
RD_WR_VF  PROC  NEAR
      mov    retry_was, 0
do_again:
      call   med_change
      jc     rwv_end              ; media change error or timeout
      call   send_rate            ; send data rate to FDC
      call   check_med
      jc     chk_ret
      call   motor_on
      mov    ch, ds:[bp].track
      call   seek
      jc     rwv_end IF 0
      .IF    bptr ds:fdc_cmd == CMD_READ
             call  rd_dma_setup
      .ELSEIF bptr ds:fdc_cmd == CMD_WRITE
             call  wr_dma_setup
      .ELSEIF bptr ds:fdc_cmd == CMD_READ_TRACK
             call  rdt_dma_setup
      .ENDIF
ENDIF
```

- 140 -

DOCKET NO. 2055

```
;:
        call    rwv_com
;       DMR_LP
        call    fdc_term
;       DMR_LP chk_ret:
        call    retry
        jc      do_again
rwv_end:
        call    dstate
        call    num_trans
        call    setup_end
IFDEF DEBUG
        DDR
        DDM
;       DMR_LP
;       DDBS
ENDIF
        ret
RD_WR_VF    ENDP ;------------------------------------------------------------
; CHECK_MED:    CHECK MEDIA
;
; ENTRY:    DI = drive
;
; EXIT:         CY = 1 means error
;------------------------------------------------------------
; ok
CHECK_MED   PROC NEAR
        mov     ah, bptr dsk_state[di]
        test    ah, MED_DET
        jnz     no_read_id mov     seek_status, 0
        call    motor_on
        mov     ch, 0
        call    seek
        call    read_id
        ret
no_read_id:
        clc
        ret
CHECK_MED   ENDP ;------------------------------------------------------------
; RETRY:    determines whether a retry is necessary. If retry is
;           required then state information is updated for retry
; EXIT:         CY = 1 for retry, CY = 0 for no retry
;------------------------------------------------------------
RETRY       PROC NEAR
        cmp     bptr dskette_status, 0
        jz      no_retry
        cmp     bptr dskette_status, TIME_OUT
        jz      no_retry
        cmp     bptr dskette_status, RECORD_NOT_FND
        jz      no_retry
```

- 141 -

DOCKET NO. 2055

```
            cmp    bptr dskette_status, WRITE_PROTECT
            jz     no_retry mov    ah, bptr dsk_state[di]
            test   ah, MED_DET
            jnz    no_retry cmp    retry_was, 0
            jnz    r_was
            dec    retry_was
            mov    al, lastrate
            and    al, RATE_MSK lea    bx, mcparm
            .IF al == 0                    ; is rate 500 ?
               mov    ah, RATE_250
               mov    [bx].eot, 9   ; # TRACKS 720
            .ELSE
               mov    ah, RATE_500
               mov    [bx].eot, 12H       ; # TRACKS 1.44
            .ENDIF and    bptr dsk_state[di], not RATE_MSK
            or     bptr dsk_state[di], ah
            mov    bptr dskette_status, 0
            inc    retry_was
            stc
            ret
r_was:
            mov    retry_was, 0
no_retry:
            clc
            ret
RETRY       ENDP ;-------------------------------------------------------------
; DSTATE:   establish state upon seccessful operation
;-------------------------------------------------------------
DSTATE              PROC  NEAR
            cmp    bptr dskette_status, 0
            jnz    @f
            or     bptr dsk_state[di], MED_DET
@@:
            ret
DSTATE              ENDP ;-------------------------------------------------------------
; NUM_TRANS:
;
; EXIT:         AL = NUMBER ACTUALY TRANSFERRED
;-------------------------------------------------------------
NUM_TRANS   PROC  NEAR
            xor    al, al
            cmp    bptr dskette_status, 0
            jnz    nt_out mov    dl, 4
            call   get_parm                ; ah = sectors per track
```

- 142 -

DOCKET NO. 2055

```
        mov     bl, bptr fdc_status+5        ; get ending sector
;       mov     ch, bptr ds:[bp].head        ;
;       cmp     ch, bptr fdc_status+4        ; get head ended up on
;       jnz     dif_hd
;:
        mov     ch, bptr fdc_status+3        ; track #
        cmp     ch, bptr ds:[bp].track
        jz      same_trk ;       add     bl, ah
;dif_hd:
        add     bl, ah
same_trk:
        sub     bl, bptr ds:[bp].sector
        mov     al, bl
        ret
nt_out:
        .IF     (bptr fdc_status+1 == END_OF_TRACK)
        mov     al, bptr fdc_status+5
        .ENDIF
        ret
NUM_TRANS       ENDP CLR_DUAL        PROC  NEAR  USES  AX ES DI CX
        pushf
        cli
        call    setbusy
        mov     cx, 180h
        mov     di, SEG _DUAL
        mov     es, di
        xor     di, di
        add     di, 6
        xor     al, al
        rep     stosb
        call    clrbusy
        sti
        popf
        ret
CLR_DUAL        ENDP
```

- 143 -

What is claimed is:

1. A floppy diskette subsystem adapted for inclusion in a host computer system and for recording digital data along tracks formed on both side surfaces of a thin, circularly-shaped, double-sided floppy diskette, said floppy diskette subsystem comprising:

an enhanced-performance floppy diskette drive adapted for receiving and securing a floppy diskette so the floppy diskette is rotatable about a rotation axis disposed normal to the floppy diskette, said floppy diskette drive including:

a diskette drive motor which upon being energized rotates a floppy diskette secured in the floppy diskette drive about the rotation axis at a nominal rotation speed;

two read/write heads that are respectively adapted for recording and reproducing digital data from a single side surface of a floppy diskette;

a diskette head positioning assembly to which the read/write heads are mechanically secured, the diskette head positioning assembly being adapted for moving each of the read/write heads laterally across a side surface of a floppy diskette in a direction that is normal to the rotation axis of a floppy diskette; and two separate and independent read/write ("R/W") channels which are respectively electronically coupled to one of the read/write heads, each of the R/W channels exchanging electrical signals with the read/write head to which the R/W channel is coupled for recording digital data on a side surface of a floppy diskette, and for reproducing previously recorded digital data from that same side surface of a floppy diskette; and an enhanced-performance floppy diskette controller adapted for exchanging digital command, status, and data signals with a bus of a host computer system, said floppy diskette controller also being adapted for exchanging digital command, status, control, and data signals with the diskette head positioning assembly, with the diskette drive motor, and with the R/W channels of said floppy diskette drive, said floppy diskette controller including:

floppy diskette controller register emulation logic adapted for being coupled to a bus of a host computer system for exchanging digital command, status, and data signals therewith, the floppy diskette controller register emulation logic receiving and transmitting digital command, status, and data signals which permit the floppy diskette controller to mimic a conventional floppy diskette subsystem;

a cache memory coupled to the floppy diskette controller register emulation logic for exchanging digital data with the floppy diskette controller register emulation logic, and for storing exchanged digital data;

a microcontroller coupled both to the floppy diskette controller register emulation logic and to the cache memory for exchanging digital data between the floppy diskette controller register emulation logic and the cache memory so the floppy diskette controller mimics operation of a conventional floppy diskette subsystem; and two separate and independent floppy disk drive controller channels respectively coupled between the cache memory and one of the R/W channels included in said enhanced-performance floppy diskette drive, each floppy disk drive controller channel concurrently exchanging digital data with the cache memory and exchanging digital command, status, control, and data signals with the R/W channel of said floppy diskette drive that is coupled to the floppy disk drive controller channel.

2. The floppy diskette subsystem of claim 1 wherein said floppy diskette controller pre-fetches digital data from a floppy diskette, that is present in said floppy diskette drive and upon which such digital data has been previously recorded, before a computer program executed by a host microprocessor included in a host computer system attempts to access such digital data, said floppy diskette controller storing such pre-fetched digital data into said cache memory.

3. The floppy diskette subsystem of claim 1 wherein if said floppy diskette controller receives digital data from a host computer system for recording onto a floppy diskette that is present in said floppy diskette drive, said floppy diskette controller first stores such digital data into said cache memory before transmitting such digital data to the R/W channels of said floppy diskette drive for recording onto the floppy diskette.

4. The floppy diskette subsystem of claim 3 wherein the floppy diskette cannot be removed from said floppy diskette drive if any digital data to be recorded onto the floppy diskette remains in said cache memory.

5. The floppy diskette subsystem of claim 4 wherein upon energization of a solenoid included in the floppy diskette drive a pin extends from said solenoid to engage and lock a diskette eject button included in the floppy diskette drive to prevent removal the floppy diskette from said floppy diskette drive while any digital data to be recorded onto the floppy diskette remains in said cache memory.

6. The floppy diskette subsystem of claim 1 wherein the floppy diskette controller further comprises a variable frequency oscillator for producing a clock signal having a frequency which is specified by digital data that said variable frequency oscillator receives from said microcontroller, the clock signal produced by said variable frequency oscillator regulating operation of the floppy disk drive controller channels, and the rotation speed of the diskette drive motor.

7. The floppy diskette subsystem of claim 1 wherein digital data is recorded on a floppy diskette that is present in said floppy diskette drive while said diskette drive motor accelerates the floppy diskette up to the nominal rotation speed.

8. The floppy diskette subsystem of claim 7 wherein the nominal rotation speed of the floppy diskette exceeds 550 revolutions per minute ("RPM").

9. The floppy diskette subsystem of claim 8 wherein the nominal rotation speed of the floppy diskette exceeds 850 RPM.

10. The floppy diskette subsystem of claim 1 wherein digital data is reproduced from a floppy diskette, that is present in said floppy diskette drive and upon which such digital data has been previously recorded, while said diskette drive motor accelerates the floppy diskette up to the nominal rotation speed.

11. The floppy diskette subsystem of claim 10 wherein the nominal rotation speed of the floppy diskette exceeds 550 RPM.

12. The floppy diskette subsystem of claim 10 wherein the nominal rotation speed of the floppy diskette exceeds 850 RPM.

13. The floppy diskette subsystem of claim 1 wherein the floppy diskette drive transmits an interrupt signal to said floppy diskette controller immediately upon ejection of a floppy diskette from the floppy diskette drive.

14. The floppy diskette subsystem of claim 1 wherein the nominal rotation speed of the floppy diskette exceeds 550 RPM.

15. The floppy diskette subsystem of claim 1 wherein the nominal rotation speed of the floppy diskette exceeds 850 RPM.

16. The floppy diskette subsystem of claim 1 wherein upon said diskette head positioning assembly moving said read/write heads from a first track to a second track laterally across side surfaces of a floppy diskette that is present in said floppy diskette drive and upon which digital data has been previously recorded, said floppy diskette subsystem begins reproducing digital data immediately upon said floppy diskette controller sensing that said read/write heads are properly positioned in relationship to the second track.

17. The floppy diskette subsystem of claim 1 wherein upon said diskette head positioning assembly moving said read/write heads from a first track to a second track laterally across side surfaces of a floppy diskette that is present in said floppy diskette drive and upon which digital data has been previously recorded, said floppy diskette subsystem begins recording digital data immediately upon said floppy diskette controller sensing that said read/write heads are properly positioned in relationship to the second track.

18. The floppy diskette subsystem of claim 1 wherein if said floppy diskette controller detects accesses to a floppy diskette that is present in said floppy diskette drive by a computer program executed by a host microprocessor included in a host computer system which requires conventional performance from said floppy diskette subsystem for proper execution of the computer program, said floppy diskette subsystem reduces performance to that of a conventional floppy diskette subsystem.

19. The floppy diskette subsystem of claim 18 wherein said floppy diskette controller further comprises a basic input-output system ("BIOS") for detecting if a computer program executed by the host microprocessor requires conventional performance from said floppy diskette subsystem.

20. An enhanced-performance floppy diskette controller adapted for inclusion in a host computer system and for exchanging digital command, status, and data signals with a bus of the host computer system, said floppy diskette controller also being adapted for use with an enhanced-performance floppy diskette drive to form a floppy diskette subsystem, the enhanced-performance floppy diskette drive being adapted for receiving and securing a thin, circularly-shaped, double-sided floppy diskette so the floppy diskette is rotatable about a rotation axis disposed normal to the floppy diskette, and for recording digital data along tracks formed on two side surfaces of the floppy diskette, the floppy diskette drive including:

a diskette drive motor which upon being energized rotates a floppy diskette secured in the floppy diskette drive about the rotation axis at a nominal rotation speed;

two read/write heads that are respectively adapted for recording and reproducing digital data from a single side surface of a floppy diskette;

a diskette head positioning assembly to which the read/write heads are mechanically secured, the diskette head positioning assembly being adapted for moving each of the read/write heads laterally across a side surface of a floppy diskette in a direction that is normal to the rotation axis of a floppy diskette; and two separate and independent R/W channels which are respectively electronically coupled to one of the read/write heads, each of the R/W channels exchanging electrical signals with the read/write head to which the R/W channel is coupled for recording digital data on a side surface of a floppy diskette, and for reproducing previously recorded digital data from that same side surface of a floppy diskette; and said enhanced-performance floppy diskette controller being adapted for exchanging digital command, status, control, and data signals with the diskette head positioning assembly, with the diskette drive motor, and with the R/W channels of the floppy diskette drive, said floppy diskette controller comprising:

floppy diskette controller register emulation logic adapted for being coupled to a bus of a host computer system for exchanging digital command, status, and data signals therewith, the floppy diskette controller register emulation logic receiving and transmitting digital command, status, and data signals which permit the floppy diskette controller to mimic a conventional floppy diskette subsystem;

a cache memory coupled to the floppy diskette controller register emulation logic for exchanging digital data with the floppy diskette controller register emulation logic, and for storing exchanged digital data;

a microcontroller coupled both to the floppy diskette controller register emulation logic and to the cache memory for exchanging digital data between the floppy diskette controller register emulation logic and the cache memory so the floppy diskette controller mimics operation of a conventional floppy diskette subsystem; and two separate and independent floppy disk drive controller channels respectively coupled between the cache memory and one of the R/W channels included in the enhanced-performance floppy diskette drive, each floppy disk drive controller channel concurrently exchanging digital data with the cache memory and exchanging digital command, status, control, and data signals with the R/W channel of the floppy diskette drive that is coupled to the floppy disk drive controller channel.

21. The floppy diskette controller of claim 20 wherein said floppy diskette controller pre-fetches digital data from a floppy diskette that is present in the floppy diskette drive before a computer program executed by a host microprocessor included in a host computer system attempts to access such digital data, said floppy diskette controller storing such pre-fetched digital data into said cache memory.

22. The floppy diskette controller of claim 20 wherein if said floppy diskette controller receives digital data from a host computer system for recording onto a floppy diskette that is present in the floppy diskette drive, said floppy diskette controller first stores such digital data into said cache memory before transmitting such digital data to the R/W channels of the floppy diskette drive for recording onto the floppy diskette.

23. The floppy diskette controller of claim 20 wherein the floppy diskette controller further comprises a variable frequency oscillator for producing a clock signal having a frequency which is specified by digital data that said variable frequency oscillator receives from said microcontroller, the clock signal produced by said variable frequency oscillator regulating operation of the floppy disk drive controller channels, and the rotation speed of the diskette drive motor in the floppy diskette drive.

24. The floppy diskette controller of claim 20 wherein said floppy diskette controller transmits digital data to the floppy diskette drive for recording on a floppy diskette that is present in the floppy diskette drive while the diskette drive motor of the floppy diskette drive accelerates the floppy diskette up to the nominal rotation speed.

25. The floppy diskette controller of claim 20 wherein said floppy diskette controller stores digital data into said cache memory which has been reproduced from a floppy diskette that is present in the floppy diskette drive while the diskette drive motor of the floppy diskette drive accelerates the floppy diskette up to the nominal rotation speed.

26. The floppy diskette controller of claim 20 wherein upon the diskette head positioning assembly of the floppy diskette drive moving said read/write heads of the floppy diskette drive from a first track to a second track laterally across side surfaces of a floppy diskette that is present in the floppy diskette drive and upon which digital data has been previously recorded, the floppy diskette controller begins storing into said cache memory digital data reproduced from the floppy diskette present in the floppy diskette drive immediately upon said floppy diskette controller sensing that the read/write heads are properly positioned in relationship to the second track.

27. The floppy diskette controller of claim 20 wherein upon the diskette head positioning assembly of the floppy diskette drive moving said read/write heads of the floppy diskette drive from a first track to a second track laterally across side surfaces of a floppy diskette that is present in the floppy diskette drive and upon which digital data has been previously recorded, the floppy diskette controller begins transmitting digital data from said cache memory to the R/W channels of the floppy diskette drive for recording onto the floppy diskette immediately upon said floppy diskette controller sensing that the read/write heads are properly positioned in relationship to the second track.

28. The floppy diskette controller of claim 20 wherein if said floppy diskette controller detects accesses to a floppy diskette that is present in the floppy diskette drive by a computer program executed by a host microprocessor included in a host computer system which requires conventional performance from the floppy diskette subsystem for proper execution of the computer program, said floppy diskette controller reduces the performance of the floppy diskette subsystem to that of a conventional floppy diskette subsystem.

29. The floppy diskette controller of claim 28 wherein said floppy diskette controller further comprises a BIOS for detecting if a computer program executed by the host microprocessor requires conventional performance from the floppy diskette subsystem.

30. An enhanced-performance floppy diskette drive adapted for use with an enhanced-performance floppy diskette controller to form a floppy diskette subsystem adapted for inclusion in a host computer system, the enhanced-performance floppy diskette controller being adapted for exchanging digital command, status, and data signals with a bus of a host computer system, the floppy diskette controller also being adapted for exchanging digital command, status, control, and data signals with said floppy diskette drive, the floppy diskette controller including:

floppy diskette controller register emulation logic adapted for being coupled to a bus of a host computer system for exchanging digital command, status, and data signals therewith, the floppy diskette controller register emulation logic receiving and transmitting digital command, status, and data signals which permit the floppy diskette controller to mimic a conventional floppy diskette subsystem;

a cache memory coupled to the floppy diskette controller register emulation logic for exchanging digital data with the floppy diskette controller register emulation logic, and for storing exchanged digital data;

a microcontroller coupled both to the floppy diskette controller register emulation logic and to the cache memory for exchanging digital data between the floppy diskette controller register emulation logic and the cache memory so the floppy diskette controller mimics operation of a conventional floppy diskette subsystem; and two separate and independent floppy disk drive controller channels respectively coupled to the cache memory and also being adapted to be coupled to said enhanced performance floppy diskette drive, each floppy disk drive controller channel concurrently exchanging digital data with the cache memory and being adapted for exchanging digital command, status, control, and data signals with said floppy diskette drive; and said floppy diskette drive being adapted for receiving and securing a thin, circularly-shaped, double-sided floppy diskette so the floppy diskette is rotatable about a rotation axis disposed normal to the floppy diskette, and for recording digital data along tracks formed on both side surfaces of the floppy diskette, said floppy diskette drive comprising:

a diskette drive motor which upon being energized rotates a floppy diskette secured in the floppy diskette drive about the rotation axis;

two read/write heads that are respectively adapted for recording and reproducing digital data from a single side surface of a floppy diskette;

a diskette head positioning assembly to which the read/write heads are mechanically secured, the diskette head positioning assembly being adapted for moving each of the read/write heads laterally across a side surface of a floppy diskette in a direction that is normal to the rotation axis of a floppy diskette;

two separate and independent R/W channels which are respectively electronically coupled to one of the read/write heads, each R/W channel concurrently exchanging digital command, status, control, and data signals with one of the floppy disk drive controller channels included in the floppy diskette controller to which the R/W channel is coupled, each of the R/W channels also concurrently exchanging electrical signals with the read/write head to which the R/W channel is coupled for recording digital data on a side surface of a floppy diskette, and for reproducing previously recorded digital data from that same side surface of a floppy diskette; and floppy diskette ejection means which upon being activated ejects from said floppy diskette drive a floppy diskette which is present in said floppy diskette drive, said floppy diskette drive transmitting an interrupt signal to said floppy diskette controller immediately upon ejection of a floppy diskette from the floppy diskette drive.

31. The floppy diskette drive of claim 30 wherein the floppy diskette cannot be removed from said floppy diskette drive if any digital data to be recorded onto the floppy diskette remains in the cache memory of the floppy diskette controller.

32. The floppy diskette drive of claim 31 wherein upon energization of a solenoid included in the floppy diskette drive a pin extends from said solenoid to engage and lock a diskette eject button included in the floppy diskette drive to prevent removal the floppy diskette from said floppy diskette drive while any digital data to be recorded onto the floppy diskette remains in the cache memory of the floppy diskette controller.

33. The floppy diskette drive of claim 30 wherein said diskette drive motor responds to a variable frequency clock signal produced in the floppy diskette controller for regulating the rotation speed of the diskette drive motor.

34. The floppy diskette drive of claim 30 wherein digital data is recorded on a floppy diskette that is present in said floppy diskette drive while said diskette drive motor accelerates the floppy diskette up to the nominal rotation speed.

35. The floppy diskette drive of claim 34 wherein the nominal rotation speed of the floppy diskette exceeds 550 RPM.

36. The floppy diskette drive of claim 34 wherein the nominal rotation speed of the floppy diskette exceeds 850 RPM.

37. The floppy diskette drive of claim 30 wherein digital data is reproduced from a floppy diskette, that is present in said floppy diskette drive and upon which such digital data has been previously recorded, while said diskette drive motor accelerates the floppy diskette up to the nominal rotation speed.

38. The floppy diskette drive of claim 37 wherein the nominal rotation speed of the floppy diskette exceeds 550 RPM.

39. The floppy diskette drive of claim 37 wherein the nominal rotation speed of the floppy diskette exceeds 850 RPM.

40. The floppy diskette drive of claim 30 wherein the nominal rotation speed of the floppy diskette exceeds 550 RPM.

41. The floppy diskette drive of claim 30 wherein the nominal rotation speed of the floppy diskette exceeds 850 RPM.

* * * * *